(12) United States Patent
Takagi

(10) Patent No.: US 6,754,507 B2
(45) Date of Patent: Jun. 22, 2004

(54) FOLDING-TYPE MOBILE TERMINAL HAVING A METAL HINGE, METAL CHASSIS AND SYNTHETIC-RESIN CASES

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 09/833,188

(22) Filed: Apr. 11, 2001

(65) Prior Publication Data

US 2001/0034242 A1 Oct. 25, 2001

(30) Foreign Application Priority Data

Apr. 19, 2000 (JP) .......................................... 2000-118666
Sep. 6, 2000 (JP) .......................................... 2000-270732

(51) Int. Cl.[7] ................................................ H04Q 7/32
(52) U.S. Cl. ............................... 455/550.1; 455/575.3; 455/575.1; 379/433.13; 379/433.01
(58) Field of Search ............................ 455/403, 550.1, 455/575.1, 575.3, 90.3, 422.1, 517, 556.1, 556.2, 557; 379/433.13, 433.01, 428.01; 16/319, 333; 439/165, 164

(56) References Cited

U.S. PATENT DOCUMENTS

| | | | | |
|---|---|---|---|---|
| 5,732,331 A | * | 3/1998 | Harms | 455/575.3 |
| 5,832,080 A | | 11/1998 | Beutler et al. | |
| 5,905,796 A | * | 5/1999 | Jung | 379/433.13 |
| 6,011,699 A | | 1/2000 | Murray et al. | |
| 6,470,175 B1 | * | 10/2002 | Park et al. | 455/90.1 |

FOREIGN PATENT DOCUMENTS

| | | |
|---|---|---|
| DE | 199 21 355 | 11/1999 |
| JP | 11087940 | 3/1999 |

* cited by examiner

Primary Examiner—William Trost
Assistant Examiner—Keith Ferguson
(74) Attorney, Agent, or Firm—Katten Muchin Zavis Rosenman

(57) ABSTRACT

A folding-type mobile terminal comprises: a first body having a first printed-board module inside thereof and having an input unit on a surface of the first body; a second body having a second printed-board module inside thereof and having a display unit on a surface of the second body; a hinge coupling the first body and the second body so that the folding-type mobile terminal is capable of being folded, the hinge being made of a metal; a first metal chassis incorporated into the first body, the first metal chassis extending from the hinge; and a second metal chassis incorporated into the second body, the second metal chassis extending from the hinge. Each of the first body and the second body has the printed-board module, an upper case-member and a lower case-member each fixed to the metal chassis so that the upper case-member and the lower case-member together cover the metal chassis. The upper case-member and the lower case-member are made of a synthetic resin.

13 Claims, 44 Drawing Sheets

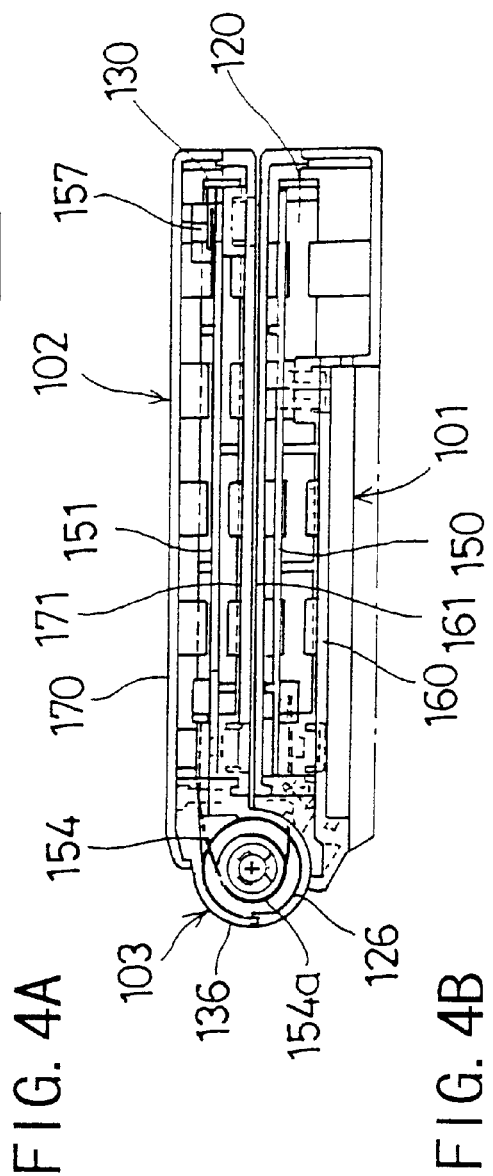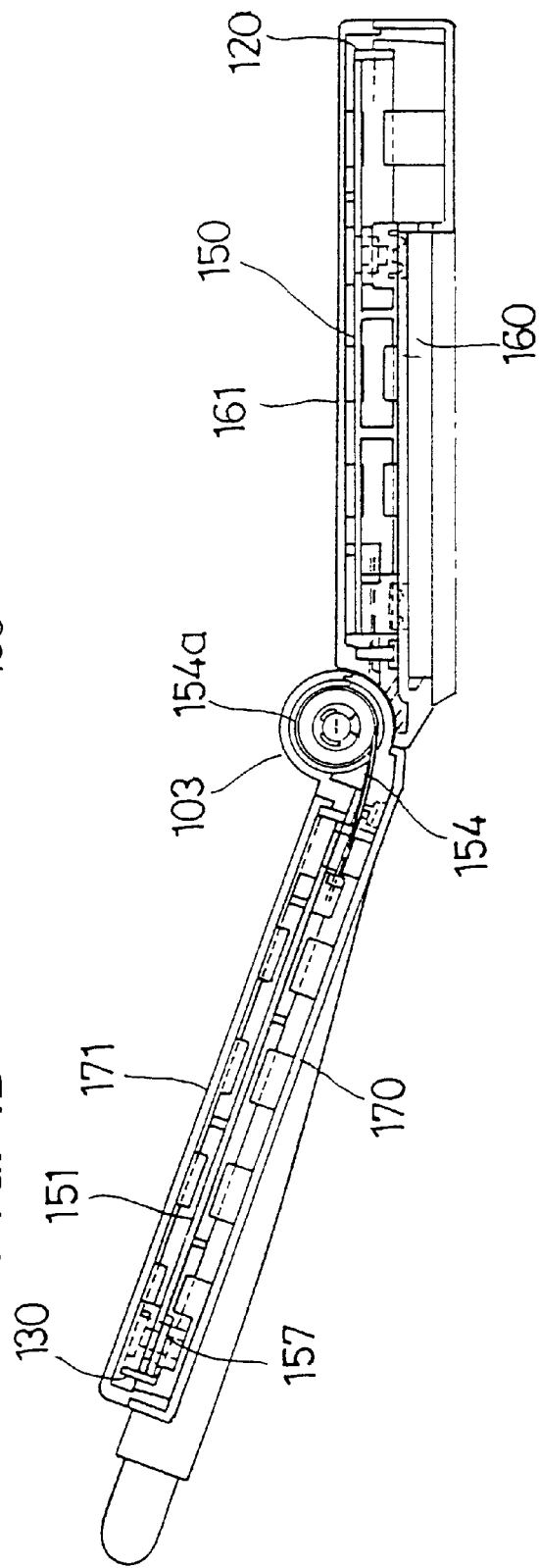
FIG. 4A
FIG. 4B

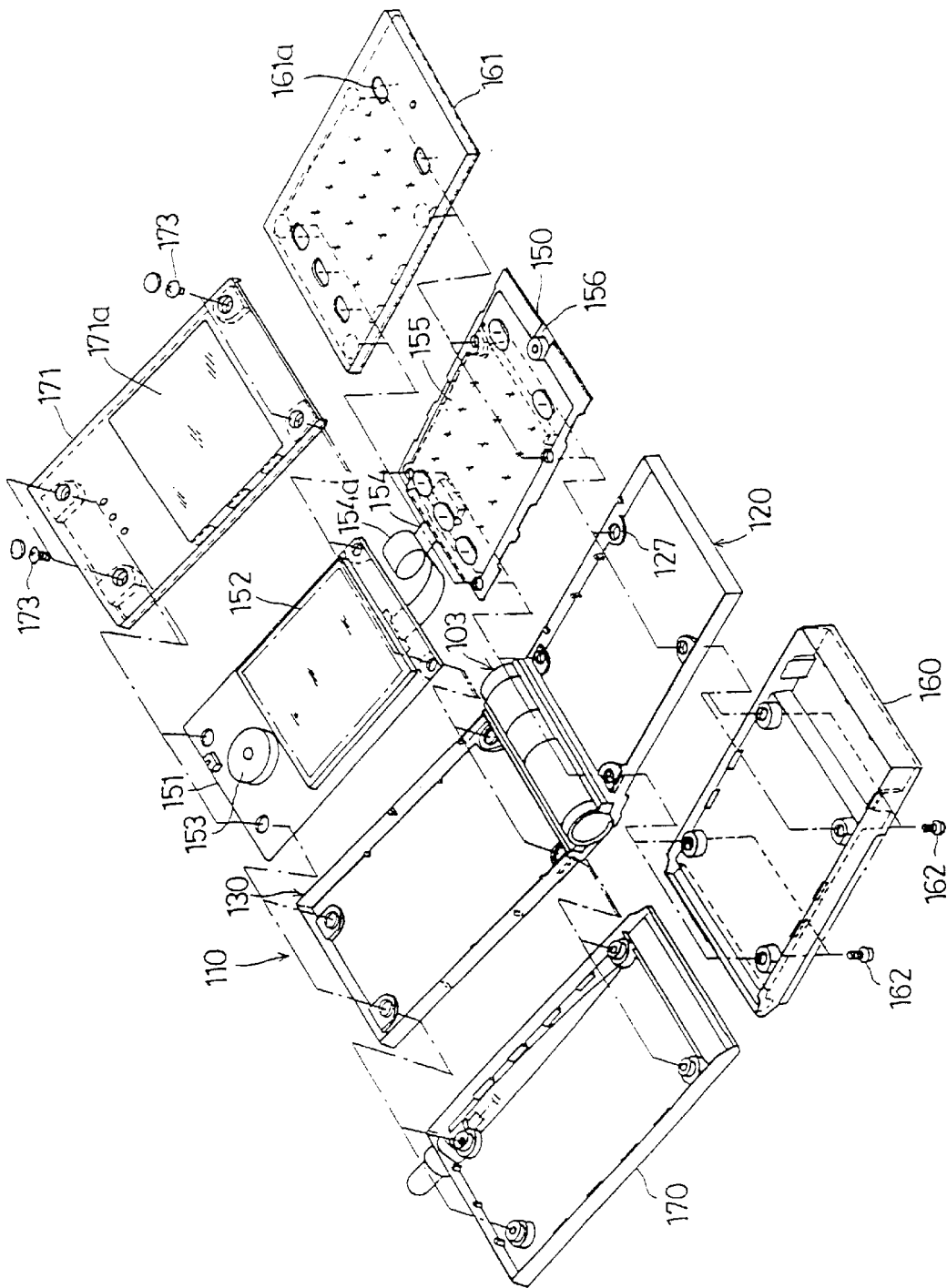

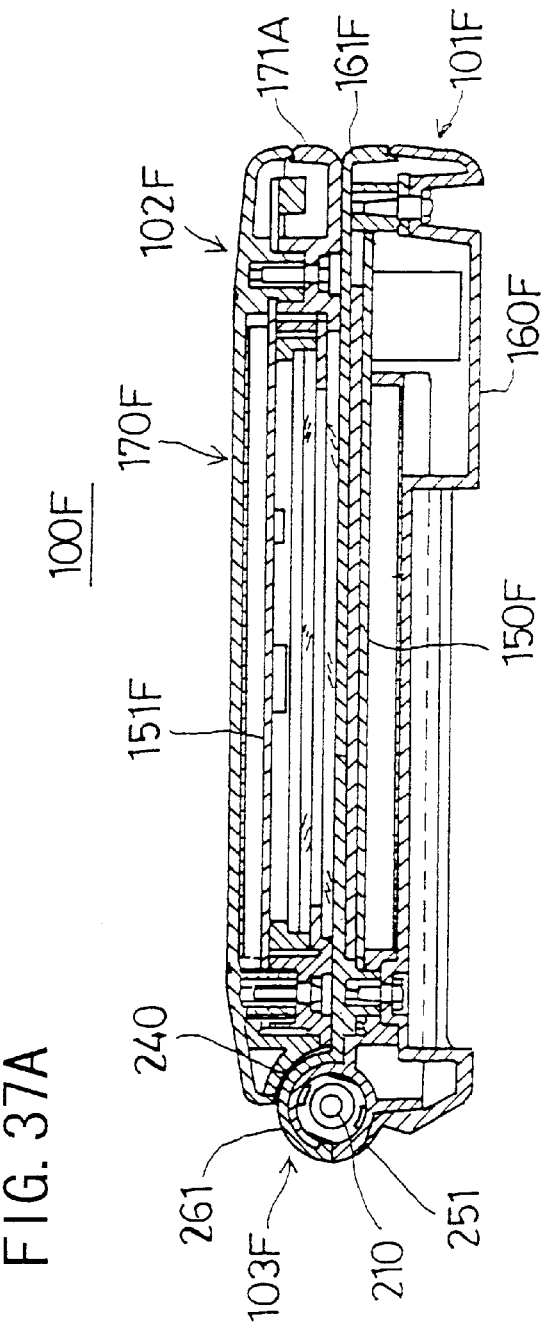
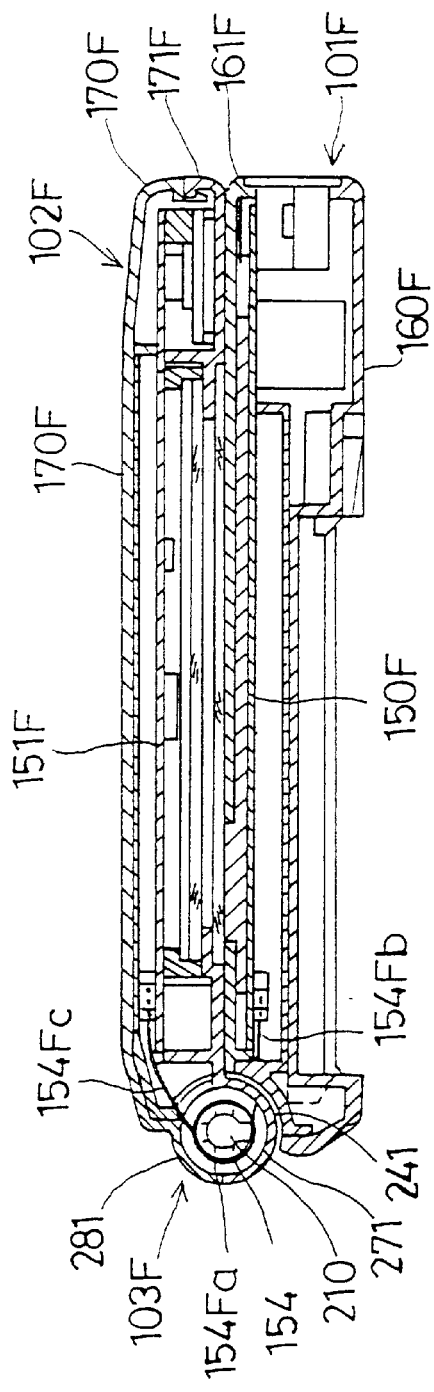
FIG. 37A
FIG. 37B

FOLDING-TYPE MOBILE TERMINAL HAVING A METAL HINGE, METAL CHASSIS AND SYNTHETIC-RESIN CASES

BACKGROUND OF THE INVENTION

1. Field of the Invention

The present invention generally relates to a folding-type mobile terminal and, more particularly, to a folding-type mobile terminal, such as a cellular phone, that is folded when carried (when standing by, when not in communication), and is opened when used to make a phone call or to communicate.

Cellular phones are categorized, in terms of structure, a folding-type cellular phone having a structure capable of being folded, and a so-called stick-type cellular phone having a structure not capable of being folded. The folding-type cellular phone needs to have a mechanical strength so as not to be deformed when handled without care as does the stick-type cellular phone. The folding-type cellular phone is also required to have a less weight.

2. Description of the Related Art

FIG. 1 is a perspective view of a conventional folding-type cellular phone (or a portable phone) 10 when disassembled, the cellular phone being devised to have an increased mechanical strength. FIG. 2A is an illustration of the conventional folding-type cellular phone 10 shown in FIG. 1 when used to make a phone call. FIG. 2B is an illustration of the conventional folding-type cellular phone 10 shown in FIG. 1 when being carried. The folding-type cellular phone 10 has an operation-key part 11 held by a user's hand 60 shown in FIG. 2A, a liquid-crystal part 12 to be opened and closed, and a hinge 13 coupling the operation-key part 11 and the liquid-crystal part 12. The operation-key part 11 has: a board unit 20 and a housing 21 combined together; and a printed-board module 22 incorporated inside the combined board unit 20 and the housing 21. The liquid-crystal part 12 has: a board unit 30 and a housing 31 combined together; and a printed-board module 32 incorporated inside the combined board unit 30 and the housing 31. A battery pack 40 is attached to the undersurface of the housing 21. The housing 21 has a deep recess 21a in the vicinity of the hinge 13. The folding-type cellular phone 10 is folded when carried, as shown in FIG. 2B, and is opened by the liquid-crystal part 12 being revolved when used to make a phone call or to communicate, as shown in FIG. 2A.

The housings 21 and 31 are molded components made of a synthetic resin. The board units 20 and 30 are painted die-cast components made of magnesium. The hinge 13 is composed of a circular-arc portion 20a protruding from an edge of the board unit 20, and a circular-arc portion 30a protruding from an edge of the board unit 30. The hinge 13 is also made of magnesium.

The folding-type cellular phone 10 has an increased mechanical strength by having the hinge 13 and the board units 20 and 30 made of magnesium. Magnesium is selected from among various metals because magnesium has a little weight.

Additionally, the folding-type cellular phone 10 has a built-in antenna 50. The built-in antenna 50 is located so as to be contained in the deep recess 21a of the housing 21 inside the operation-key part 11.

When the folding-type cellular phone 10 is opened as shown in FIG. 2A, the board units 20 and 30 form the front of the folding-type cellular phone 10. Therefore, stress is put upon the appearance in regard to the board units 20 and 30. For this reason, each of the board units 20 and 30 is completed as a final product by the following steps: retrieving a previous form of the board unit 20 or 30 from a metal die; taking out a gate; removing burrs; polishing the previous form when necessary; and painting the previous form.

Generally, a die-cast component made of magnesium tends to not only have more burrs, but also have a rough surface containing fine blowholes, compared with a die-cast component made of other metals. Therefore, before the step of painting, finishing steps, such as removing burrs and polishing, are required to be conducted. At this point, since the board units 20 and 30 form the front of the folding-type cellular phone 10, the board units 20 and 30 have large areas requiring the finishing steps. This inevitably increases the amount of work in the finishing steps.

Additionally, if the finishing steps are not adequately conducted, part of the painted surface becomes rough, and thus the board units 20 and 30 have poor appearances.

Further, in some cases, the board units 20 and 30 have smooth surfaces just after the painting step. However, in a heating step to strengthen the painted layer after the painting step, fine blowholes present in the surfaces of the board units 20 and 30 are inflated so that the board units 20 and 30 have inferior appearances with swellings in the painted layers thereof.

As described above, the board units 20 and 30 do not provide a good yield, and thus the conventional folding-type cellular phone 10 cannot be manufactured efficiently.

In addition, the conventional folding-type cellular phone 10 does not have a good property regarding the built-in antenna 50. Arranging metal boards so as to cover the built-in antenna 50 makes it difficult for the built-in antenna 50 to transmit electric waves, deteriorating the property of the built-in antenna 50. To prevent this, the built-in antenna 50 is placed in the deep recess 21a of the housing 21 so as to be kept as far as possible from the board units 20 and 30 made of magnesium. However, since the folding-type cellular phone 10 is thinned down so as to have a reduced thickness, it is difficult to sufficiently keep the built-in antenna 50 away from the board units 20 and 30 made of magnesium. Additionally, since the housing 21 composes the operation-key part 11, the deep recess 21a of the housing 21 is covered by the user's hand 60, as shown in FIG. 2A, when used to make a phone call. In this state, the user's hand 60 deteriorates the property of the built-in antenna 50.

SUMMARY OF THE INVENTION

It is a general object of the present invention to provide an improved and useful folding-type mobile terminal in which device the above-mentioned problems are eliminated.

A more specific object of the present invention is to provide a folding-type mobile terminal which can have an increased mechanical strength and can be manufactured with an increased efficiency.

In order to achieve the above-mentioned objects, there is provided according to one aspect of the present invention a folding-type mobile terminal comprising:

a first body having a first printed-board module inside thereof and having an input unit on a surface of the first body;

a second body having a second printed-board module inside thereof and having a display unit on a surface of the second body;

a hinge coupling the first body and the second body so that the folding-type mobile terminal is capable of being folded, the hinge being made of a metal;

a first metal chassis incorporated into the first body, the first metal chassis extending from the hinge; and a second metal chassis incorporated into the second body, the second metal chassis extending from the hinge, wherein the first body has the first printed-board module fixed to the first metal chassis, a first upper case-member fixed to the first metal chassis, and a first lower case-member fixed to the first metal chassis so that the first upper case-member and the first lower case-member together cover the first metal chassis, the first upper case-member and the first lower case-member being made of a synthetic resin, and the second body has the second printed-board module fixed to the second metal chassis, a second upper case-member fixed to the second metal chassis, and a second lower case-member fixed to the second metal chassis so that the second upper case-member and the second lower case-member together cover the second metal chassis, the second upper case-member and the second lower case-member being made of a synthetic resin.

According to the present invention, the metal hinge and the first and second bodies having the metal chassis as frames together contribute to enhancing a mechanical strength of the folding-type mobile terminal. Additionally, the case-members made of a synthetic resin cover the metal chassis so as not to expose the metal chassis on the surface of the bodies. Therefore, in manufacturing the metal chassis, the metal chassis do not require intricate finishing steps.

Additionally, in the folding-type mobile terminal according to the present invention, the first metal chassis may have a first shield board unit covering the first printed-board module, and the second metal chassis may have a second shield board unit covering the second printed-board module.

According to the present invention, since the shield boards are formed as unitary parts of the metal chassis, shield boards as independent components are not necessary.

Additionally, the folding-type mobile terminal according to the present invention may further comprise an interior antenna, wherein the first metal chassis has a length smaller than the first printed-board module, and the second metal chassis has a length smaller than the second printed-board module so that the interior antenna is provided outside the second metal chassis in the second body.

According to the present invention, since the interior antenna is provided outside the second metal chassis in the second body, the interior antenna is not likely to be influenced by the second metal chassis. Also, when the folding-type mobile terminal is folded, the interior antenna is not likely to be influenced by the first metal chassis either. Therefore, the interior antenna has a good property.

Additionally, the folding-type mobile terminal according to the present invention may further comprise an interior antenna, wherein the second metal chassis has a length smaller than the second printed-board module so that the interior antenna is provided outside the second metal chassis in the second body.

According to the present invention, since the interior antenna is provided outside the second metal chassis in the second body, the interior antenna is not likely to be influenced by the second metal chassis. Therefore, the interior antenna has a good property.

Additionally, in the folding-type mobile terminal according to the present invention, at least one of the first metal chassis and the second metal chassis may have a rib exposed on a side of one of the first body and the second body.

According to the present invention, when a user holds the folding-type mobile terminal by hand, the user's hand contacts the rib first. Thereby, when the user's body assumes a static electricity, the static electricity is discharged to ground patterns of the printed-board modules via the metal chassis. This prevents a current of the static electricity from flowing through an electronic circuit of the printed-board modules, and thus protects the electronic circuit of the printed-board modules.

Additionally, in the folding-type mobile terminal according to the present invention, the first metal chassis may have a length supporting an end portion of the first printed-board module, and the second metal chassis may have a length supporting an end portion of the second printed-board module.

According to the present invention, the first and second metal chassis are short, and thus can be manufactured at a low cost. The short first and second metal chassis also reduce a weight of the folding-type mobile terminal.

In order to achieve the above-mentioned objects, there is also provided according to another aspect of the present invention a folding-type mobile terminal comprising:

a first metal member having components providing functions of a mobile terminal fixed thereto;

a second metal member having components providing functions of a mobile terminal fixed thereto;

a hinge unit coupling the first metal member and the second metal member so that the first metal member and the second metal member are capable of being rotated relative to each other with the hinge unit as an axis, the hinge unit being formed by a first edge portion of the first metal member, a second edge portion of the second metal member and an axle passed through a space in the first edge portion and a space in the second edge portion; and resin members provided on both surfaces of the first metal member and the second metal member so as to cover the first metal member and the second metal member except the first edge portion and the second edge portion.

According to the present invention, parts of the first metal member and the second metal member covered with the resin members do not require finishing steps for surfaces.

In order to achieve the above-mentioned objects, there is also provided according to another aspect of the present invention a folding-type mobile terminal comprising:

a first metal member having components providing functions of a mobile terminal fixed thereto;

a second metal member having components providing functions of a mobile terminal fixed thereto;

a hinge unit coupling the first metal member and the second metal member so that the first metal member and the second metal member are capable of being rotated relative to each other with the hinge unit as an axis, the hinge unit being formed by a first edge portion of the first metal member, a second edge portion of the second metal member and an axle passed through a space in the first edge portion and a space in the second edge portion;

first synthetic resin members provided on both surfaces of the first metal member so as to cover the first metal member; and second synthetic resin members provided on both surfaces of the second metal member so as to cover the second metal member, wherein the first synthetic resin members include a cover portion partially covering a part of the hinge unit formed by the first edge portion, and the second synthetic resin members include a cover portion partially covering a part of the hinge unit formed by the second edge portion.

According to the present invention, the first and second metal members including parts of the metal hinge unit are not exposed to the surface of the folding-type mobile terminal, and thus do not substantially require finishing steps for appearances.

In order to achieve the above-mentioned objects, there is also provided according to another aspect of the present invention a folding-type mobile terminal comprising:

a first metal member having components providing functions of a mobile terminal fixed thereto;

a second metal member having components providing functions of a mobile terminal fixed thereto;

a hinge unit coupling the first metal member and the second metal member so that the first metal member and the second metal member are capable of being rotated relative to each other with the hinge unit as an axis, the hinge unit being formed by a first edge portion of the first metal member, a second edge portion of the second metal member and an axle passed through a space in the first edge portion and a space in the second edge portion;

first synthetic resin members provided on both surfaces of the first metal member so as to cover the first metal member; and second synthetic resin members provided on both surfaces of the second metal member so as to cover the second metal member, wherein the first synthetic resin members include a cover portion wholly covering a part of the hinge unit formed by the first edge portion, and the second synthetic resin members include a cover portion wholly covering a part of the hinge unit formed by the second edge portion.

According to the present invention, the first and second metal members including the whole metal hinge unit are not exposed to the surface of the folding-type mobile terminal, and thus do not substantially require finishing steps for appearances.

In order to achieve the above-mentioned objects, there is also provided according to another aspect of the present invention a folding-type mobile terminal comprising:

a first body having a first printed-board module inside thereof and having an input unit on a surface of the first body;

a second body having a second printed-board module inside thereof and having a display unit on a surface of the second body;

a hinge coupling the first body and the second body so that the folding-type mobile terminal is capable of being folded, the hinge being made of a metal;

a first metal chassis incorporated into the first body, the first metal chassis extending from the hinge; and a second metal chassis incorporated into the second body, the second metal chassis extending from the hinge, wherein, the first body has the first printed-board module fixed to the first metal chassis, a first upper case-member fixed to the first metal chassis, and a first lower case-member fixed to the first metal chassis so that the first upper case-member and the first lower case-member together cover the whole of the first metal chassis and a part of the hinge, the first upper case-member and the first lower case-member being made of a synthetic resin, the first upper case-member having a first upper chassis-cover portion and a first upper hinge-cover portion extending from the first upper chassis-cover portion, and the first lower case-member having a first lower chassis-cover portion and a first lower hinge-cover portion extending from the first lower chassis-cover portion so that the first upper chassis-cover portion and the first lower chassis-cover portion together cover the whole of the first metal chassis, and the first upper hinge-cover portion and the first lower hinge-cover portion together cover the part of the hinge, and the second body has the second printed-board module fixed to the second metal chassis, a second upper case-member fixed to the second metal chassis, and a second lower case-member fixed to the second metal chassis so that the second upper case-member and the second lower case-member together cover the whole of the second metal chassis and the other part of the hinge, the second upper case-member and the second lower case-member being made of a synthetic resin, the second upper case-member having a second upper chassis-cover portion and a second upper hinge-cover portion extending from the second upper chassis-cover portion, and the second lower case-member having a second lower chassis-cover portion and a second lower hinge-cover portion extending from the second lower chassis-cover portion so that the second upper chassis-cover portion and the second lower chassis-cover portion together cover the whole of the second metal chassis, and the second upper hinge-cover portion and the second lower hinge-cover portion together cover the other part of the hinge.

According to the present invention, the first and second metal chassis and the metal hinge are not exposed to the surface of the first and second bodies, and thus do not substantially require finishing steps for appearances.

Additionally, in the folding-type mobile terminal according to the present invention, a second edge portion of the second lower chassis-cover portion near to the second lower hinge-cover portion may adjoin a first edge portion of the first lower chassis-cover portion near to the first lower hinge-cover portion when the first body and the second body are opened to positions for making a communication, and at least one of the first edge portion and the second edge portion may be formed as a wall undergoing an elastic deformation from an original shape thereof when being pushed so that, when a pushing force acts on the first body and the second body so as to open the first body and the second body further, the first body and the second body are opened further by the wall undergoing an elastic deformation, and when the pushing force is removed, the first body and the second body are returned to the positions for making a communication by the wall returning to the original shape.

According to the present invention, the hinge does not need to incorporate a spring that deforms when the first body and the second body are opened further beyond the positions for making a communication. Therefore, the hinge can have a simple structure and a small diameter.

Additionally, the folding-type mobile terminal according to the present invention may further comprise a spring member incorporated inside of the wall.

According to the present invention, the spring member helps the elastically deformed wall return to the original shape.

Additionally, in the folding-type mobile terminal according to the present invention, the first upper hinge-cover portion may have an upper sidewall covering a part of a side-end surface of the hinge, and the first lower hinge-cover portion may have a lower sidewall covering the other part of the side-end surface of the hinge so that the upper sidewall and the lower sidewall cover the side-end surface of the hinge.

According to the present invention, a cover exclusively used for covering a side-end surface of a hinge becomes unnecessary.

Other objects, features and advantages of the present invention will become more apparent from the following detailed description when read in conjunction with the accompanying drawings.

BRIEF DESCRIPTION OF THE DRAWINGS

FIG. 4A is a cross-sectional view of the folding-type cellular phone shown in FIG. 3A;

FIG. 4B is a cross-sectional view of the folding-type cellular phone shown in FIG. 3B;

FIG. 5 is a perspective view of the folding-type cellular phone shown in FIG. 3B when disassembled;

FIG. 37A is a cross-sectional view of the folding-type cellular phone taken along a line A—A shown in FIG. 32A;

FIG. 37B is a cross-sectional view of the folding-type cellular phone taken along a line B—B shown in FIG. 32A;

DETAILED DESCRIPTION OF THE PREFERRED EMBODIMENTS

A description will now be given, with reference to the drawings, of embodiments according to the present invention.

1. First Embodiment

Figure 1:
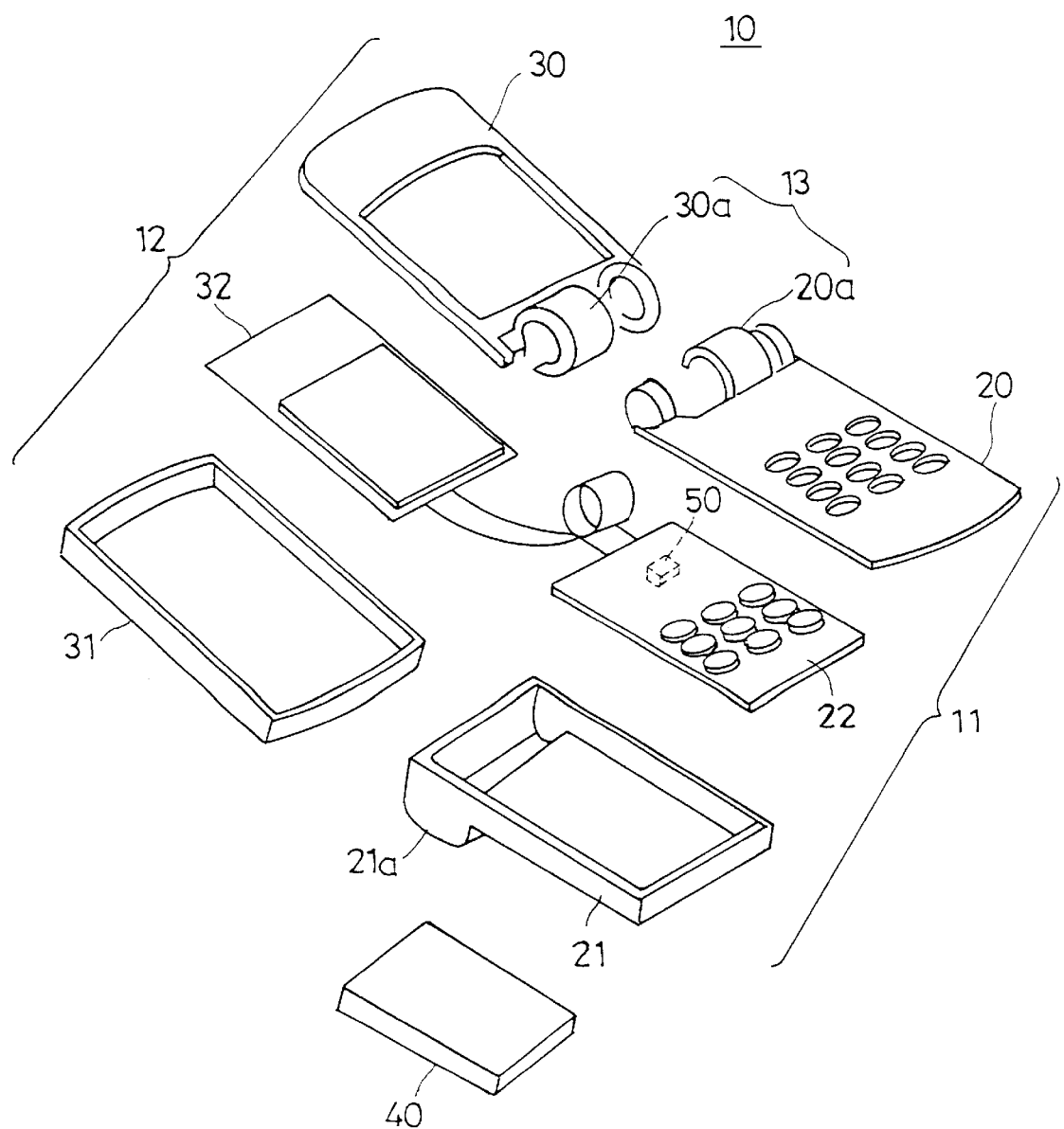
FIG. 1 is a perspective view of a conventional folding-type cellular phone when disassembled.
Figure 2A:
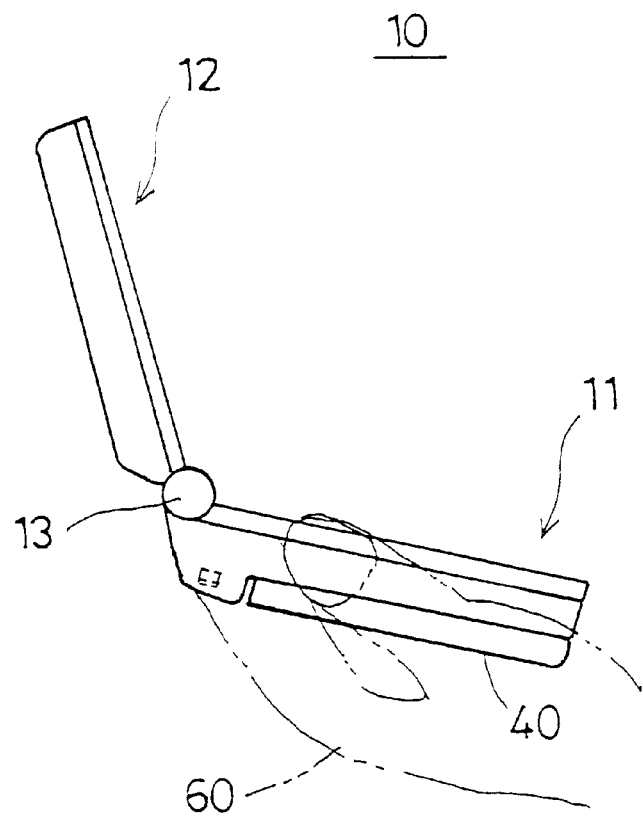
FIG. 2A is an illustration of the conventional folding-type cellular phone shown in FIG. 1 when used to make a phone call.
Figure 2B:
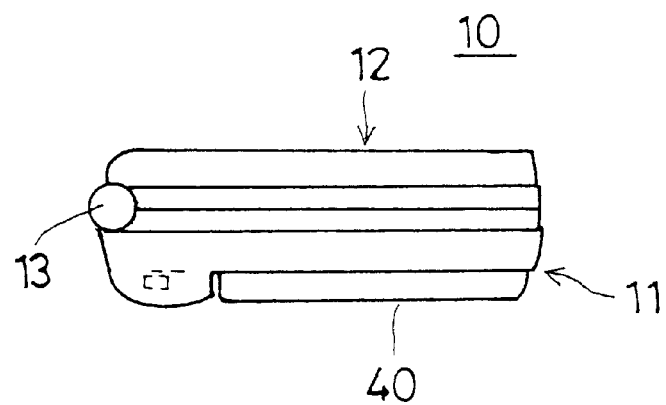
FIG. 2B is an illustration of the conventional folding-type cellular phone shown in FIG. 1 when carried.
Figure 3A:
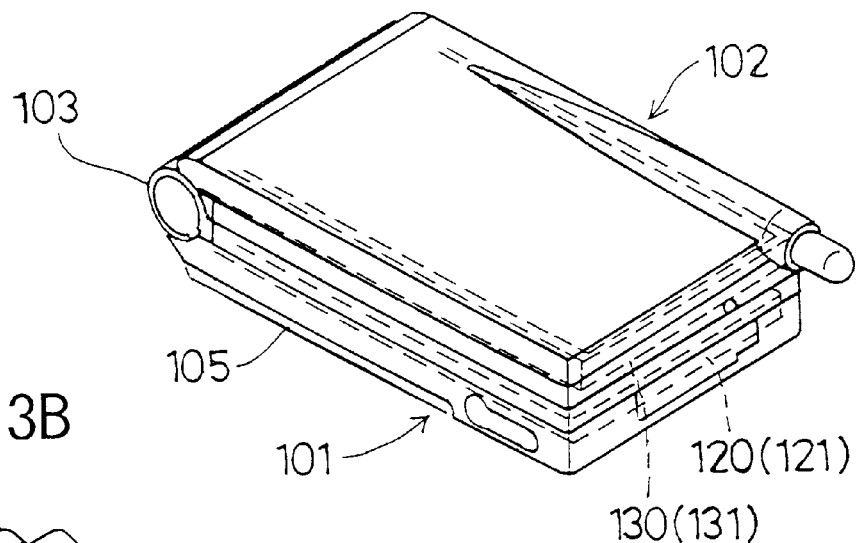
FIG. 3A is a perspective view of a folding-type cellular phone (or a portable phone) according to a first embodiment of the present invention when carried.
Figure 3B:
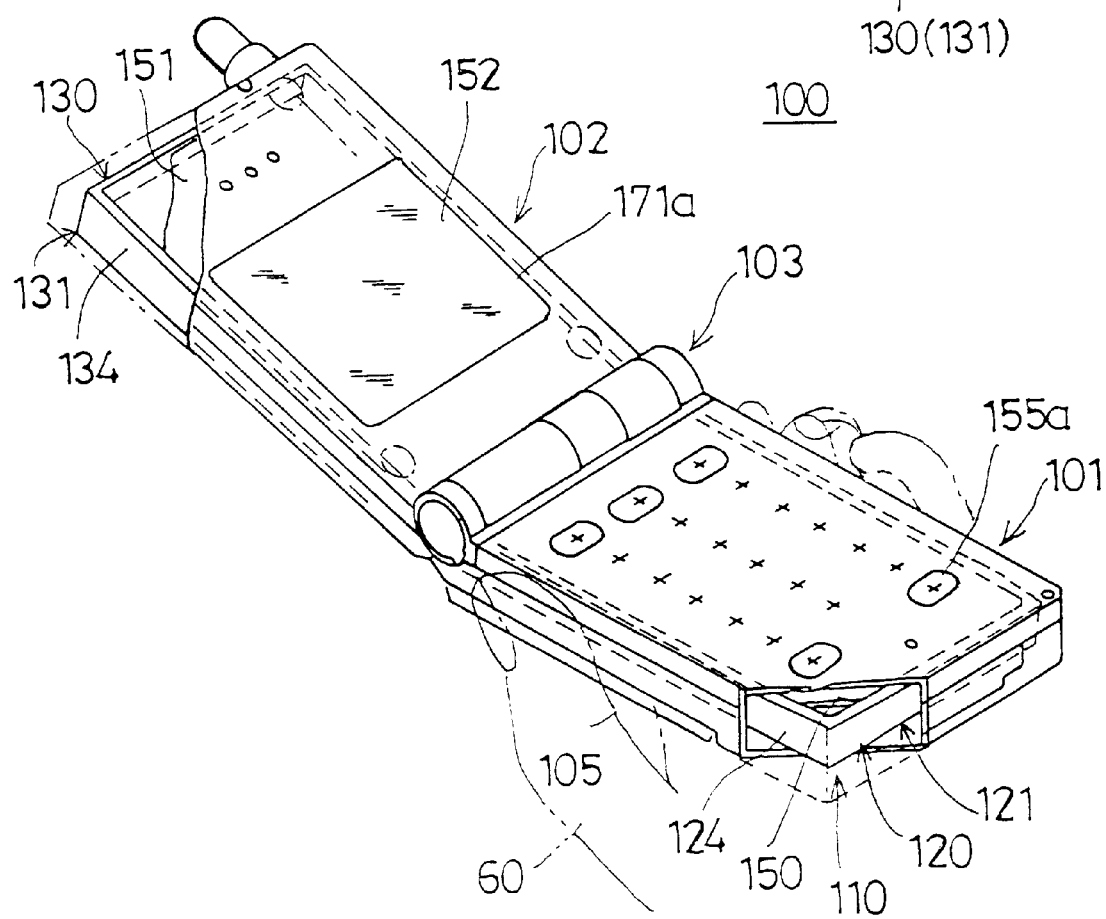
FIG. 3B is a perspective view of the folding-type cellular phone shown in FIG. 3A when used to make a phone call.
Figure 6:
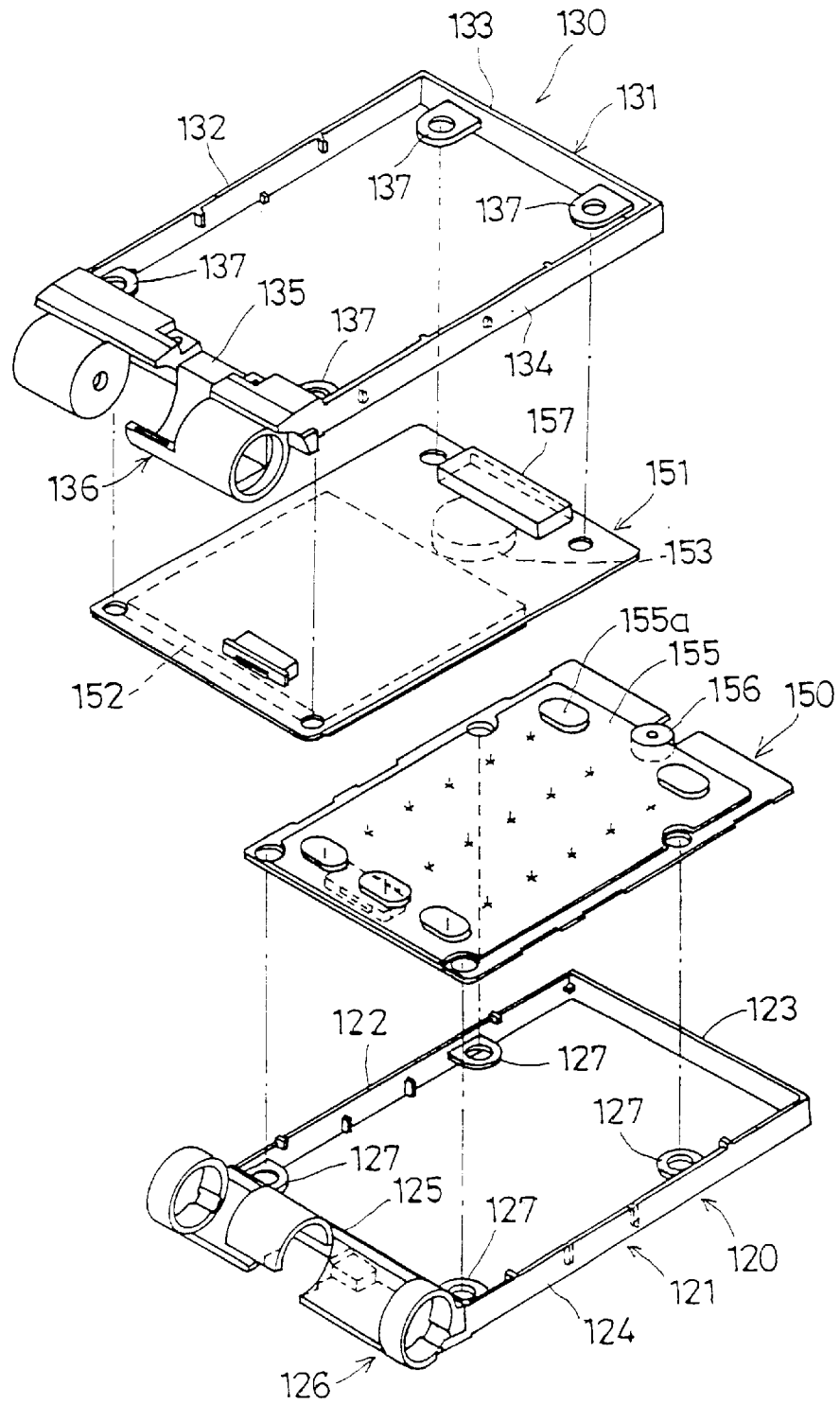
FIG. 6 is a perspective view of chassis and printed-board modules shown in FIG. 5.
Figure 7:
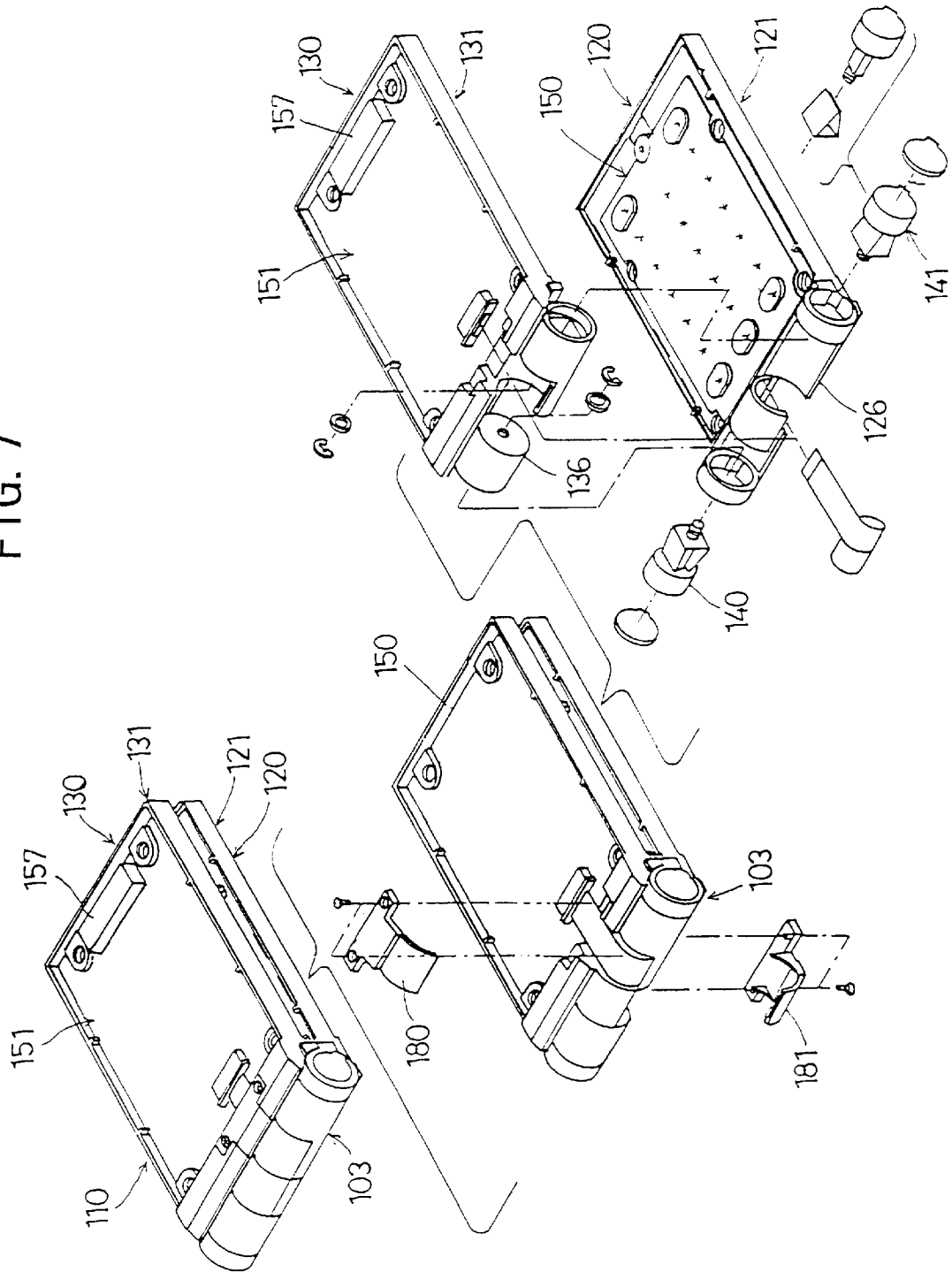
FIG. 7 is a perspective view of a chassis assembly incorporating the printed-board modules shown in FIG. 6.

FIG. 3A is a perspective view of a folding-type cellular phone (or a portable phone) 100 according to a first embodiment of the present invention when carried. FIG. 3B is a perspective view of the folding-type cellular phone 100 shown in FIG. 3A when used to make a phone call. FIG. 4A is a cross-sectional view of the folding-type cellular phone 100 shown in FIG. 3A. FIG. 4B is a cross-sectional view of the folding-type cellular phone 100 shown in FIG. 3B. FIG. 5 is a perspective view of the folding-type cellular phone 100 shown in FIG. 3B when disassembled. FIG. 6 is a perspective view of chassis and printed-board modules shown in FIG. 5. FIG. 7 is a perspective view of a chassis assembly incorporating the printed-board modules shown in FIG. 6. The folding-type cellular phone 100 is an example of a mobile terminal.

The folding-type cellular phone 100 comprises: an operation-key part 101 including input keys for inputting a telephone number, etc.; a liquid-crystal display part 102 including a display for displaying a standby screen, and a dialed/received telephone number, etc.; and a hinge 103 coupling the operation-key part 101 and the liquid-crystal display part 102. A battery pack 105 is attached to the undersurface of the operation-key part 101. The folding-type cellular phone 100 is folded as shown in FIG. 3A and FIG. 4A when carried. When used to make a phone call or communicate, the folding-type cellular phone 100 is held by the user's hand 60 and is opened by the liquid-crystal display part 102 being revolved, for example, manually around the hinge 103 as shown in FIG. 3B and FIG. 4B.

A chassis assembly 110, as shown in FIG. 6 and FIG. 7, comprises an operation-key part chassis 120 and a liquid-crystal display part chassis 130 combined together. The operation-key part chassis 120 and the liquid-crystal display part chassis 130 are die-cast components made of magnesium. The operation-key part chassis 120 comprises: a frame unit 121 formed by four side frames 122 to 125, the frame unit 121 having a substantially rectangular shape, such as a square; a circular-arc overhang portion 126 overhanging from the side frame 125 to the outside of the frame unit 121; and a plurality of flanges 127 jutting to the inside of the frame unit 121. The inside of the frame unit 121 is an opening. The liquid-crystal display part chassis 130, as does the operation-key part chassis 120, comprises: a frame unit 131 formed by four side frames 132 to 135, the frame unit 131 having a substantially rectangular shape, such as a square; a circular-arc overhang portion 136 overhanging from the side frame 135 to the outside of the frame unit 131; and a plurality of flanges 137 jutting to the inside of the frame unit 131. The inside of the frame unit 131 is an opening. The overhang portions 126 and 136 may have a shape other than the circular-arc, if the shape can form a hinge.

As shown in FIG. 7, the operation-key part chassis 120 and the liquid-crystal display part chassis 130 are unified by combining the circular-arc overhang portion 126 and the circular-arc overhang portion 136 and inserting two hinge modules 140 and 141 into the combined circular-arc overhang portions 126 and 136. The combined circular-arc overhang portions 126 and 136, two auxiliary cover members 180 and 181, and the two hinge modules 140 and 141 together form the hinge 103. The hinge module 140 elastically holds the operation-key part 101 closed. The hinge module 141 elastically holds the operation-key part 101 opened. The hinge modules 140 and 141 form the axle of the hinge 103. The substantially whole of the hinge 103 is made of magnesium. The reason why magnesium is selected as a substance is that, although magnesium is three times as heavy as synthetic resin, the magnesium is five times as strong as the synthetic resin, providing an increased mechanical strength without remarkably increasing a weight.

As above, the chassis assembly 110 comprises the operation-key part chassis 120 and the liquid-crystal display part chassis 130 coupled together by the hinge 103.

A printed-board module 150 for the operation-key part 101 is smaller in size than the frame unit 121, and has a keypad 155 in the form of a rubber plate, and a microphone 156, on the front. A printed-board module 151 for the liquid-crystal display part 102 is smaller in size than the frame unit 131, and has a liquid-crystal display 152 and a speaker 153 on the front, and has an interior antenna 157 on the back. The printed-board module 150 and the printed-board module 151 are connected by a flexible cable 154 having a loop 154a in the middle. The loop 154a is contained within the hinge 103.

A lower case-member 160 and an upper case-member 161 for the operation-key part 101 are larger in size than the frame unit 121, and are molded components made of synthetic resin. A lower case-member 170 and an upper case-member 171 for the liquid-crystal display part 102 are larger in size than the frame unit 131, and are molded components made of synthetic resin.

The operation-key part 101 is assembled by: placing and temporarily fixing the printed-board module 150 on the flanges 127 of the frame unit 121 of the operation-key part chassis 120; combining the lower case-member 160 and the upper case-member 161 so as to cover the frame unit 121; and fixing the lower case-member 160 and the upper case-member 161 by screws 162. The frame unit 121 and the printed-board module 150 are screwed to each other. The frame unit 121 is contained within the operation-key part 101. Each of key tops 155a is exposed from a corresponding opening 161a of the case-member 161.

The liquid-crystal display part 102 is assembled by: placing and temporarily fixing the printed-board module 151 on the flanges 137 of the frame unit 131 of the liquid-crystal display part chassis 130; combining the lower case-member 170 and the upper case-member 171 so as to cover the frame unit 131; and fixing the lower case-member 170 and the upper case-member 171 by screws 172. The frame unit 131 and the printed-board module 151 are screwed to each other. The frame unit 131 is contained within the liquid-crystal display part 102. The liquid-crystal display 152 is exposed through a transparent window 171a of the upper case-member 171. The interior antenna 157 is placed in a space between the printed-board module 151 and the lower case-member 170.

The folding-type cellular phone 100 having the above-described structure has the following features.

(1) The folding-type cellular phone 100 has the chassis assembly 110 made of magnesium as a frame so as to have a sufficient mechanical strength due to the chassis assembly 110.

(2) The frame unit 121 is covered by the lower case-member 160 and the upper case-member 161, and the frame unit 131 is covered by the lower case-member 170 and the upper case-member 171 so that the frame unit 121 and the frame unit 131 are not exposed to the surface of the folding-type cellular phone 100. Therefore, in regard to the operation-key part chassis 120 and the liquid-crystal display part chassis 130 which are die-cast components made of magnesium, it does not matter whether defects are present on the surfaces of the frame unit 121 and the frame unit 131. Therefore, after retrieving the operation-key part chassis 120 or the liquid-crystal display part chassis 130 from a metal die in a manufacturing process thereof, the frame unit 121 or the frame unit 131 does not require finishing steps for appearances, such as removing burrs and polishing the surface. The finishing steps for appearances only need to be conducted for the circular-arc overhang portions 126 and 136 which are exposed to the surface of the folding-type cellular phone 100. This simplifies the finishing steps for appearances. Additionally, roughness of a surface generally stands out when the surface is flat, and does not stand out when the surface is curved. In the present embodiment, the circular-arc overhang portions 126 and 136 have curved surfaces, and thus roughness of the surfaces does not stand out. This further simplifies the finishing steps for appearances, and decreases the chance of yielding inferior products in appearance. Also, painting only needs to be conducted for the circular-arc overhang portions 126 and 136 and the vicinity thereof, not for the frame units 121 and 131. Therefore, the operation-key part chassis 120 and the liquid-crystal display part chassis 130 only require the simplified finishing steps, and are manufactured with a good yield rate. Consequently, the folding-type cellular phone 100 can be manufactured more efficiently at a lower cost than a conventional folding-type cellular phone.

(3) Since the liquid-crystal display part chassis 130 has a shape of the frame unit 131 that does not cover the interior antenna 157, the liquid-crystal display part chassis 130 puts little influence on a property of the interior antenna 157. Also because the interior antenna 157 is placed, not within the operation-key part 101, but within the liquid-crystal display part 102, the interior antenna 157 is least likely to be covered by the user's hand 60 in a key operation and other operations when used to make a phone call or communicate. Therefore, the folding-type cellular phone 100 has a better property regarding the interior antenna 157 than a conventional folding-type cellular phone.

(4) The surfaces of the operation-key part 101 and the liquid-crystal display part 102 are formed by the lower case-members 160 and 170 and the upper case-members 161 and 171 which are molded components made of synthetic resin. Since such molded components made of synthetic resin have good and precise appearances and are easy to be colored, the folding-type cellular phone 100 can have a good appearance.

2. Second Embodiment

Figure 8A:
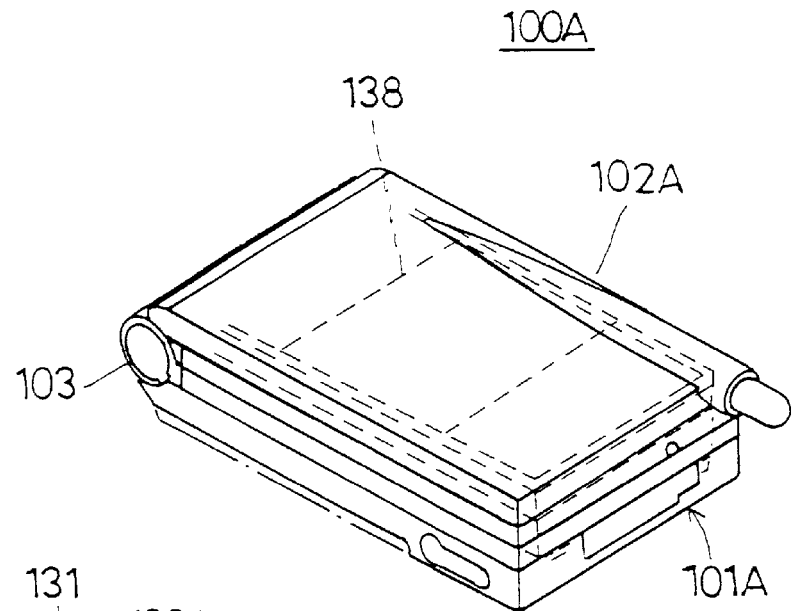
FIG. 8A is a perspective view of a folding-type cellular phone according to a second embodiment of the present invention when folded.
Figure 8B:
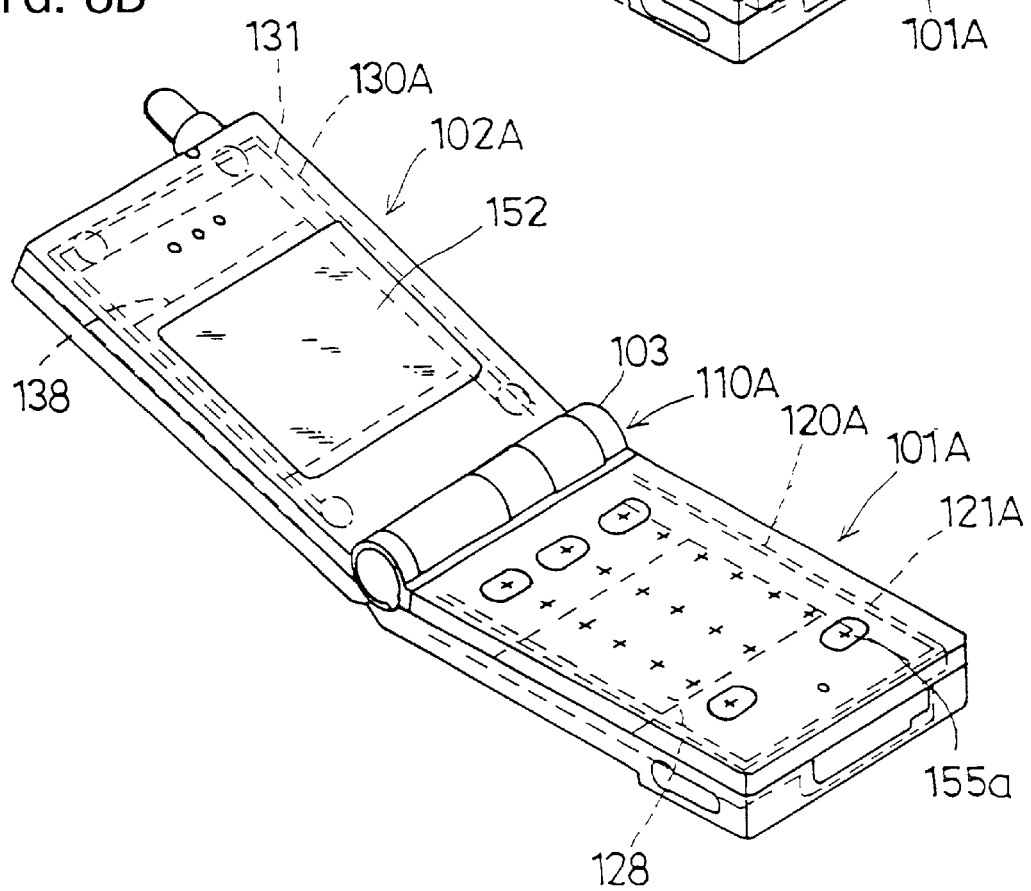
FIG. 8B is a perspective view of the folding-type cellular phone shown in FIG. 8A when opened.
Figure 9:
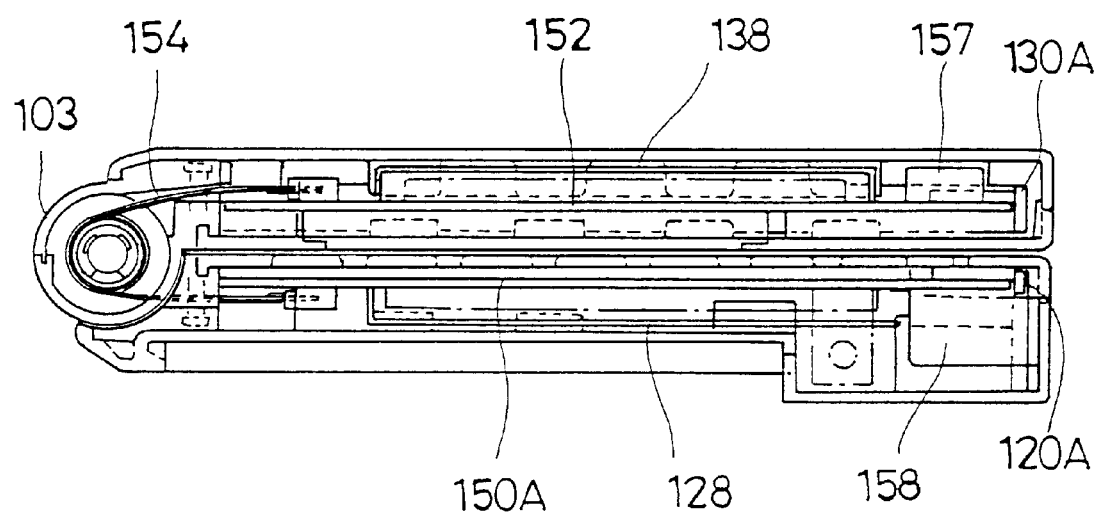
FIG. 9 is a cross-sectional view of the folding-type cellular phone shown in FIG. 8A.
Figure 10:
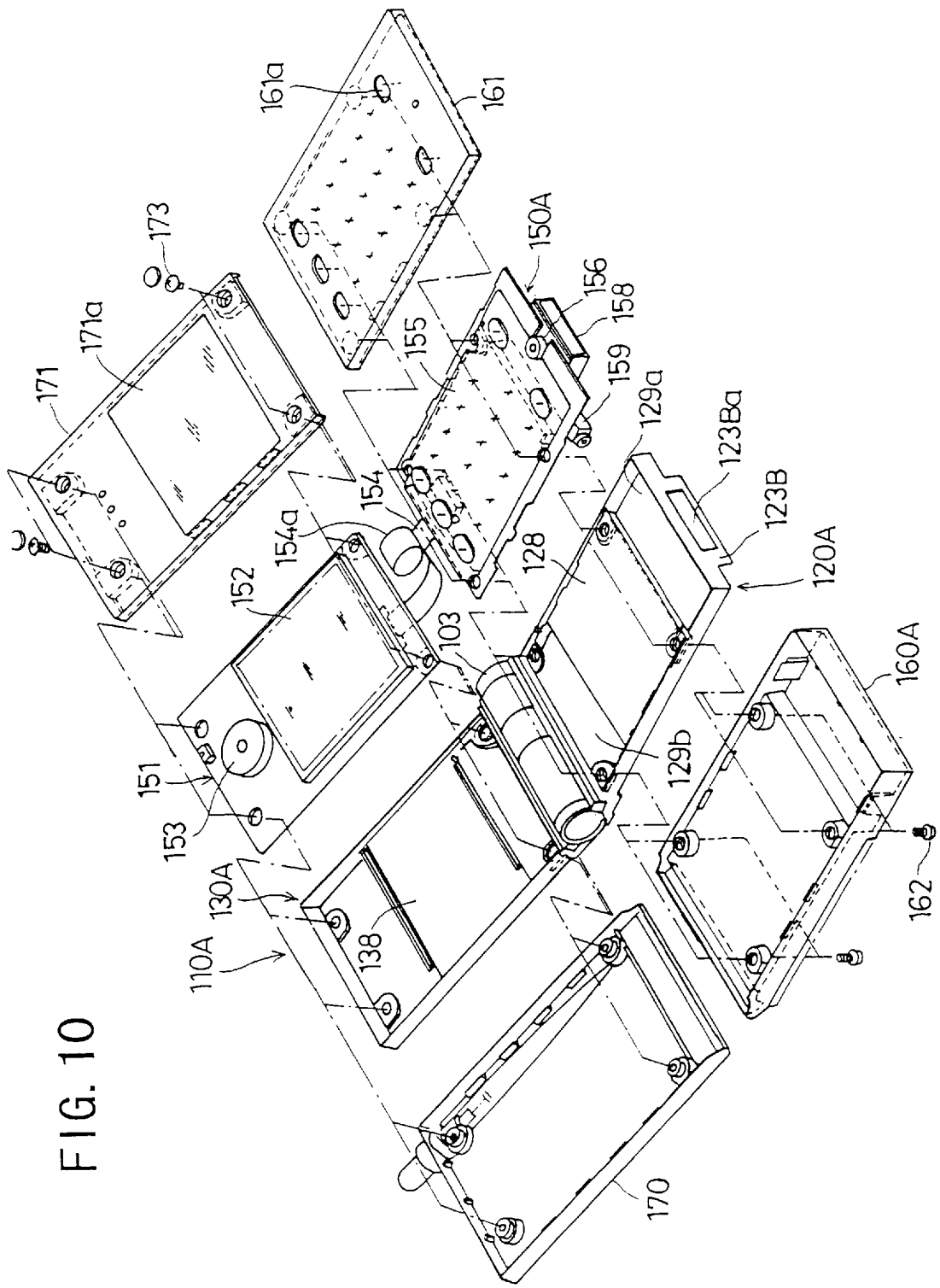
FIG. 10 is a perspective view of the folding-type cellular phone shown in FIG. 8B when disassembled.
Figure 11:
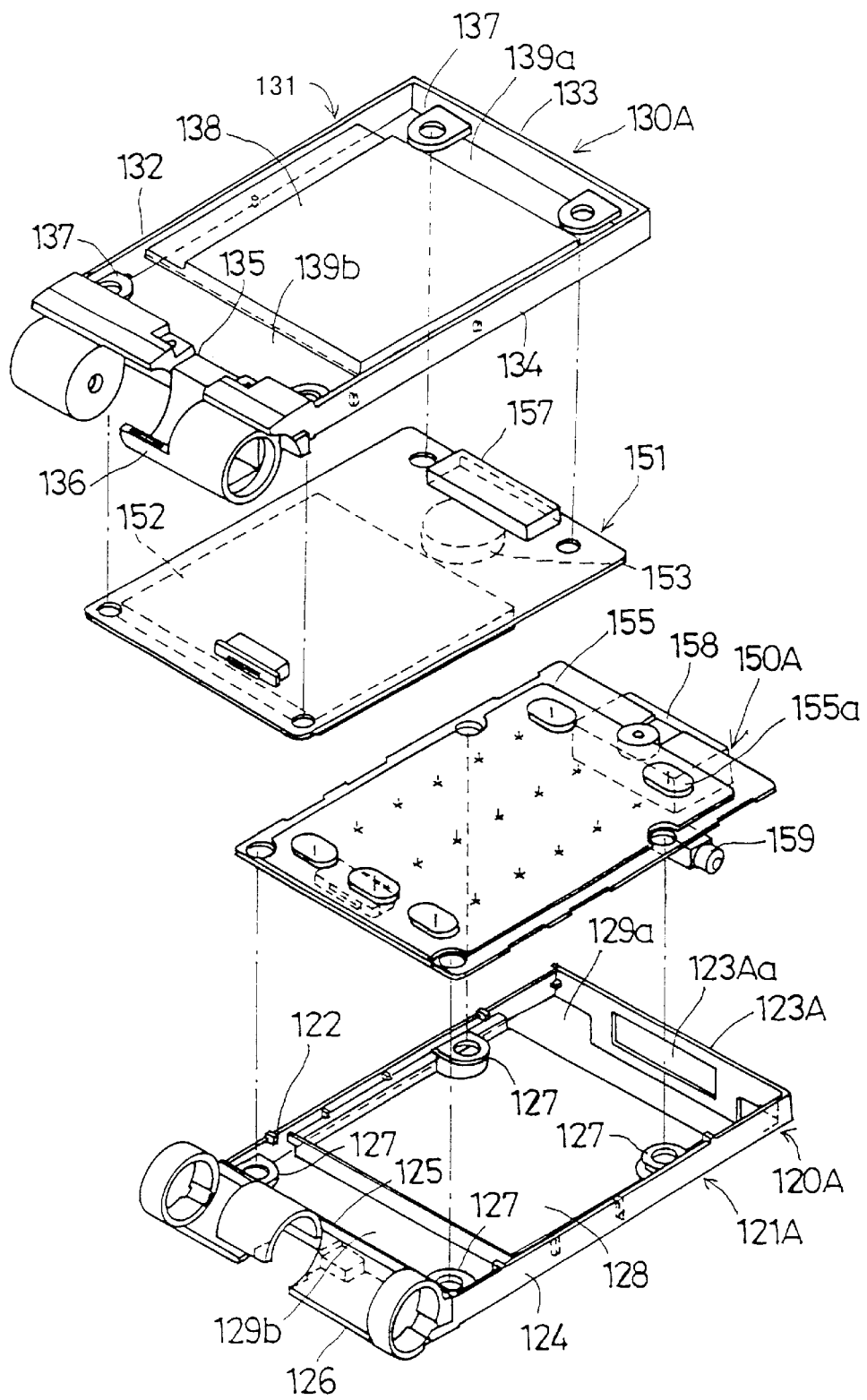
FIG. 11 is a perspective view of chassis and printed-board modules shown in FIG. 10.
Figure 12:
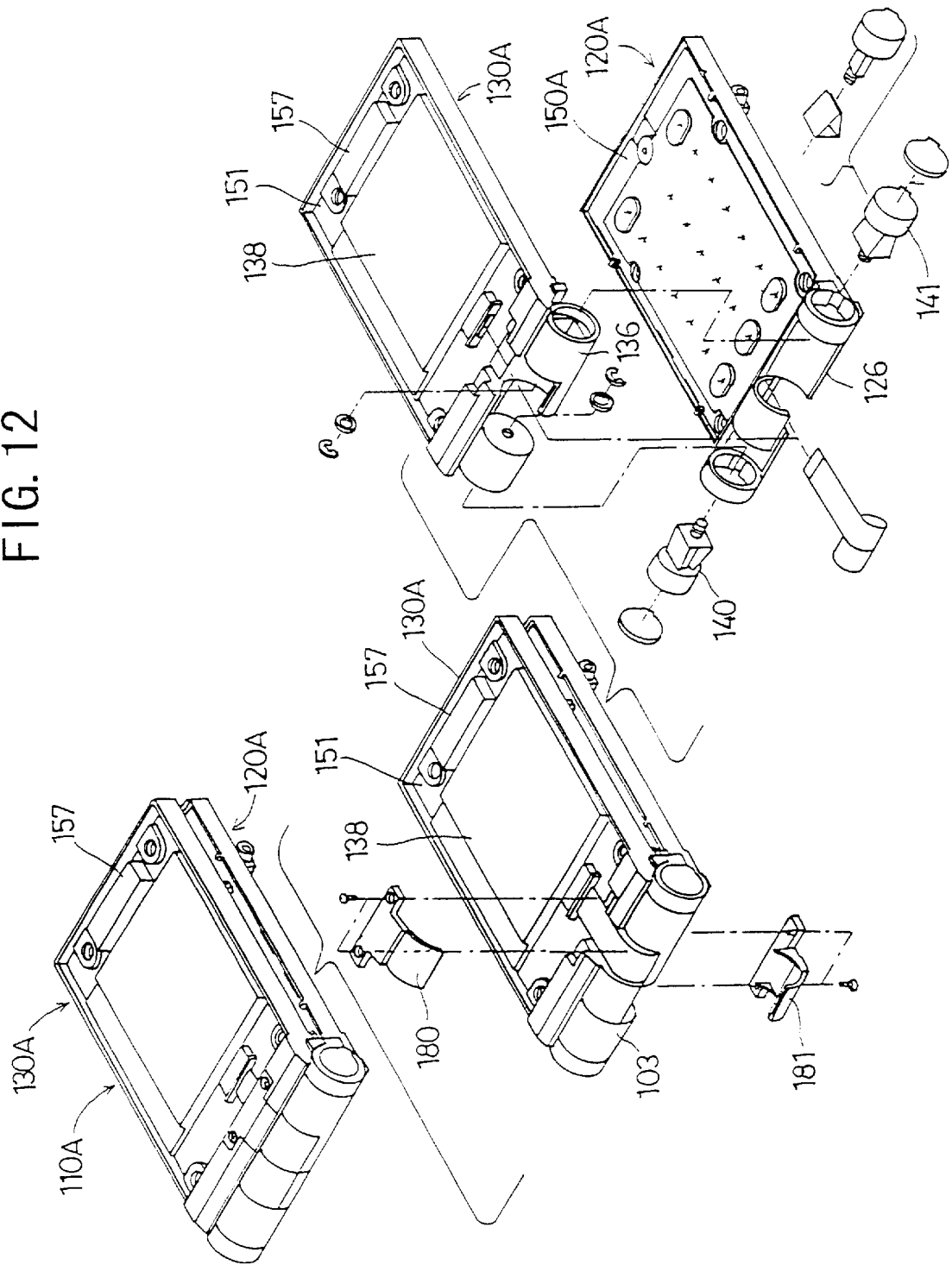
FIG. 12 is a perspective view of a chassis assembly incorporating the printed-board modules shown in FIG. 11.

FIG. 8A is a perspective view of a folding-type cellular phone 100A according to a second embodiment of the present invention when folded. FIG. 8B is a perspective view of the folding-type cellular phone 100A shown in FIG. 8A when opened. FIG. 9 is a cross-sectional view of the folding-type cellular phone 100A shown in FIG. 8A. FIG. 10 is a perspective view of the folding-type cellular phone 100A shown in FIG. 8B when disassembled. FIG. 11 is a perspective view of chassis and printed-board modules shown in FIG. 10. FIG. 12 is a perspective view of a chassis assembly incorporating the printed-board modules shown in FIG. 11.

The folding-type cellular phone 100A has a structure different from the folding-type cellular phone 100 shown in FIG. 3A and FIG. 3B mainly in regard to the chassis assembly 110. A chassis assembly 110A of the folding-type cellular phone 100A has a structure in which each of an operation-key part chassis and a liquid-crystal display part chassis unitarily has a shield board unit. Elements in FIG. 8A to FIG. 12 that are identical or equivalent to the elements shown in FIG. 3A to FIG. 7 are referenced by the same reference marks. The folding-type cellular phone 100A comprises an operation-key part 101A and a liquid-crystal display part 102A coupled by the hinge 103.

The chassis assembly 110A, as shown in FIG. 8A to FIG. 12, comprises an operation-key part chassis 120A and a liquid-crystal display part chassis 130A combined together. As shown in FIG. 11, the operation-key part chassis 120A comprises: a frame unit 121A formed by the four side frames 122 to 125 including a side frame 123A in place of the side frame 123 shown in FIG. 6; the circular-arc overhang portion 126 overhanging from the side frame 125 to the outside of the frame unit 121A; a plurality of the flanges 127 jutting to the inside of the frame unit 121A; and a shield board unit 128 lying across between the opposing side frames 122 and 124 both extending in a longitudinal direction of the frame unit 121A. The shield board unit 128 has approximately half the length of the frame unit 121A in the longitudinal direction, and is placed in the middle of the frame unit 121A in the longitudinal direction. Accordingly, an open window 129a is formed between the shield board unit 128 and the side frame 123A, and an open window 129b is formed between the shield board unit 128 and the side frame 125. The side frame 123A has an opening 123Aa for an I/F connector 158.

The liquid-crystal display part chassis 130A, as does the operation-key part chassis 120A, comprises: the frame unit 131 formed by the four side frames 132 to 135; the circular-arc overhang portion 136 overhanging from the side frame 135 to the outside of the frame unit 131; a plurality of the flanges 137 jutting to the inside of the frame unit 131; and a shield board unit 138 lying across between the opposing side frames 132 and 134 both extending in a longitudinal direction of the frame unit 131. The shield board unit 138 is placed in the middle of the frame unit 131 in the longitudinal direction. Accordingly, an open window 139a is formed between the shield board unit 138 and the side frame 133, and an open window 139b is formed between the shield board unit 138 and the side frame 135. The chassis assembly 110A has the operation-key part chassis 120A and the liquid-crystal display part chassis 130A coupled by the hinge 103.

A printed-board module 150A has the I/F connector 158 and a jack 159 in addition to the structure of the printed-board module 150 shown in FIG. 6.

As shown in FIG. 9 to FIG. 11, the operation-key part 101A is a structure in which the printed-board module 150A is placed and fixed on the frame unit 121A of the operation-key part chassis 120A, and a lower case-member 160A and the upper case-member 161 are fixed to the frame unit 121A so as to cover the printed-board module 150A. The flanges 127 are electrically connected to a ground pattern (not shown in the figures) of the printed-board module 150A. The middle part of the printed-board module 150A is covered by the shield board unit 128, and is contained and shielded in a space between the ground pattern (not shown in the figures) of the printed-board module 150A and the shield board unit 128.

Likewise, as shown in FIG. 9 to FIG. 11, the liquid-crystal display part 102A is a structure in which the printed-board module 151 is placed and fixed on the frame unit 131 of the liquid-crystal display part chassis 130A, and the lower case-member 170 and the upper case-member 171 are fixed to the frame unit 131 so as to cover the printed-board module 151. The flanges 137 are electrically connected to a ground pattern (not shown in the figures) of the printed-board module 151. The middle part of the printed-board module 151 is covered by the shield board unit 138, and is contained and shielded in a space between the ground pattern (not shown in the figures) of the printed-board module 151 and the shield board unit 138. It should be noted that each of the shield board units 128 and 138 is preferred to have a shape matching a shape of the corresponding printed-board module, and accordingly, a position of each of the shield board units 128 and 138 is not limited to the middle of the frame unit.

The folding-type cellular phone 100A having the above-described structure has the following feature in addition to the above-mentioned features of the folding-type cellular phone 100.

(1) Since the operation-key part chassis 120A unitarily has the shield board unit 128, and the liquid-crystal display part chassis 130A unitarily has the shield board unit 138, independent shield boards covering the printed-board module 150A and the printed-board module 151 are unnecessary.

3. Third Embodiment

Figure 13A:
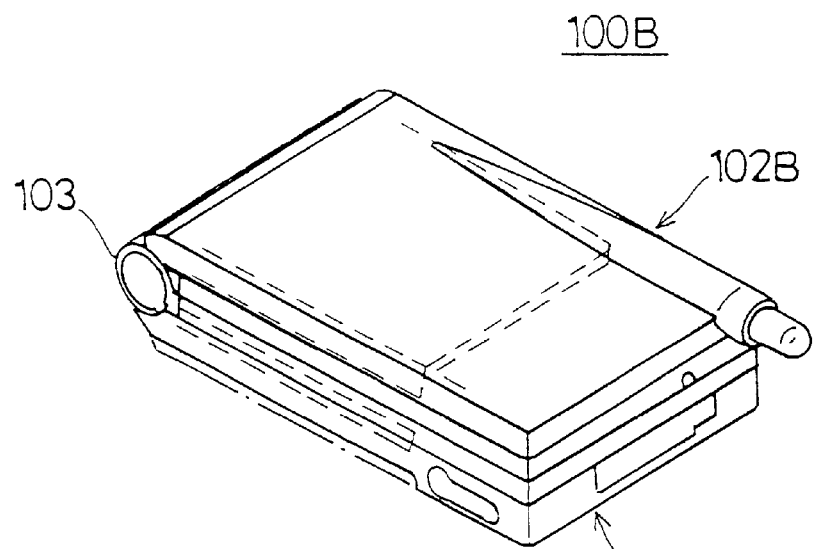
FIG. 13A is a perspective view of a folding-type cellular phone according to a third embodiment of the present invention when folded.
Figure 13B:
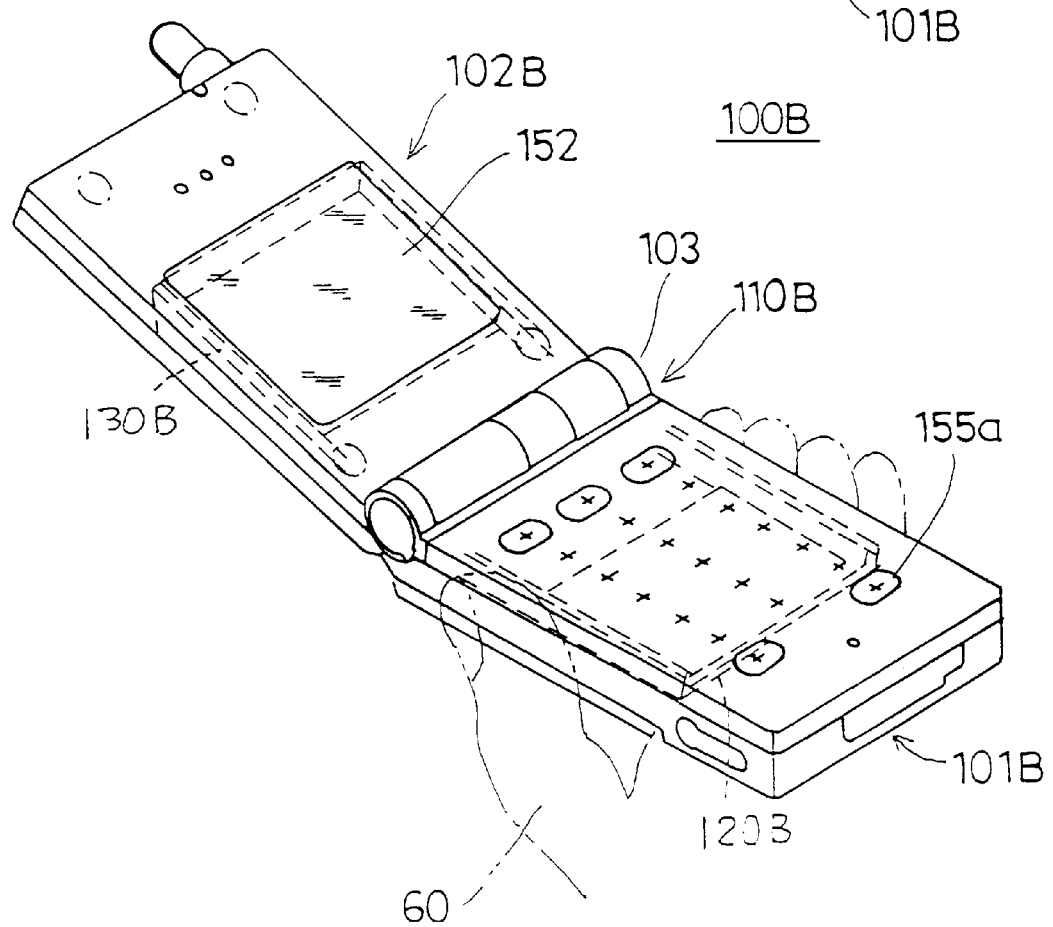
FIG. 13B is a perspective view of the folding-type cellular phone shown in FIG. 13A when opened.
Figure 14:
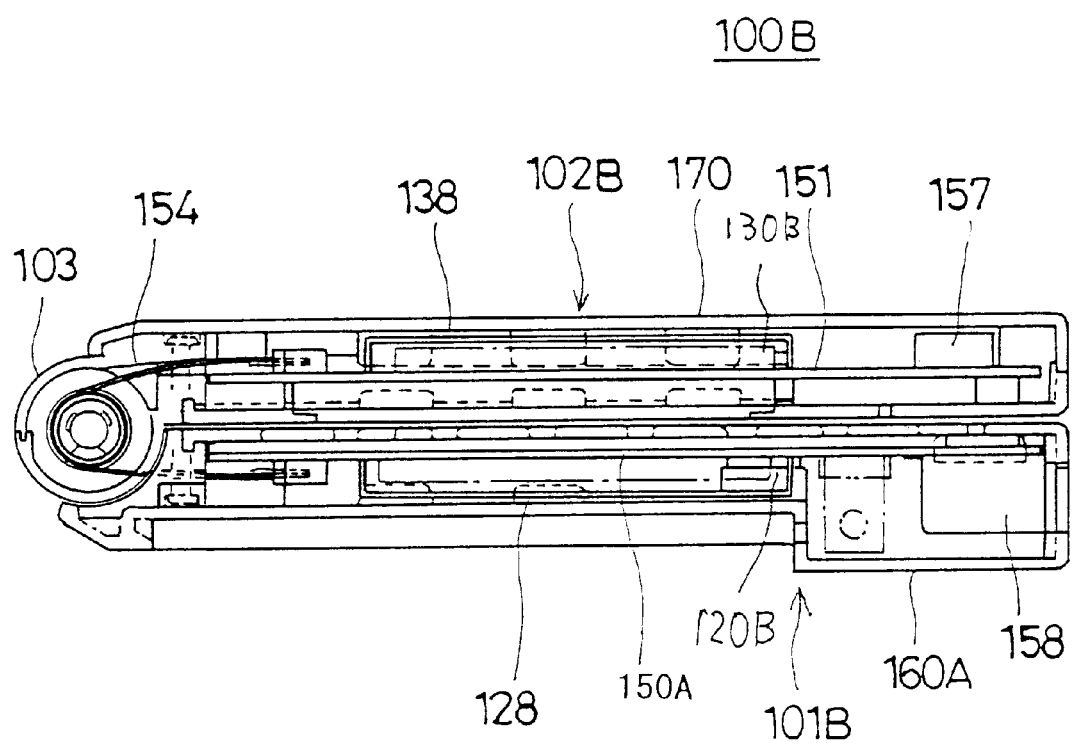
FIG. 14 is a cross-sectional view of the folding-type cellular phone shown in FIG. 13A.
Figure 15:
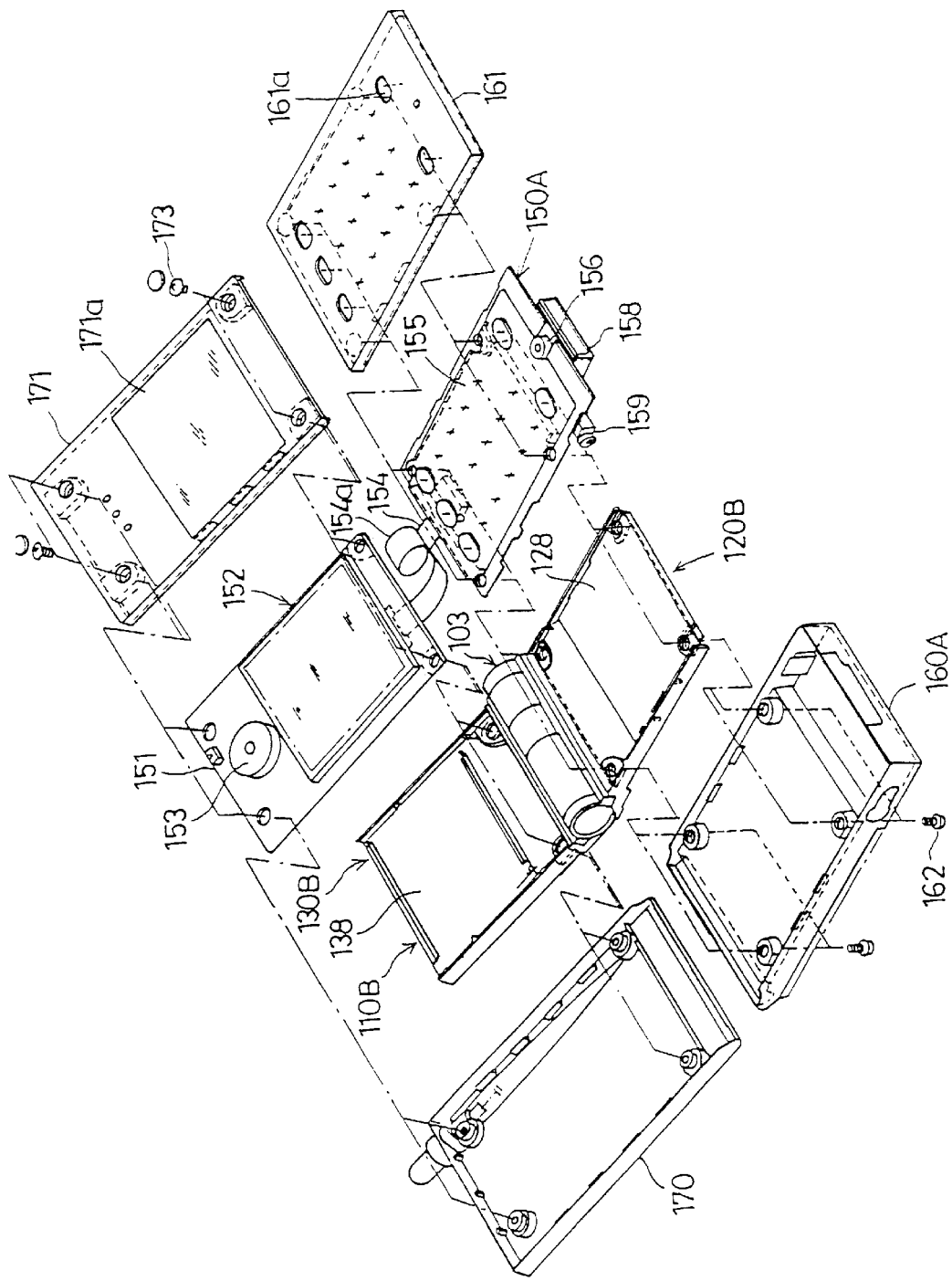
FIG. 15 is a perspective view of the folding-type cellular phone shown in FIG. 13B when disassembled.
Figure 16:
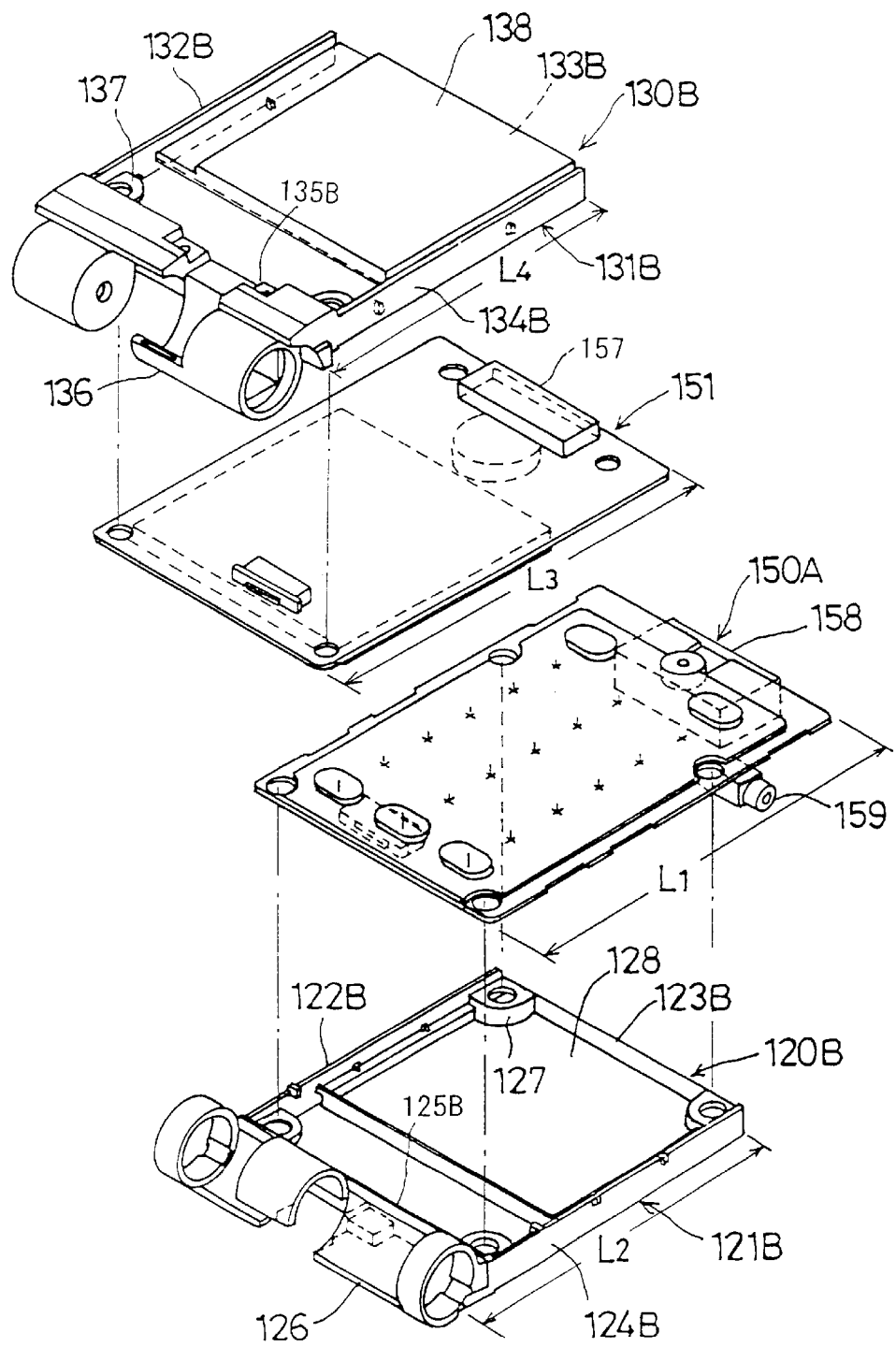
FIG. 16 is a perspective view of chassis and printed-board modules shown in FIG. 15.
Figure 17:
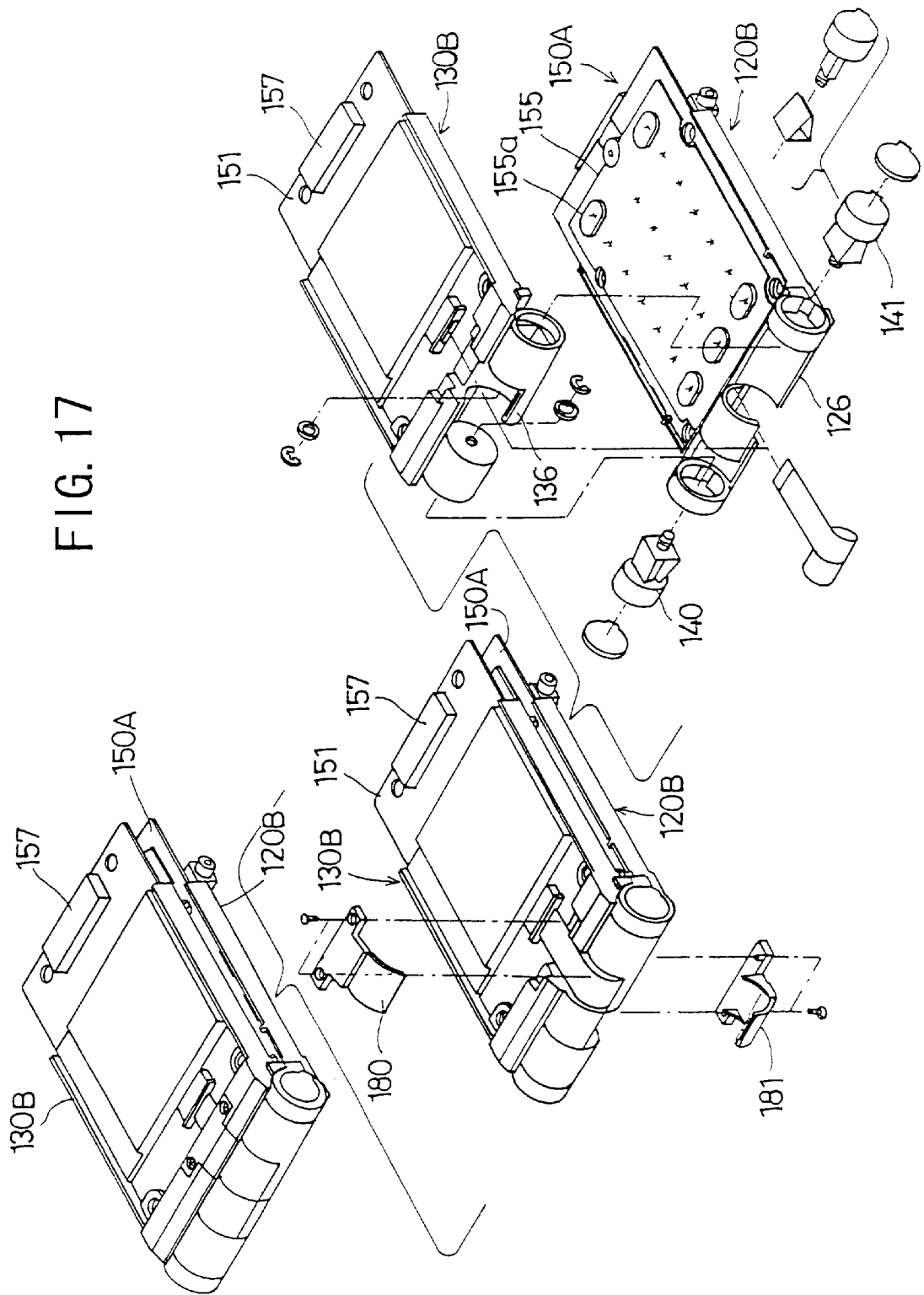
FIG. 17 is a perspective view of a chassis assembly incorporating the printed-board modules shown in FIG. 16.

FIG. 13A is a perspective view of a folding-type cellular phone 100B according to a third embodiment of the present invention when folded. FIG. 13B is a perspective view of the folding-type cellular phone 100B shown in FIG. 13A when opened. FIG. 14 is a cross-sectional view of the folding-type cellular phone 100B shown in FIG. 13A. FIG. 15 is a perspective view of the folding-type cellular phone 100B shown in FIG. 13B when disassembled. FIG. 16 is a perspective view of chassis and printed-board modules shown in FIG. 15. FIG. 17 is a perspective view of a chassis assembly incorporating the printed-board modules shown in FIG. 16.

The folding-type cellular phone 100B has a structure in which an operation-key part chassis and a liquid-crystal display part chassis have smaller lengths than the above-mentioned embodiments so as to improve the property of the interior antenna 157. Thus, the folding-type cellular phone 100B has a structure different from the folding-type cellular phone 100 shown in FIG. 3A and FIG. 3B mainly in regard to the chassis assembly 110. A chassis assembly 110B of the folding-type cellular phone 100B has a structure in which each of the operation-key part chassis and the liquid-crystal display part chassis has a smaller length than the printed-board module, and unitarily has the shield board unit. Elements in FIG. 13A to FIG. 17 that are identical or equivalent to the elements shown in FIG. 3A to FIG. 7 and FIG. 8A to FIG. 12 are referenced by the same reference marks. The folding-type cellular phone 100B comprises an operation-key part 101B and a liquid-crystal display part 102B coupled by the hinge 103.

The chassis assembly 110B, as shown in FIG. 13A to FIG. 17, comprises an operation-key part chassis 120B and a liquid-crystal display part chassis 130B combined together. The operation-key part chassis 120B comprises: a substantially rectangular frame unit 121B formed by four side frames 122B to 125B, the frame unit 121B having a length L2 being approximately two thirds of a length L1 of the printed-board module 150A; the circular-arc overhang portion 126 overhanging from the side frame 125B to the outside of the frame unit 121B; a plurality of the flanges 127 jutting to the inside of the frame unit 121B; and the shield board unit 128 covering approximately two thirds of the inside of the frame unit 121B from the side frame 123B.

The liquid-crystal display part chassis 130B, as does the operation-key part chassis 120B, comprises: a substantially rectangular frame unit 131B formed by four side frames 132B to 135B, the frame unit 131B having a length L4 being approximately two thirds of a length L3 of the printed-board module 151; the circular-arc overhang portion 136 overhanging from the side frame 135B to the outside of the frame unit 131B; a plurality of the flanges 137 jutting to the inside of the frame unit 131B; and the shield board unit 138 covering approximately two thirds of the inside of the frame unit 131B from the side frame 133B. The chassis assembly 110B has the operation-key part chassis 120B and the liquid-crystal display part chassis 130B coupled by the hinge 103.

As shown in FIG. 14 to FIG. 16, the operation-key part 101B is a structure in which the printed-board module 150A is placed and fixed on the frame unit 121B of the operation-key part chassis 120B, and the lower case-member 160A and the upper case-member 161 are fixed to the frame unit 121B so as to cover the printed-board module 150A. The flanges 127 are electrically connected to the ground pattern (not shown in the figures) of the printed-board module 150A. The middle part of the printed-board module 150A is covered by the shield board unit 128, and is contained and shielded in a space between the ground pattern (not shown in the figures) of the printed-board module 150A and the shield board unit 128.

Likewise, as shown in FIG. 14 to FIG. 16, the liquid-crystal display part 102B is a structure in which the printed-board module 151 is placed and fixed on the frame unit 131B of the liquid-crystal display part chassis 130B, and the lower case-member 170 and the upper case-member 171 are fixed to the frame unit 131B so as to cover the printed-board module 151. The flanges 137 are electrically connected to the ground pattern (not shown in the figures) of the printed-board module 151. The middle part of the printed-board module 151 is covered by the shield board unit 138, and is contained and shielded in a space between the ground pattern (not shown in the figures) of the printed-board module 151 and the shield board unit 138.

The folding-type cellular phone 100B having the above-described structure has the following feature in addition to the above-mentioned features of the folding-type cellular phone 100 and the folding-type cellular phone 100A.

(1) Since the length L4 of the liquid-crystal display part chassis 130B is smaller than the length L3 of the printed-board module 151, the interior antenna 157 is placed outside the liquid-crystal display part chassis 130B. Thus, since the interior antenna 157 is placed away from the liquid-crystal display part chassis 130B, the interior antenna 157 is not influenced by the liquid-crystal display part chassis 130B, when the folding-type cellular phone 100B is opened so as to be used to make a phone call. When the folding-type cellular phone 100B is folded so as to be carried along, since the operation-key part chassis 120B is shorter than the printed-board module 150A, the interior antenna 157 is placed away also from the operation-key part chassis 120B. Therefore, the interior antenna 157 is not influenced by the operation-key part chassis 120B either, when the folding-type cellular phone 100B is folded. Hence, the folding-type cellular phone 100B has an improved property regarding the interior antenna 157, compared with the folding-type cellular phone 100 shown in FIG. 3A and FIG. 3B.

4. Fourth Embodiment

Figure 18A:
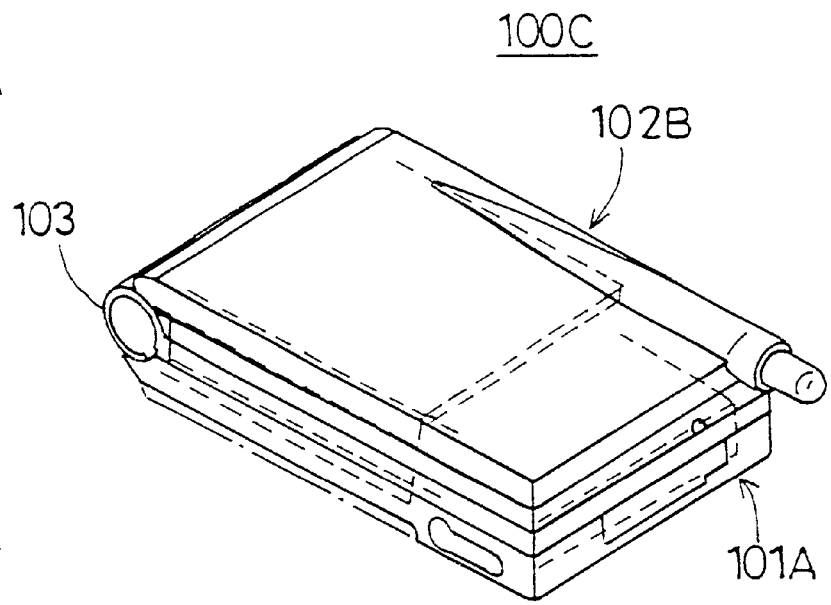
FIG. 18A is a perspective view of a folding-type cellular phone according to a fourth embodiment of the present invention when folded.
Figure 18B:
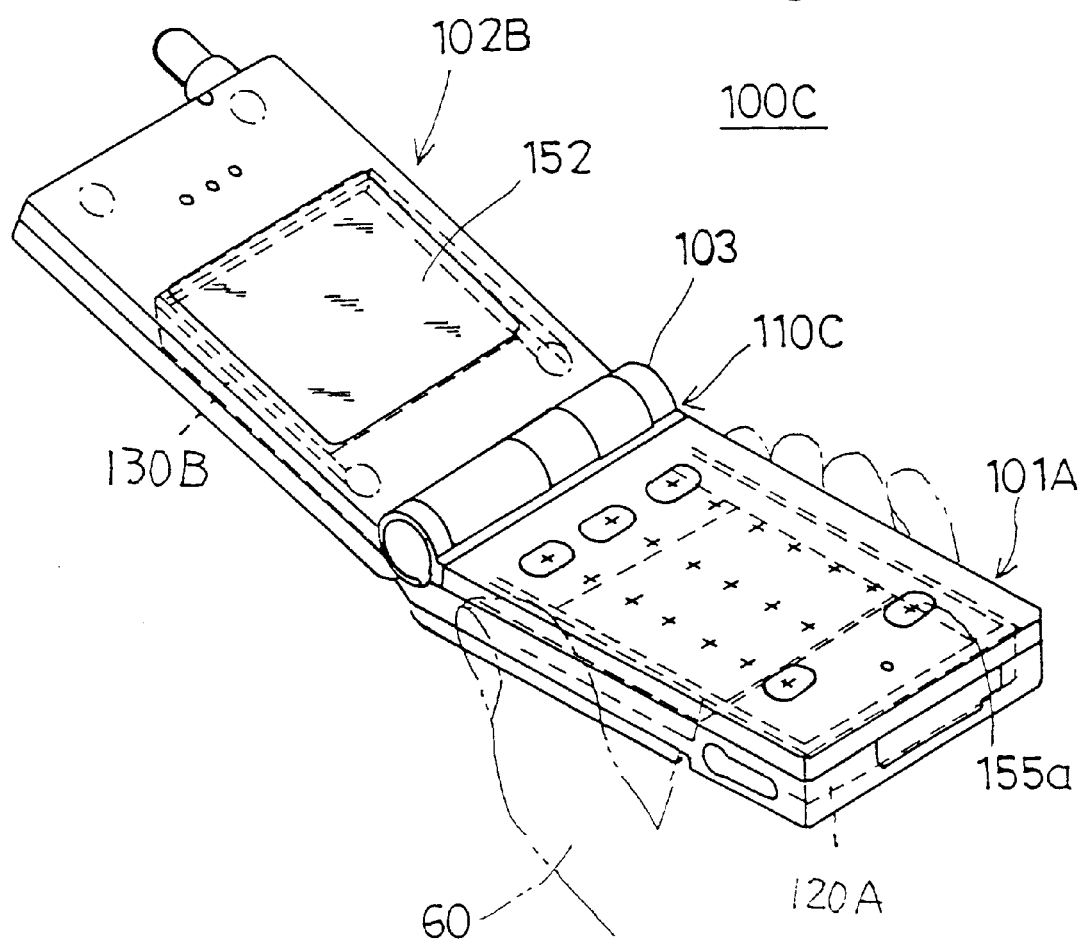
FIG. 18B is a perspective view of the folding-type cellular phone shown in FIG. 18A when opened.
Figure 19:
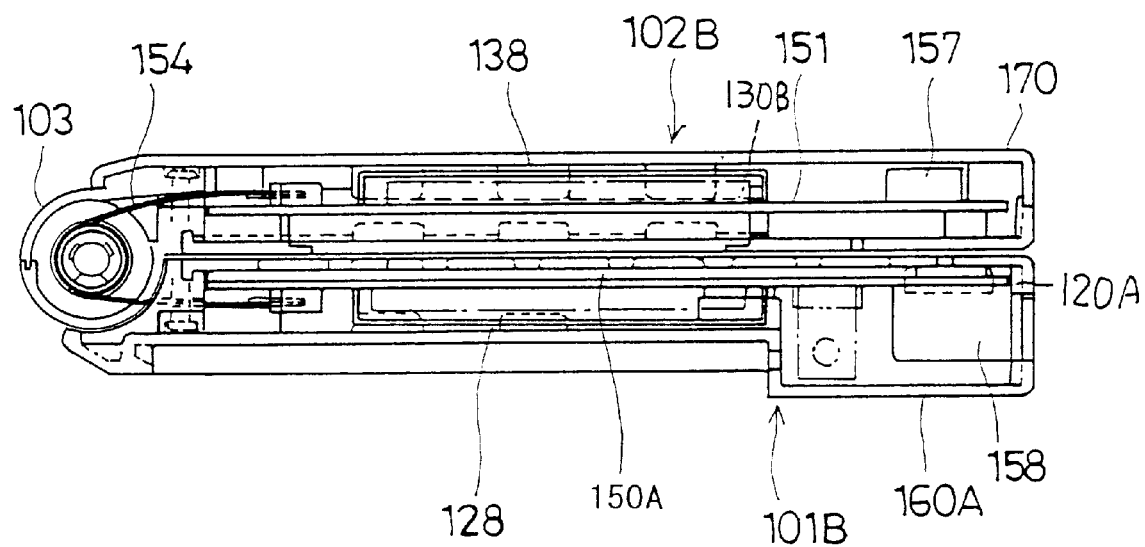
FIG. 19 is a cross-sectional view of the folding-type cellular phone shown in FIG. 18A.
Figure 20:
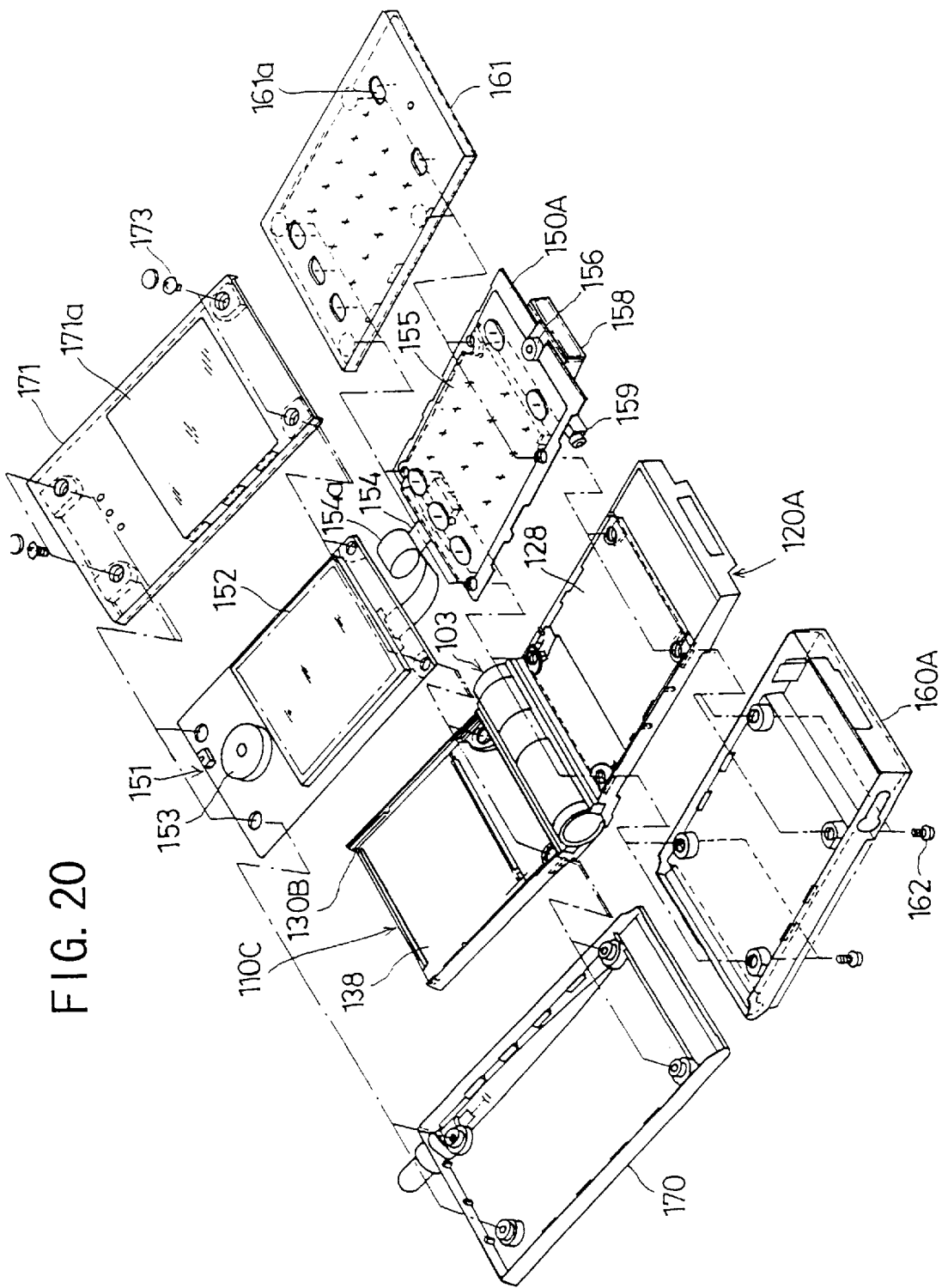
FIG. 20 is a perspective view of the folding-type cellular phone shown in FIG. 18B when disassembled.
Figure 21:
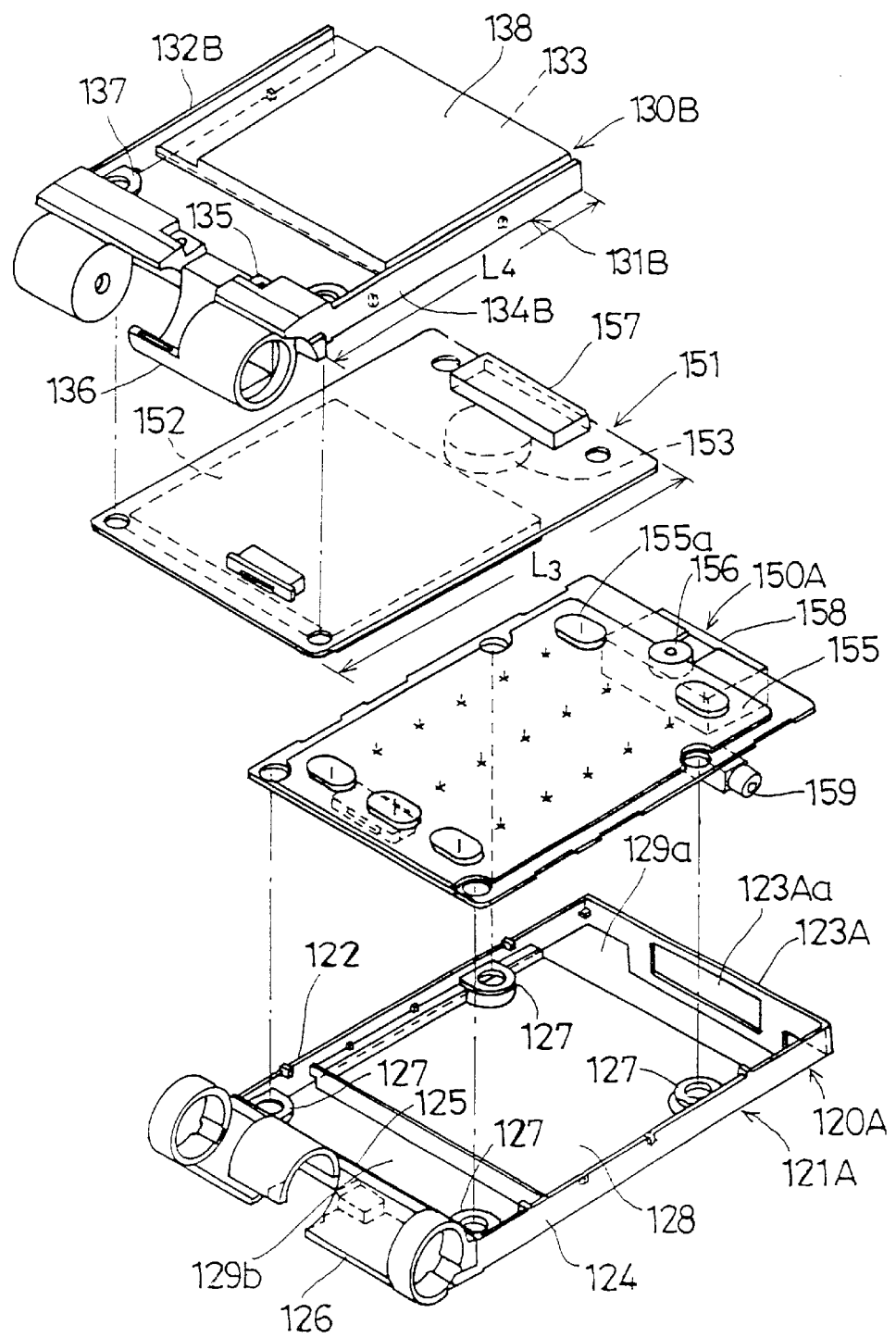
FIG. 21 is a perspective view of chassis and printed-board modules shown in FIG. 20.
Figure 22:
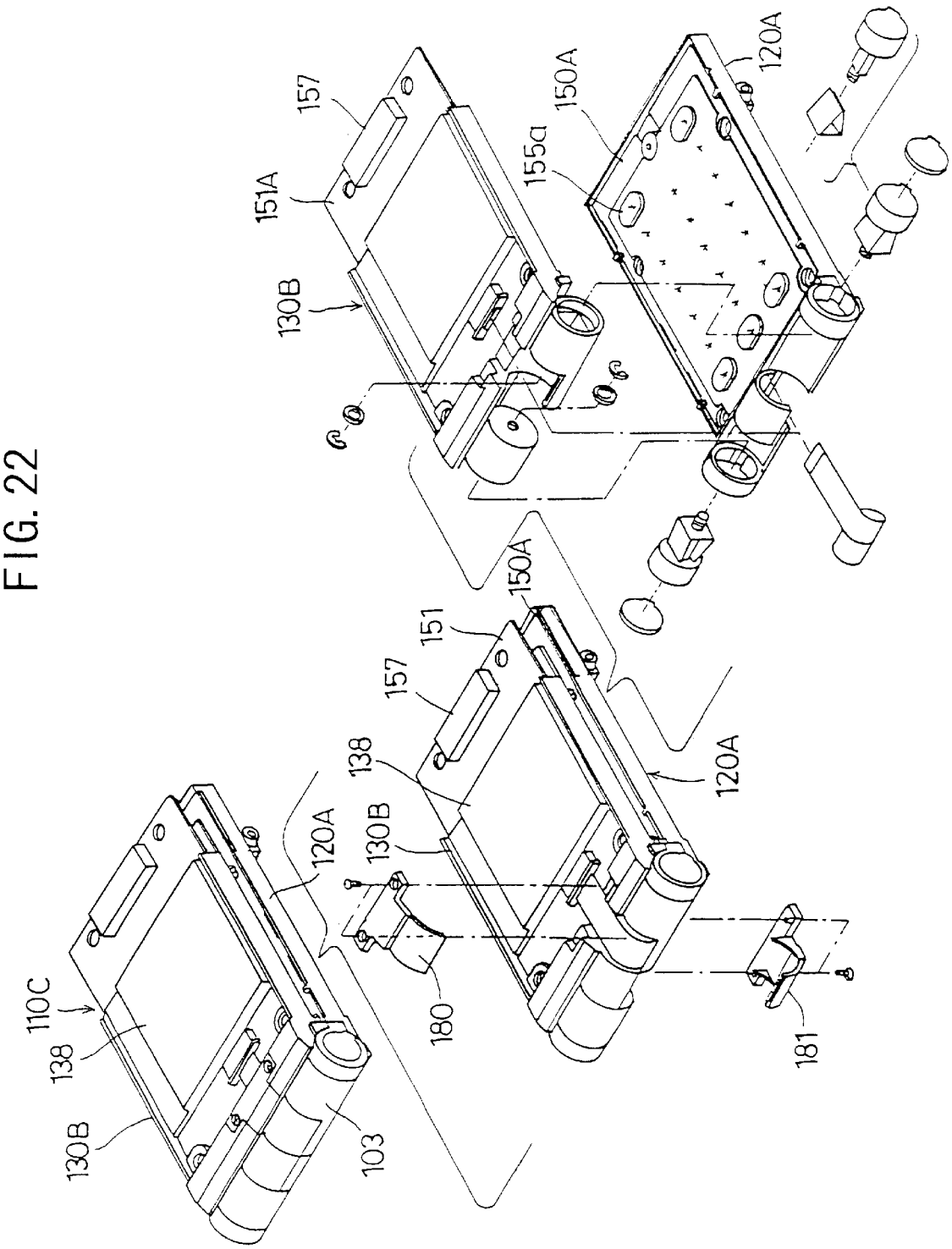
FIG. 22 is a perspective view of a chassis assembly incorporating the printed-board modules shown in FIG. 21.

FIG. 18A is a perspective view of a folding-type cellular phone 100C according to a fourth embodiment of the present invention when folded. FIG. 18B is a perspective view of the folding-type cellular phone 100C shown in FIG. 18A when opened. FIG. 19 is a cross-sectional view of the folding-type cellular phone 100C shown in FIG. 18A. FIG. 20 is a perspective view of the folding-type cellular phone 100C shown in FIG. 18B when disassembled. FIG. 21 is a perspective view of chassis and printed-board modules shown in FIG. 20. FIG. 22 is a perspective view of a chassis assembly incorporating the printed-board modules shown in FIG. 21.

The folding-type cellular phone 100C has a structure in which a liquid-crystal display part chassis has a smaller length than the above-mentioned first and second embodiments. That is, the folding-type cellular phone 100C comprises: the operation-key part 101A of the folding-type cellular phone 100A shown in FIG. 8A and FIG. 8B; the liquid-crystal display part 102B of the folding-type cellular phone 100B shown in FIG. 13A and FIG. 13B; and the hinge 103 coupling the operation-key part 101A and the liquid-crystal display part 102B. Elements in FIG. 18A to FIG. 22 that are identical or equivalent to the elements shown in FIG. 8A to FIG. 12 and FIG. 13A to FIG. 17 are referenced by the same reference marks.

The interior antenna 157 is placed outside the liquid-crystal display part chassis 130B. Therefore, the folding-type cellular phone 100C has a good property regarding the interior antenna 157.

5. Fifth Embodiment

Figure 23A:
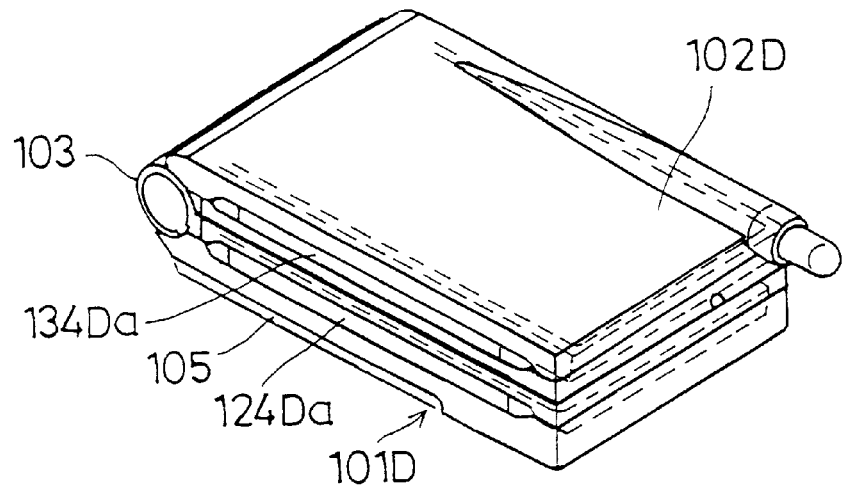
FIG. 23A is a perspective view of a folding-type cellular phone according to a fifth embodiment of the present invention when folded.
Figure 23B:
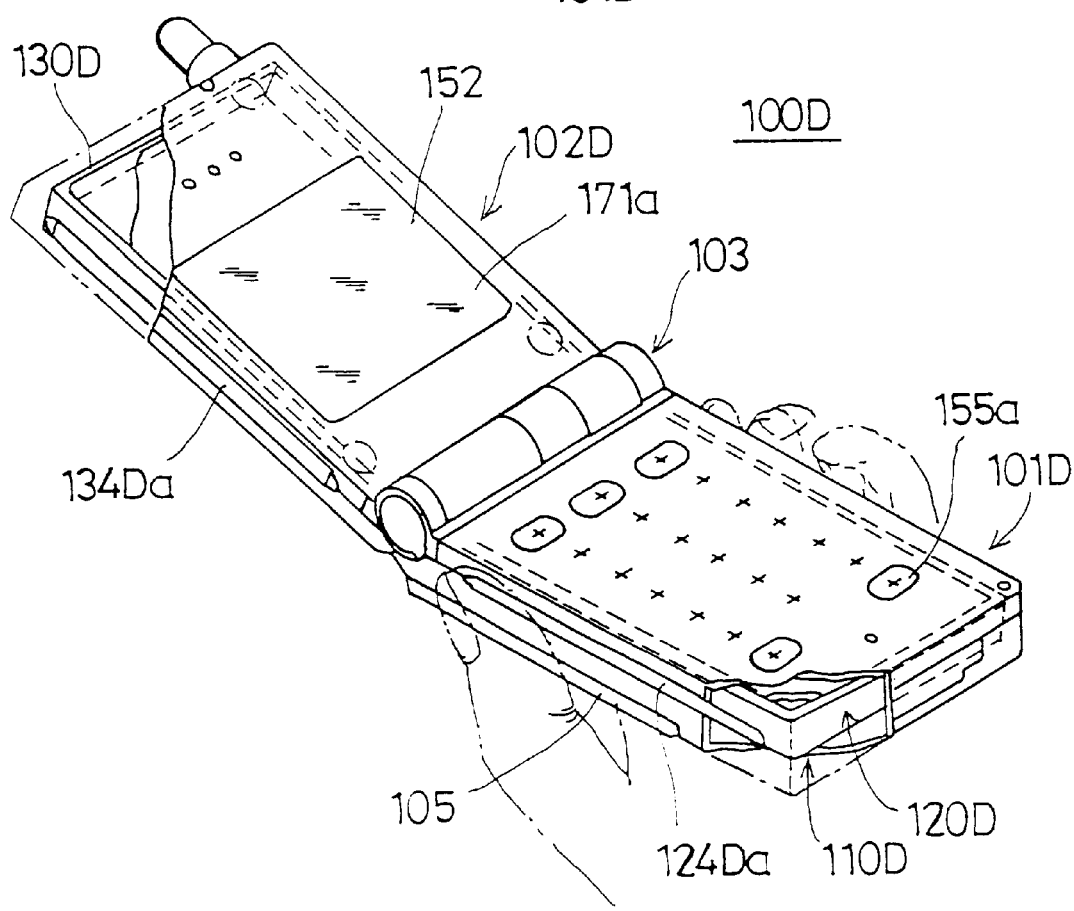
FIG. 23B is a perspective view of the folding-type cellular phone shown in FIG. 23A when opened.
Figure 24:
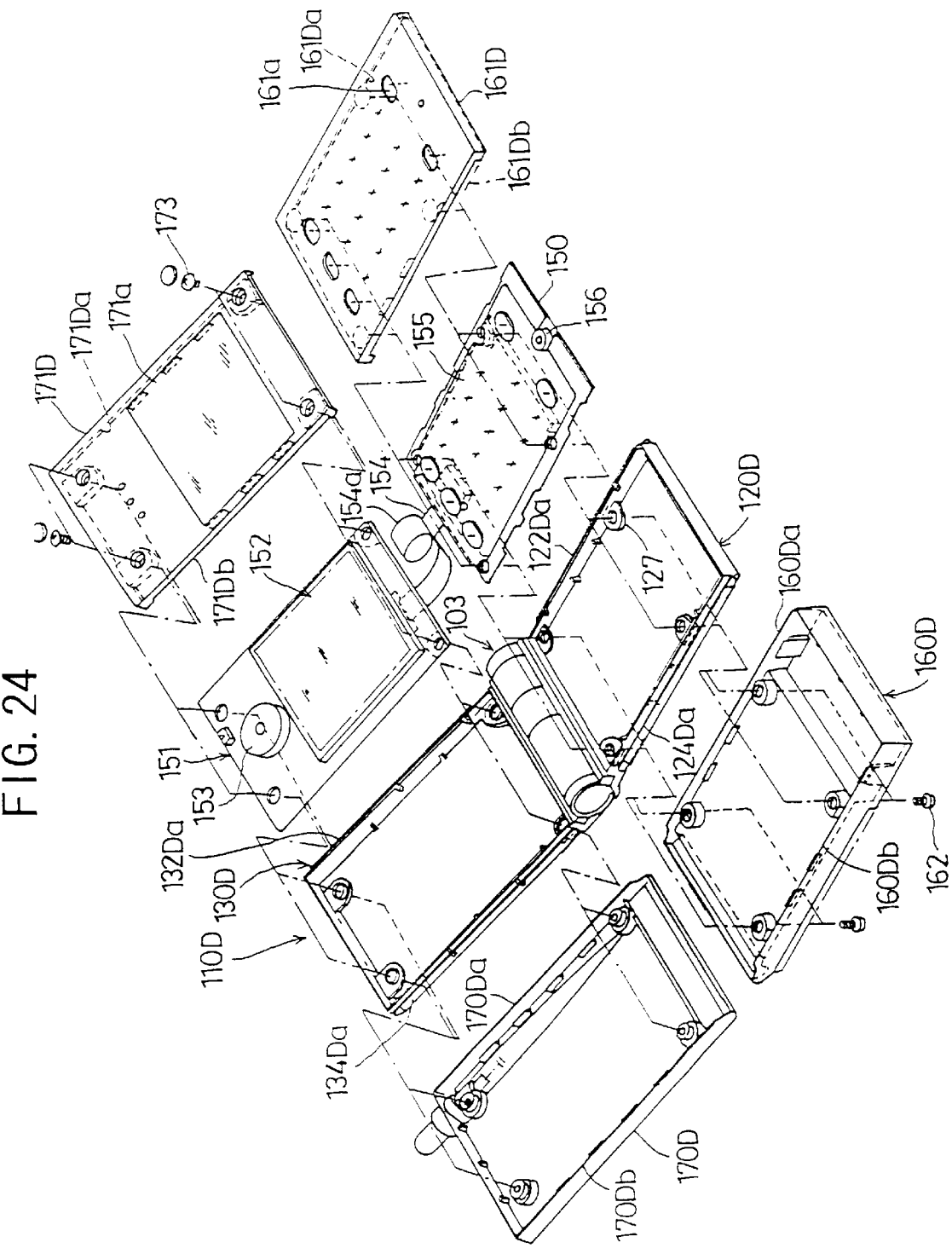
FIG. 24 is a perspective view of the folding-type cellular phone shown in FIG. 23B when disassembled.
Figure 25:
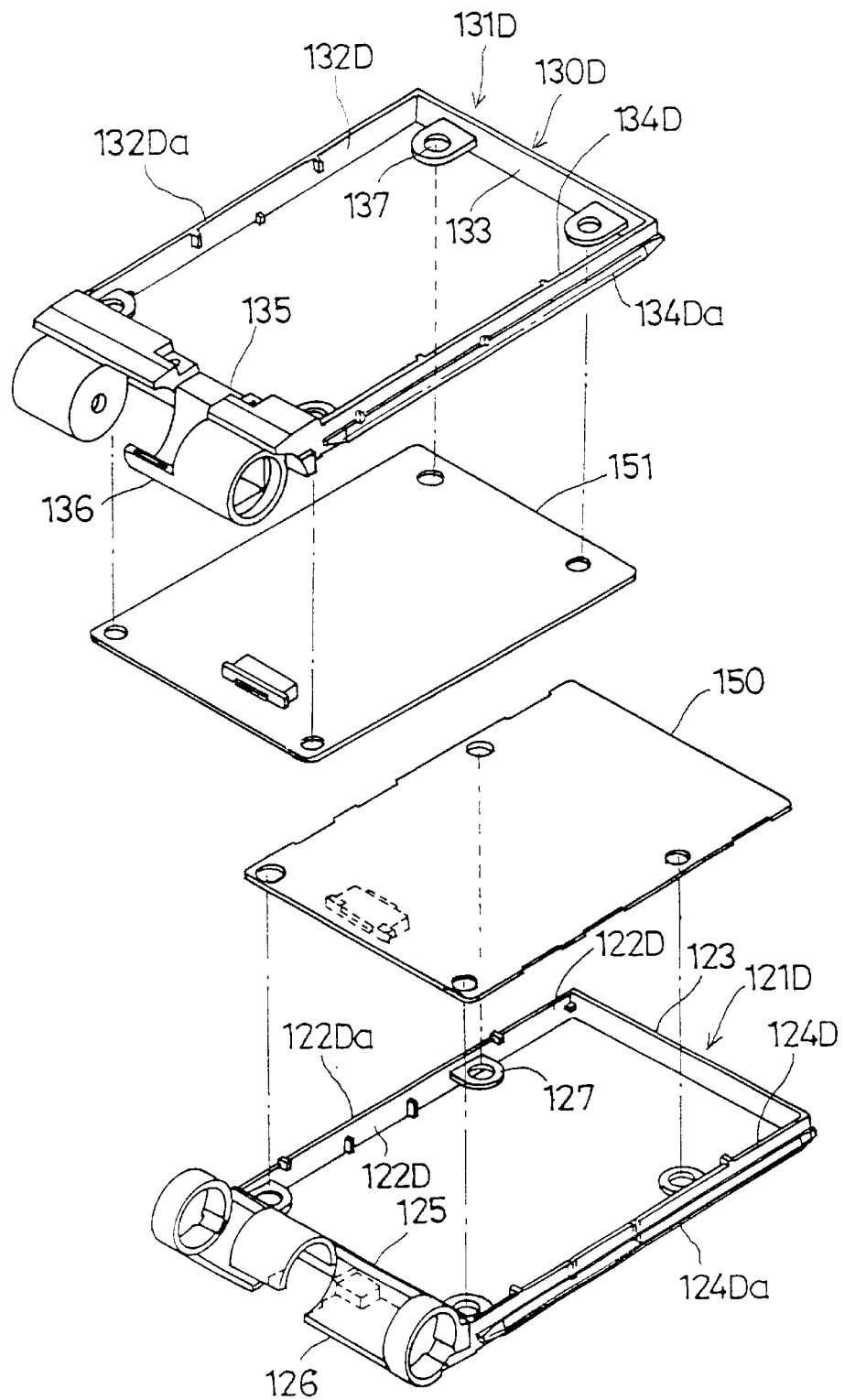
FIG. 25 is a perspective view of chassis and printed-board modules shown in FIG. 24.
Figure 26:
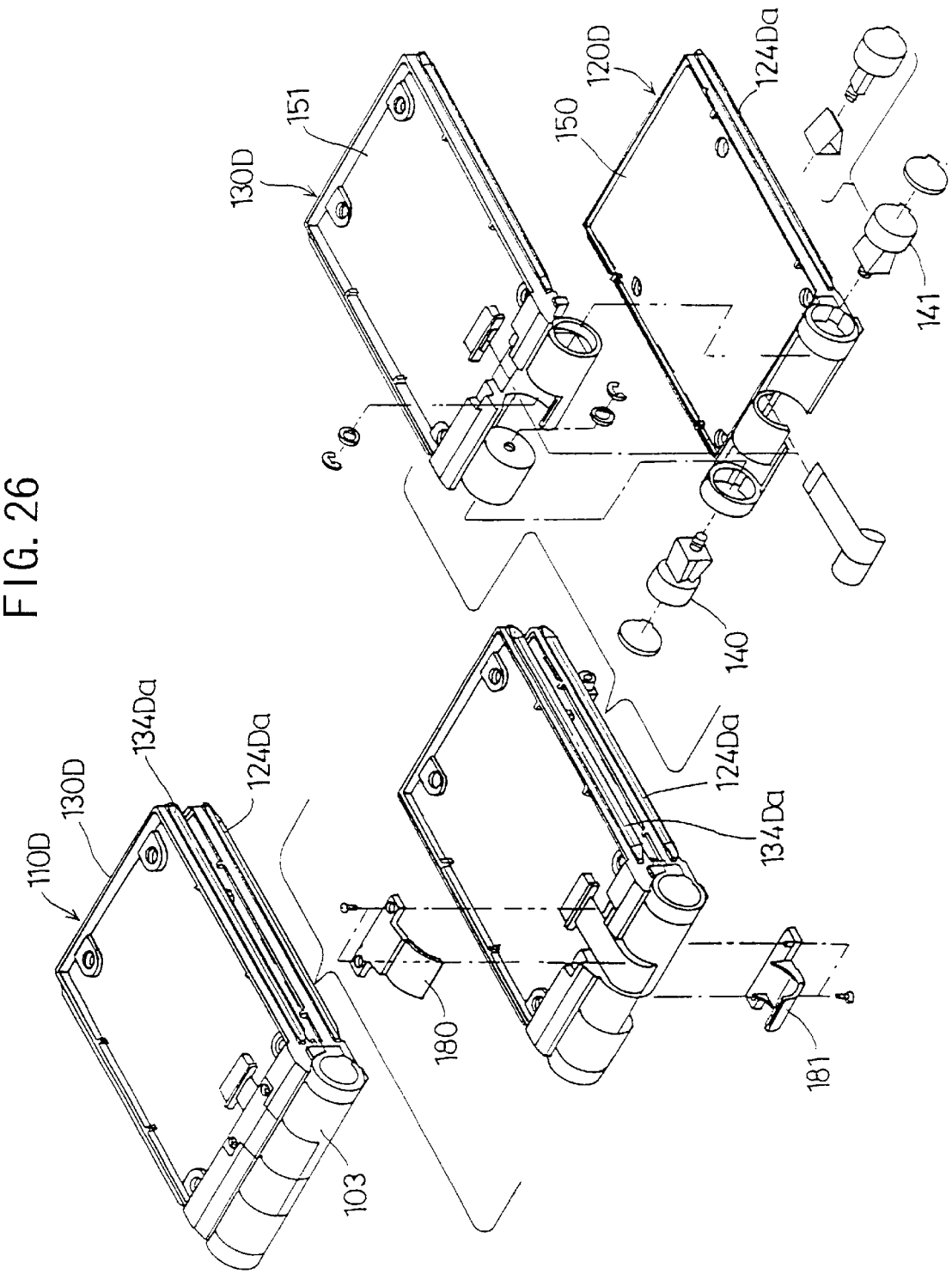
FIG. 26 is a perspective view of a chassis assembly incorporating the printed-board modules shown in FIG. 25.

FIG. 23A is a perspective view of a folding-type cellular phone 100D according to a fifth embodiment of the present invention when folded. FIG. 23B is a perspective view of the folding-type cellular phone 100D shown in FIG. 23A when opened. FIG. 24 is a perspective view of the folding-type cellular phone 100D shown in FIG. 23B when disassembled. FIG. 25 is a perspective view of chassis and printed-board modules shown in FIG. 24. FIG. 26 is a perspective view of a chassis assembly incorporating the printed-board modules shown in FIG. 25.

The folding-type cellular phone 100D is a variation of the folding-type cellular phone 100 shown in FIG. 3A and FIG. 3B, and has a structure devised to deal with a static electricity in a user's body by utilizing an operation-key part chassis and a liquid-crystal display part chassis that are intrinsically used for reinforcements. Specifically, longitudinal side frames of the operation-key part chassis and the liquid-crystal display part chassis are exposed to the outside of the folding-type cellular phone 100D so as to discharge a static electricity in a user's body to a ground in the folding-type cellular phone 100D.

The folding-type cellular phone 100D has a structure different from the folding-type cellular phone 100 shown in FIG. 3A and FIG. 3B mainly in regard to the chassis assembly 110. A chassis assembly 110D comprises an operation-key part chassis 120D and a liquid-crystal display part chassis 130D. A frame unit 121D of the operation-key part chassis 120D includes ribs 122Da and 124Da respectively formed along on the sides of side frames 122D and 124D extending in a longitudinal direction of the frame unit 121D. A frame unit 131D of the liquid-crystal display part chassis 130D includes ribs 132Da and 134Da respectively formed along on the sides of side frames 132D and 134D extending in a longitudinal direction of the frame unit 131D. Top portions of the ribs 122Da, 124Da, 132Da and 134Da have conductive surfaces formed by such a method as plating.

An operation-key part 101D is a structure in which the printed-board module 150 is placed and fixed on the frame unit 121D of the operation-key part chassis 120D, and a lower case-member 160D and an upper case-member 161D are fixed to the frame unit 121D so as to cover the printed-board module 150. The flanges 127 are contacted with a ground pattern (not shown in the figures) of the printed-board module 150, and the frame unit 121D and the ground pattern of the printed-board module 150 are electrically connected. The lower case-member 160D has long and shallow slits 160Da and 160Db on longitudinal sides thereof, the slits 160Da and 160Db fitting the ribs 122Da and 124Da, respectively. The upper case-member 161D has long and shallow slits 161Da and 161Db on longitudinal sides thereof, the slits 161Da and 161Db fitting the ribs 122Da and 124Da, respectively. The operation-key part 101D has the ribs 122Da and 124Da exposed substantially all along both sides thereof, as shown in FIG. 23A and FIG. 23B.

An liquid-crystal display part 102D is a structure in which the printed-board module 151 is placed and fixed on the frame unit 131D of the operation-key part chassis 130D, and a lower case-member 170D and an upper case-member 171D are fixed to the frame unit 131D so as to cover the printed-board module 151. The flanges 137 are contacted with the ground pattern (not shown in the figures) of the printed-board module 151, and the frame unit 131D and the ground pattern of the printed-board module 151 are electrically connected. The lower case-member 170D has long and shallow slits 170Da and 170Db on longitudinal sides thereof, the slits 170Da and 170Db fitting the ribs 132Da and 134Da, respectively. The upper case-member 171D has long and shallow slits 171Da and 171Db on longitudinal sides thereof, the slits 171Da and 171Db fitting the ribs 132Da and 134Da, respectively. The liquid-crystal display part 102D has the ribs 132Da and 134Da exposed substantially all along both sides thereof, as shown in FIG. 23A and FIG. 23B.

The folding-type cellular phone 100D having the above-described structure has the following features in addition to the above-mentioned features of the folding-type cellular phone 100.

(1) When a user holds the folding-type cellular phone 100D by hand, the user's hand contacts the ribs 122Da, 124Da, 132Da and 134Da first. Thereby, when the user's body assumes a static electricity, the static electricity is discharged to the ground patterns (not shown in the figures) of the printed-board modules 150 and 151 via the frame units 121D and 131D. This prevents a current of the static electricity from flowing through an electronic circuit of the printed-board modules 150 and 151, and thus protects the electronic circuit of the printed-board modules 150 and 151.

(2) The ribs 122Da, 124Da and the ribs 132Da, 134Da are exposed on both sides of the operation-key part 101D and the liquid-crystal display part 102D, respectively, so as to become accents in terms of designing. Thus, the folding-type cellular phone 100D has a prominently good design.

6. Sixth Embodiment

Figure 27A:
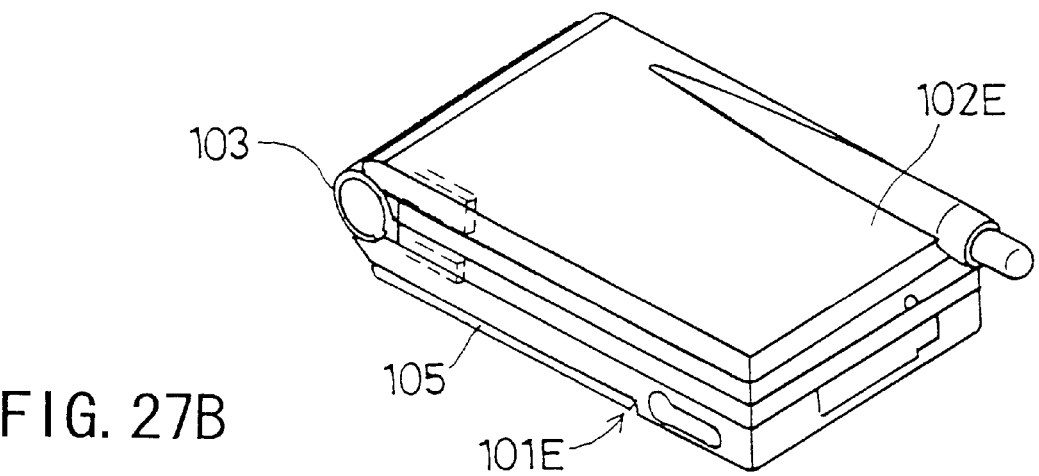
FIG. 27A is a perspective view of a folding-type cellular phone according to a sixth embodiment of the present invention when folded.
Figure 27B:
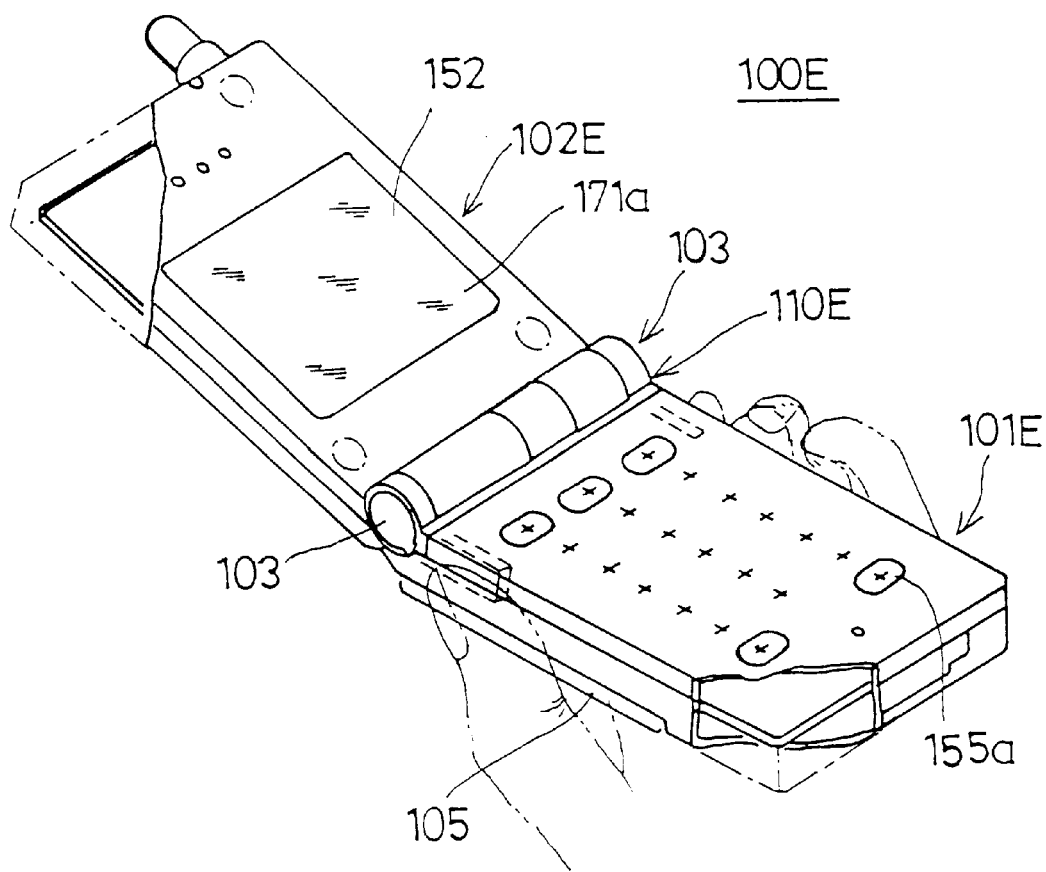
FIG. 27B is a perspective view of the folding-type cellular phone shown in FIG. 27A when opened.
Figure 28A:
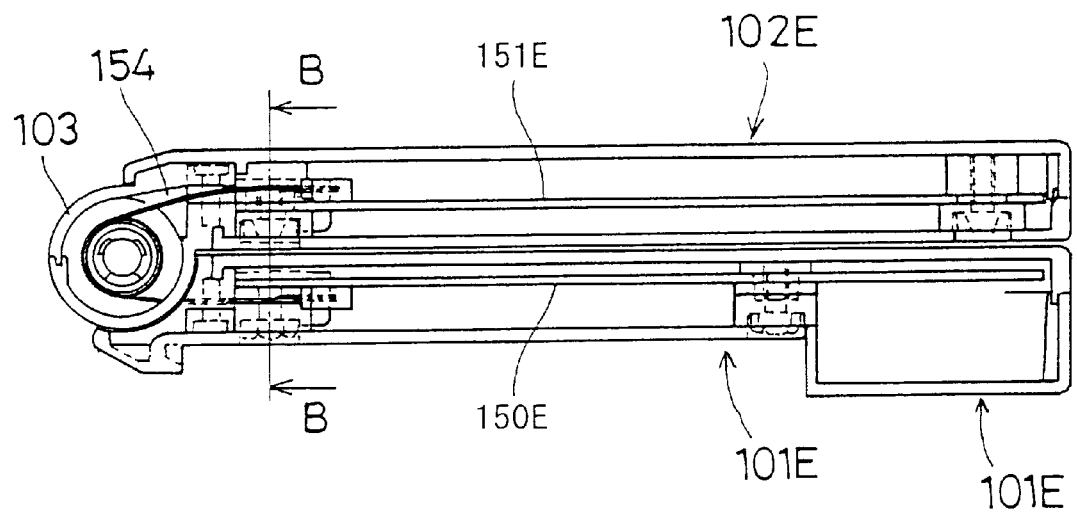
FIG. 28A is a cross-sectional view in a longitudinal direction of the folding-type cellular phone shown in FIG. 27A.
Figure 28B:
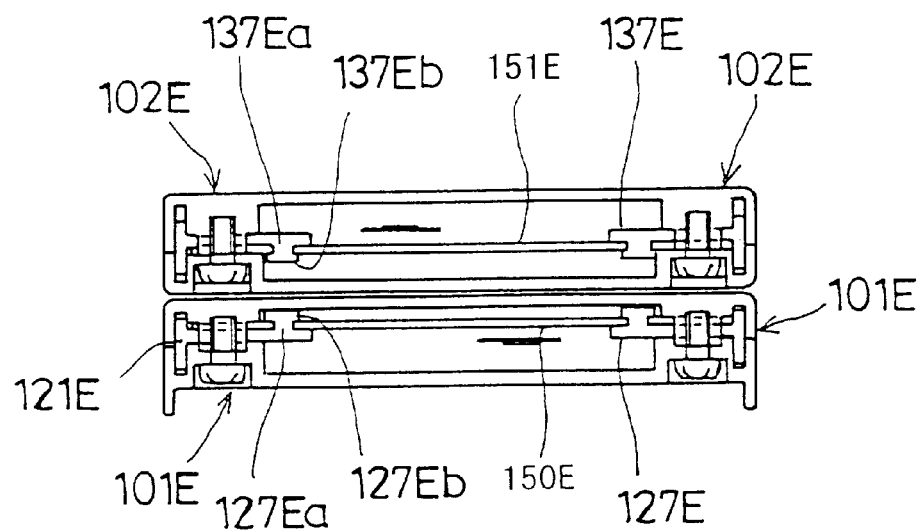
FIG. 28B is a cross-sectional view in a crosswise direction of the folding-type cellular phone shown in FIG. 27A.
Figure 29:
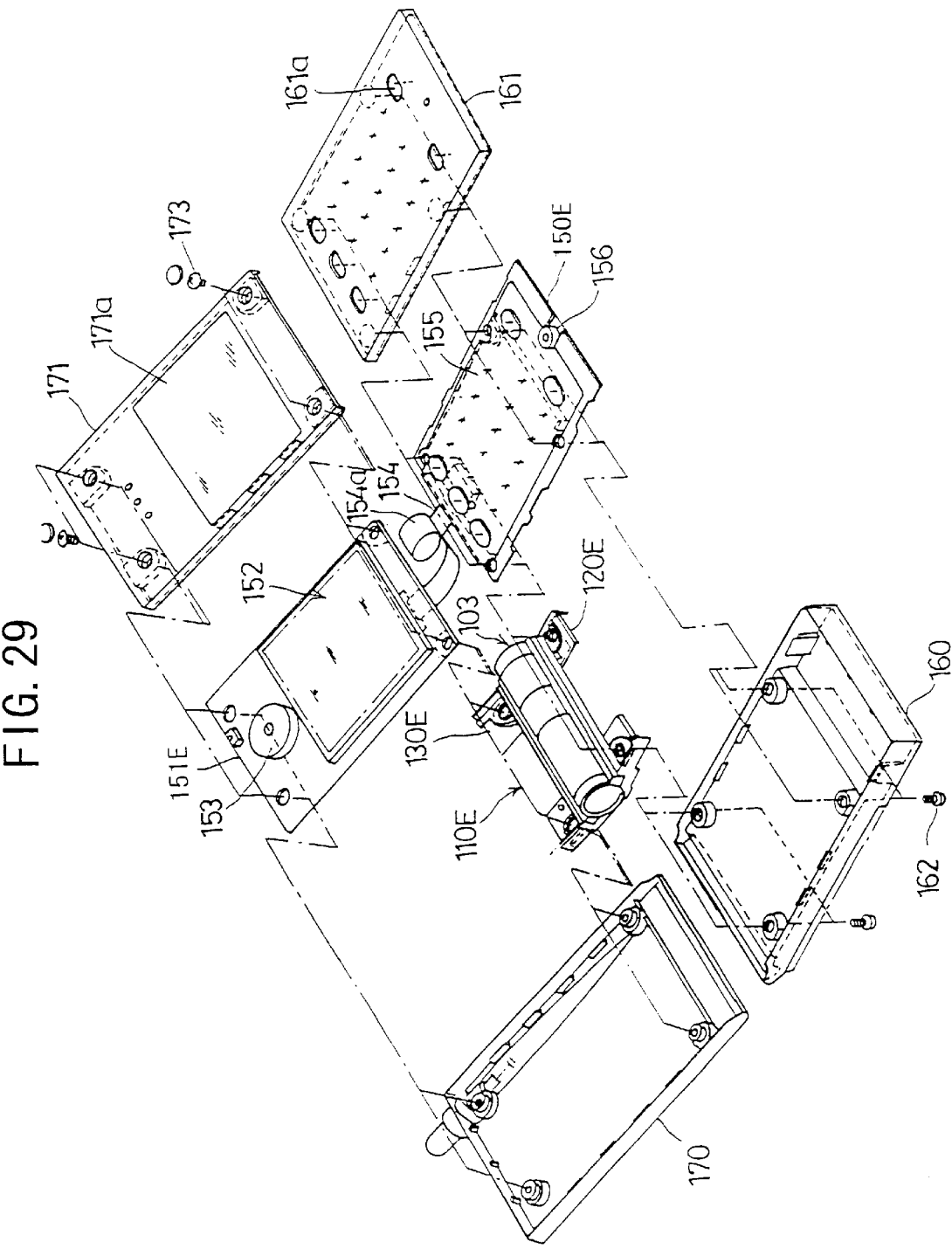
FIG. 29 is a perspective view of the folding-type cellular phone shown in FIG. 27B when disassembled.
Figure 30:
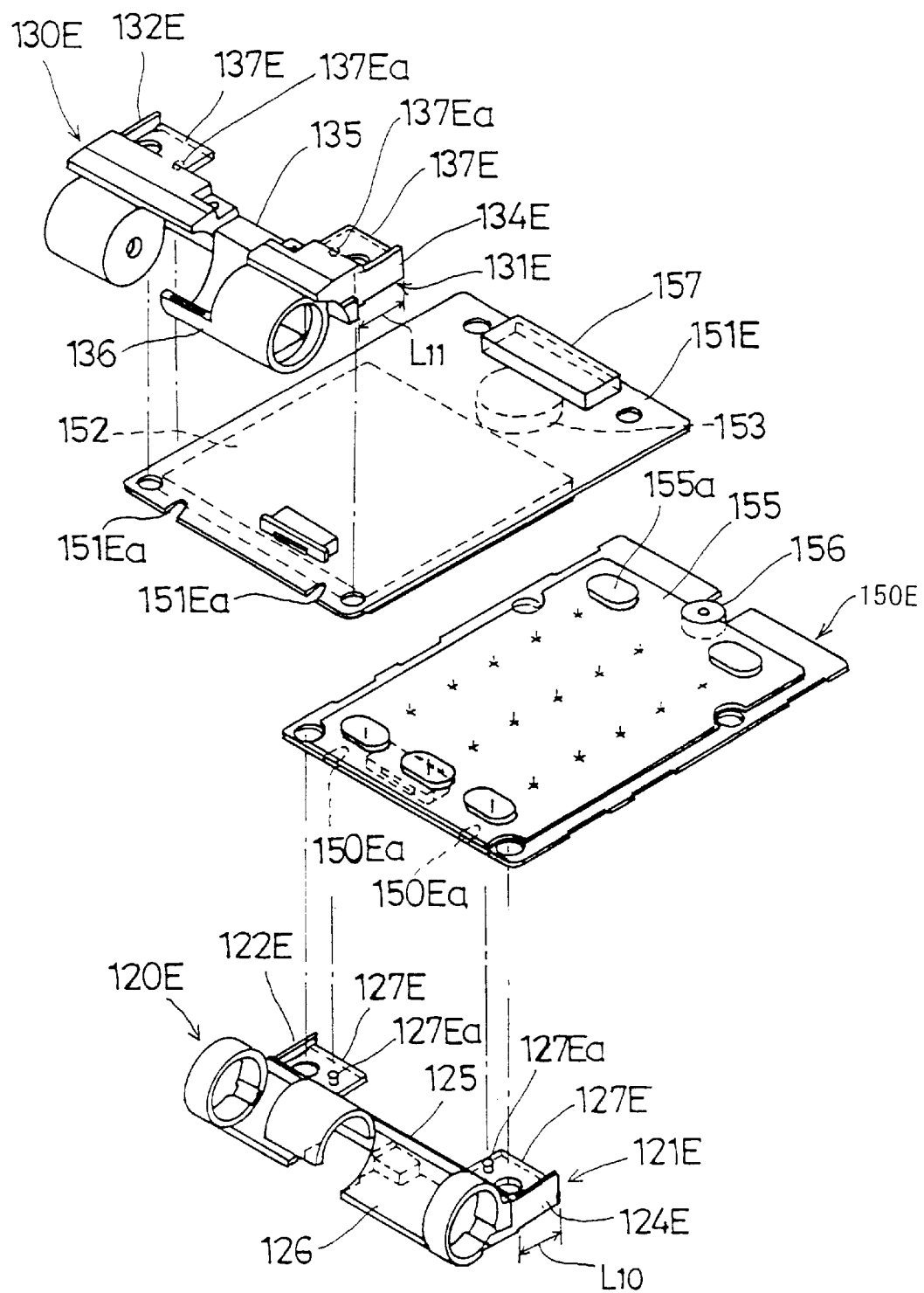
FIG. 30 is a perspective view of chassis and printed-board modules shown in FIG. 29.
Figure 31:
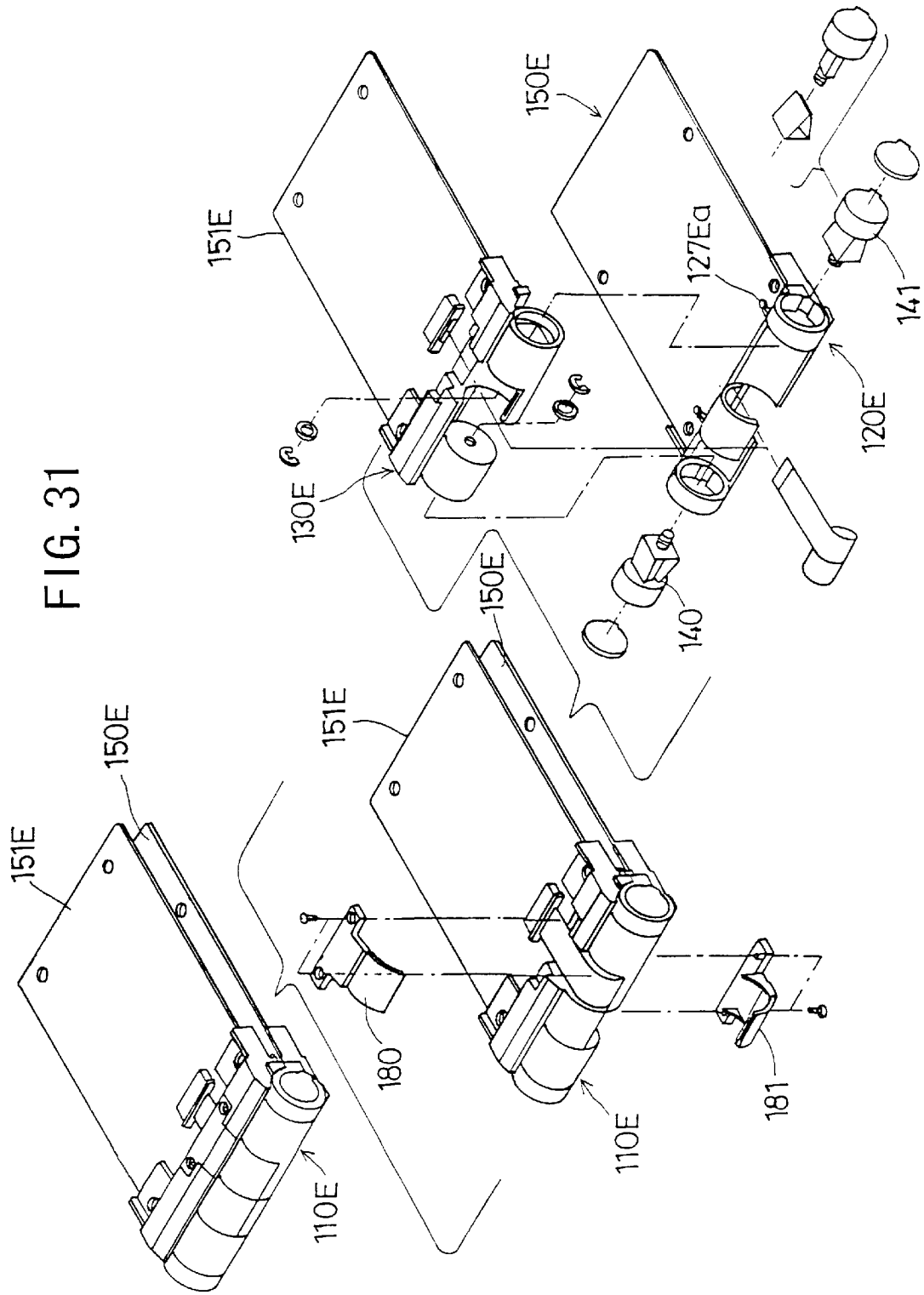
FIG. 31 is a perspective view of a chassis assembly incorporating the printed-board modules shown in FIG. 30.

FIG. 27A is a perspective view of a folding-type cellular phone 100E according to a sixth embodiment of the present invention when folded. FIG. 27B is a perspective view of the folding-type cellular phone 100E shown in FIG. 27A when opened. FIG. 28A is a cross-sectional view in a longitudinal direction of the folding-type cellular phone 100E shown in FIG. 27A. FIG. 28B is a cross-sectional view in a crosswise direction of the folding-type cellular phone 100E shown in FIG. 27A. FIG. 29 is a perspective view of the folding-type cellular phone 100E shown in FIG. 27B when disassembled. FIG. 30 is a perspective view of chassis and printed-board modules shown in FIG. 29. FIG. 31 is a perspective view of a chassis assembly incorporating the printed-board modules shown in FIG. 30.

The folding-type cellular phone 100E is another variation of the folding-type cellular phone 100 shown in FIG. 3A and FIG. 3B, and has a structure in which a chassis assembly has a minimum size. As shown in FIG. 30 and FIG. 31, a chassis assembly 110E of the folding-type cellular phone 100E comprises an operation-key part chassis 120E and a liquid-crystal display part chassis 130E coupled by the hinge 103.

The operation-key part chassis 120E comprises: a substantially U-shaped frame unit 121E formed by three side frames 122E, 124E and 125; the circular-arc overhang portion 126 overhanging from the side frame 125 to the outside of the frame unit 121E; and two flanges 127E jutting from both corners of the frame unit 121E to the inside thereof. The side frames 122E and 124E have a length L10 corresponding to the size of the flanges 127E, and thus the side frames 122E and 124E are short. The flanges 127E with the length L10 support one end of a printed-board module 150E. Each of the flanges 127E has a headed pin 127Ea.

The liquid-crystal display part chassis 130 comprises: a substantially U-shaped frame unit 131E formed by three side frames 132E, 134E and 135; the circular-arc overhang portion 136 overhanging from the side frame 135 to the outside of the frame unit 131E; and two flanges 137E jutting from both corners of the frame unit 131E to the inside thereof. The side frames 132E and 134E have a length L11 corresponding to the size of the flanges 137E, and thus the side frames 132E and 134E are short. The flanges 137E with the length L11 support one end of a printed-board module 151E. Each of the flanges 137E has a headed pin 137Ea.

As shown in FIG. 28A, FIG. 28B, FIG. 30 and FIG. 31, one end of the printed-board module 150E is placed and fixed on the flanges 127E, and each of the headed pins 127Ea is inserted into a notch 150Ea fixed by a head 127Eb. Likewise, one end of the printed-board module 151E is placed and fixed on the flanges 137E, and each of the headed pins 137Ea is inserted into a notch 151Ea fixed by a head 137Eb. An operation-key part 101E has a structure in which the lower case-member 160 and the upper case-member 161 are fixed to the substantially U-shaped frame unit 121E together with the printed-board module 150E by screws on one end near the hinge 103, and the lower case-member 160 and the upper case-member 161 are fixed to each other by screws with the printed-board module 150E therebetween on the other end far from the hinge 103. A liquid-crystal display part 102E has a structure in which the lower case-member 170 and the upper case-member 171 are fixed to the substantially U-shaped frame unit 131E together with the printed-board module 151E by screws on one end near the hinge 103, and the lower case-member 170 and the upper case-member 171 are fixed to each other by screws with the printed-board module 151E therebetween on the other end far from the hinge 103. The folding-type cellular phone 100E comprises the operation-key part 101E and the liquid-crystal display part 102E coupled by the hinge 103.

The folding-type cellular phone 100E includes the chassis assembly 110E having a minimum size. Therefore, the folding-type cellular phone 100E can be manufactured at a low cost, and has a little weight, compared to the folding-type cellular phone 100 shown in FIG. 3A and FIG. 3B. At the same time, since the chassis assembly 110E includes the hinge 103 made of magnesium, the folding-type cellular phone 100E has a sufficient mechanical strength.

7. Seventh Embodiment

Figure 32A:
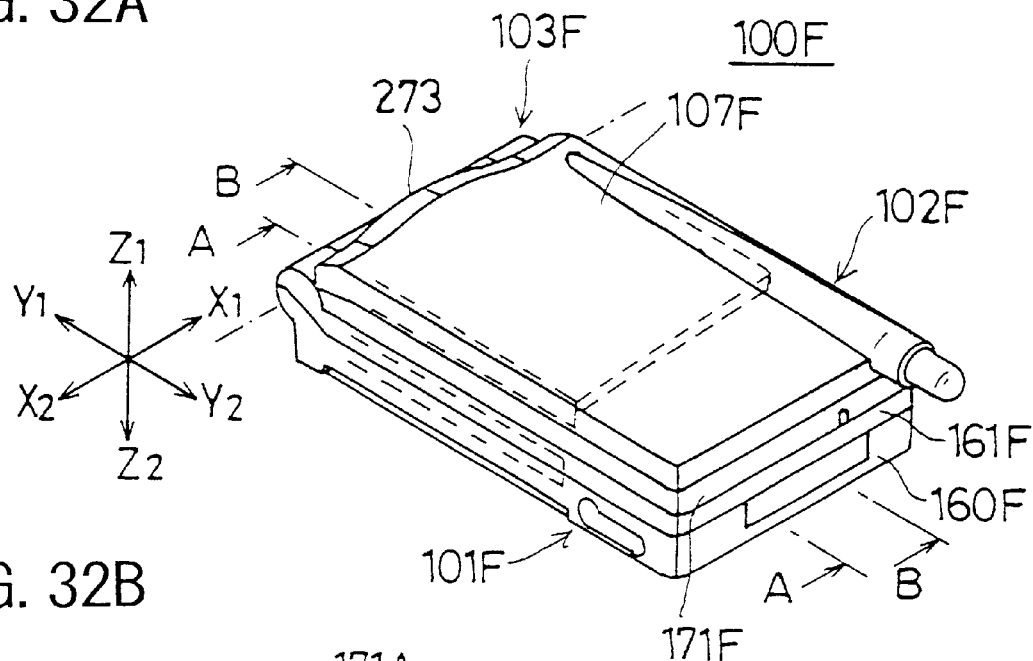
FIG. 32A is a perspective view of a folding-type cellular phone according to a seventh embodiment of the present invention when folded.
Figure 32B:
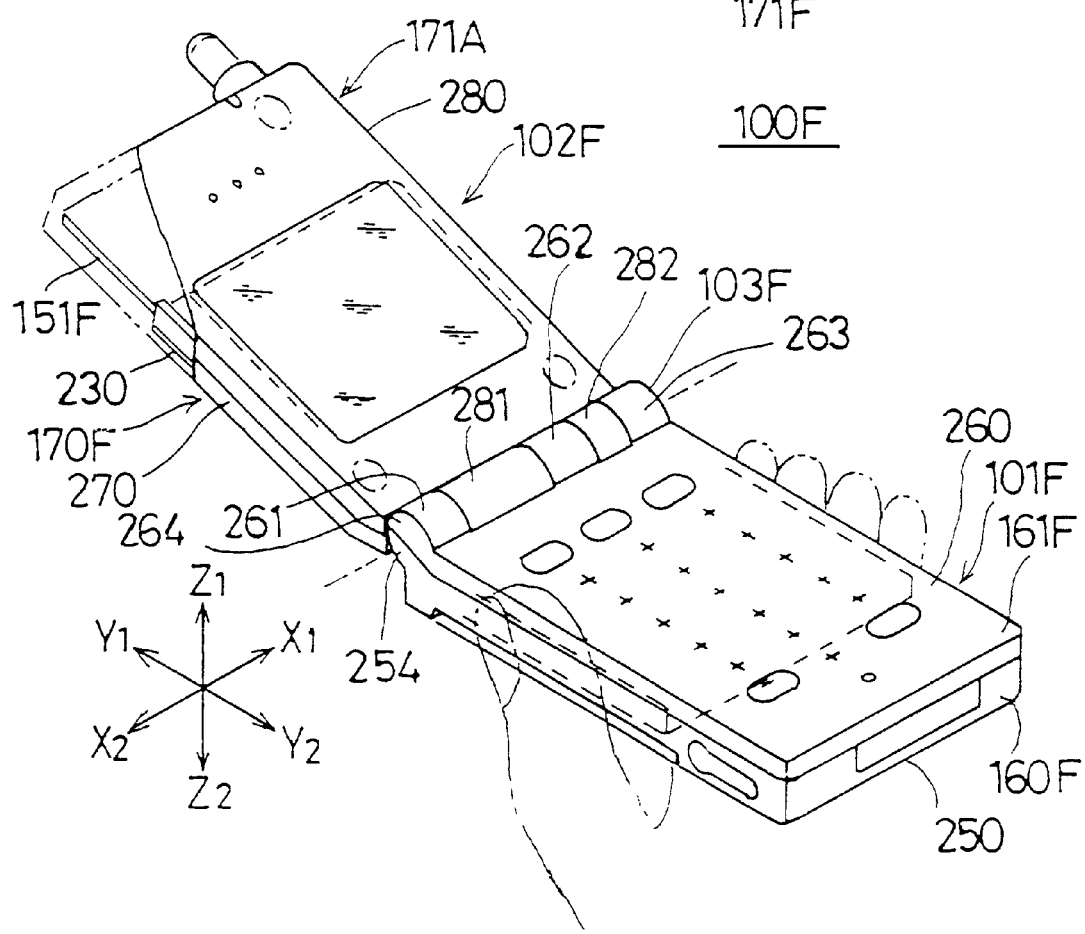
FIG. 32B is a perspective view of the folding-type cellular phone shown in FIG. 32A when opened.
Figure 33A:
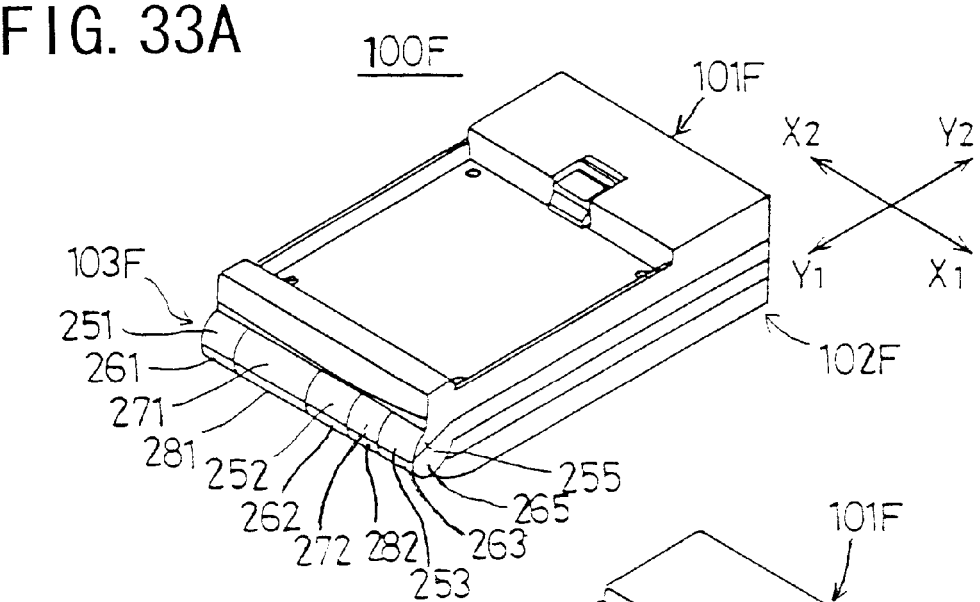
FIG. 33A is a perspective view of the folding-type cellular phone shown in FIG. 32A upside down.
Figure 33B:
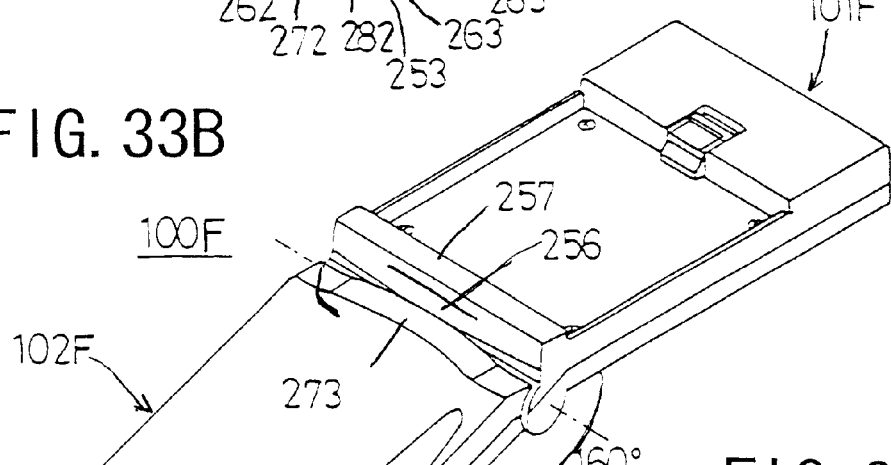
FIG. 33B is a perspective view of the folding-type cellular phone shown in FIG. 32B upside down.
Figure 33C:
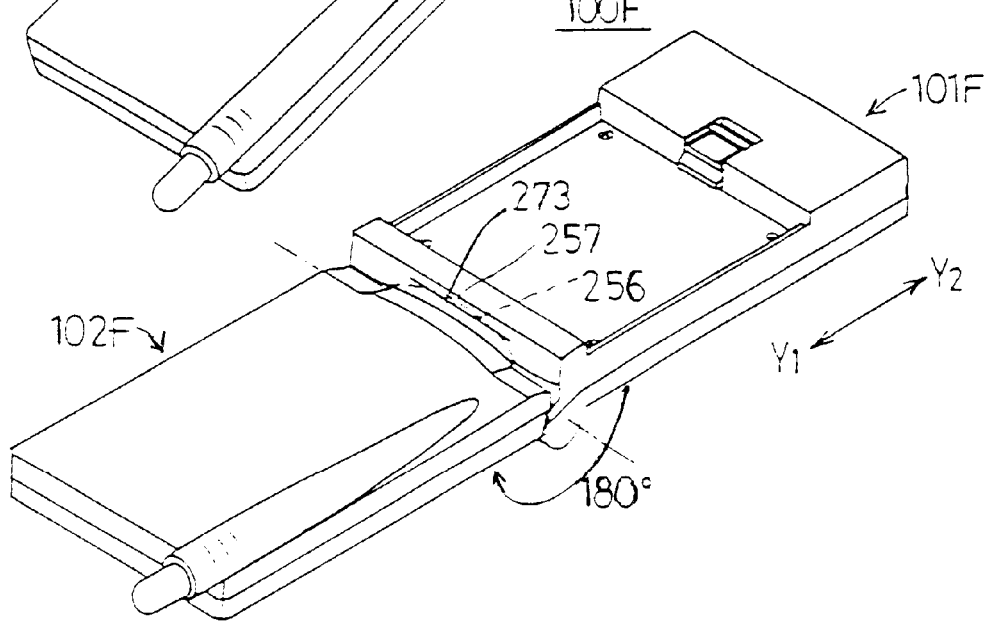
FIG. 33C is a perspective view of the folding-type cellular phone shown in FIG. 33B when further opened forcibly to 180°.
Figure 34:
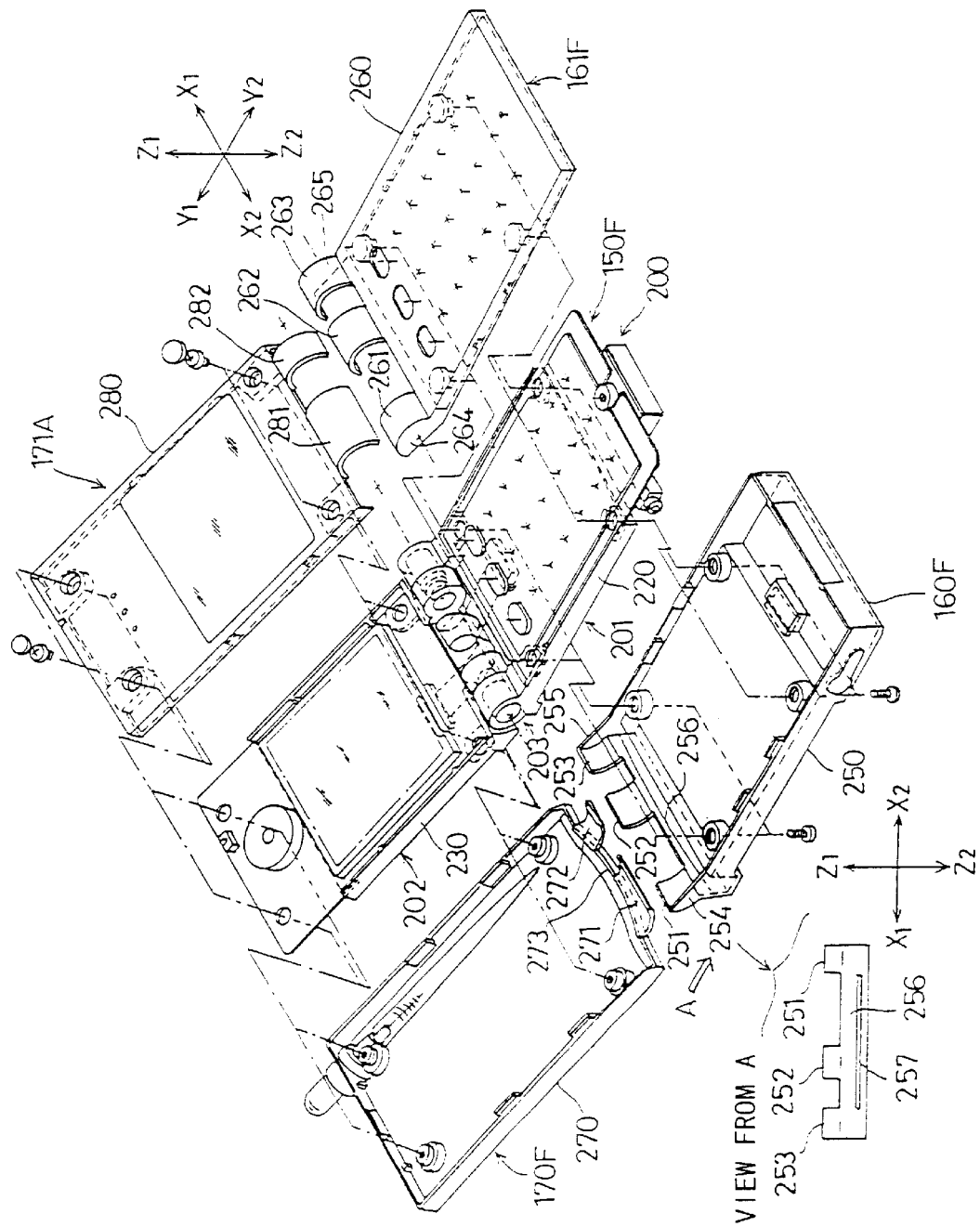
FIG. 34 is a perspective view of the folding-type cellular phone shown in FIG. 32B when disassembled.
Figure 35:
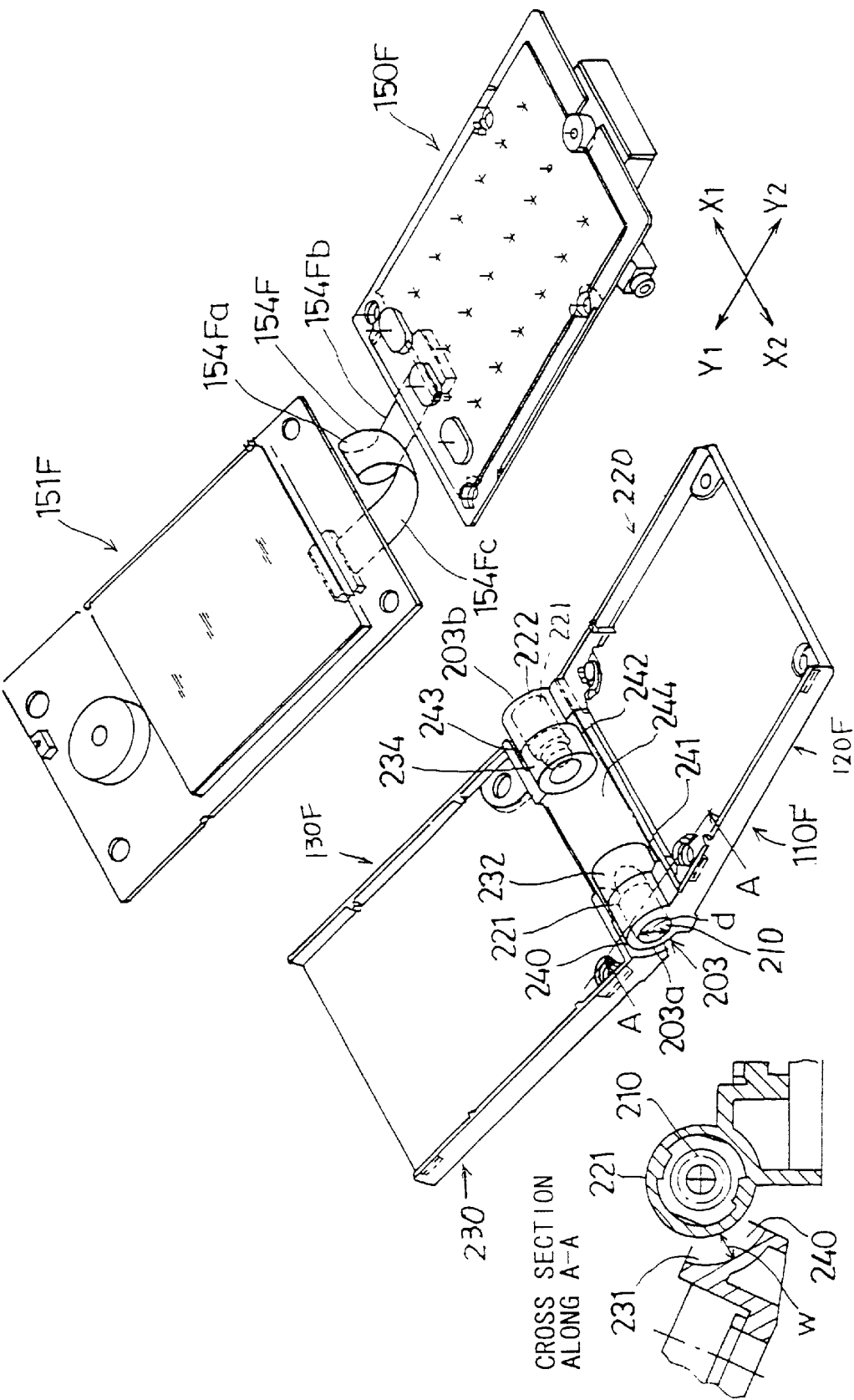
FIG. 35 is a perspective view of a body shown in FIG. 34 when disassembled.
Figure 36:
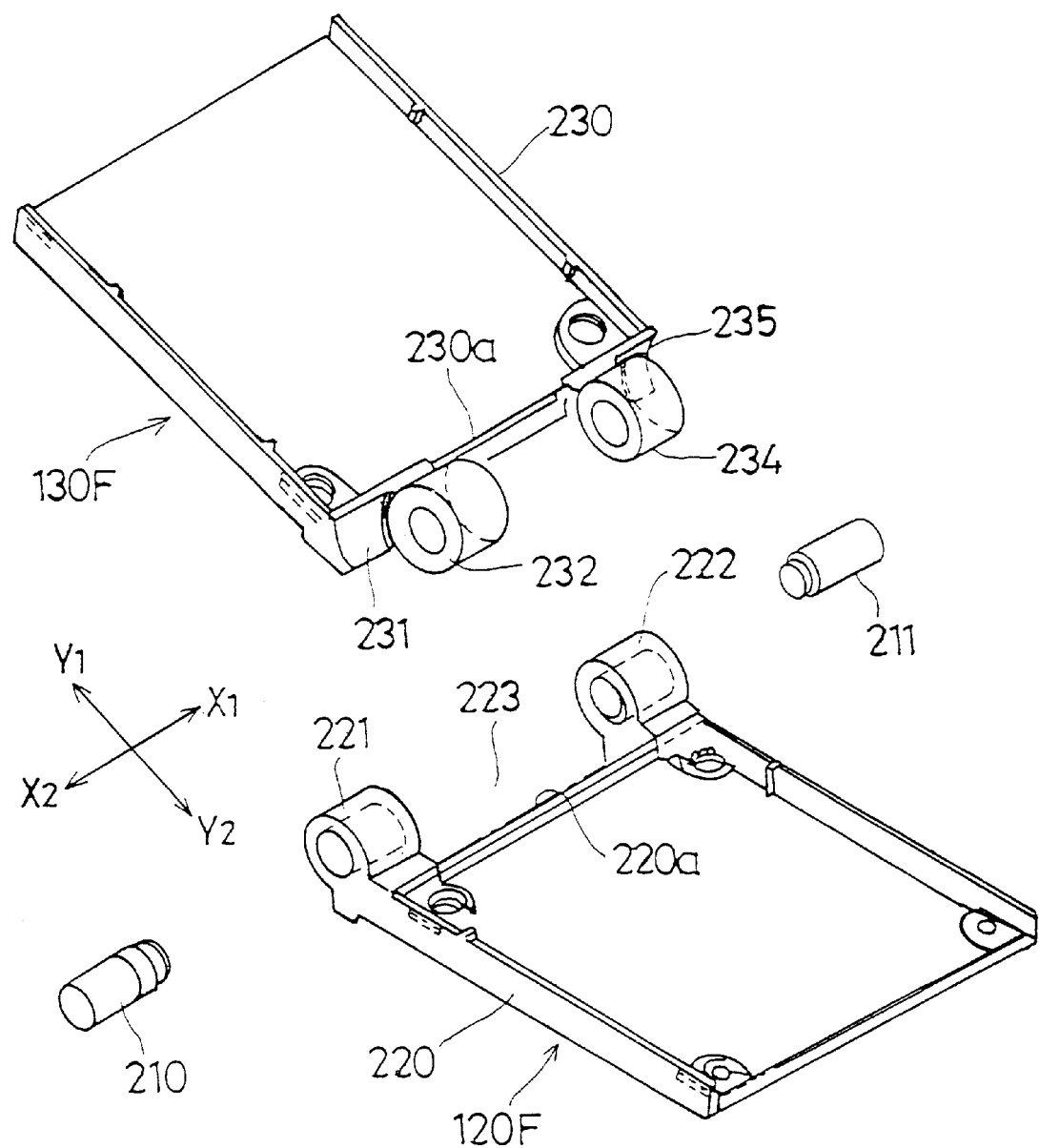
FIG. 36 is a perspective view of a chassis assembly shown in FIG. 35 when disassembled.
Figure 38A:
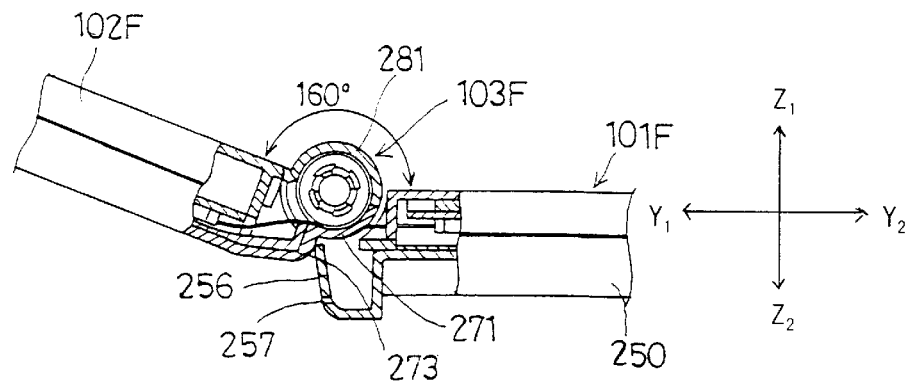
FIG. 38A is a partially cross-sectional view of the folding-type cellular phone around a hinge shown in FIG. 32B.
Figure 38B:
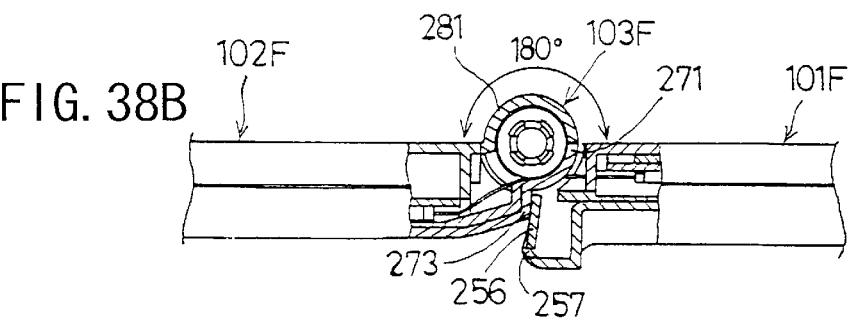
FIG. 38B is a partially cross-sectional view of the folding-type cellular phone around the hinge shown in FIG. 38A when further opened forcibly to 180°.
Figure 38C:
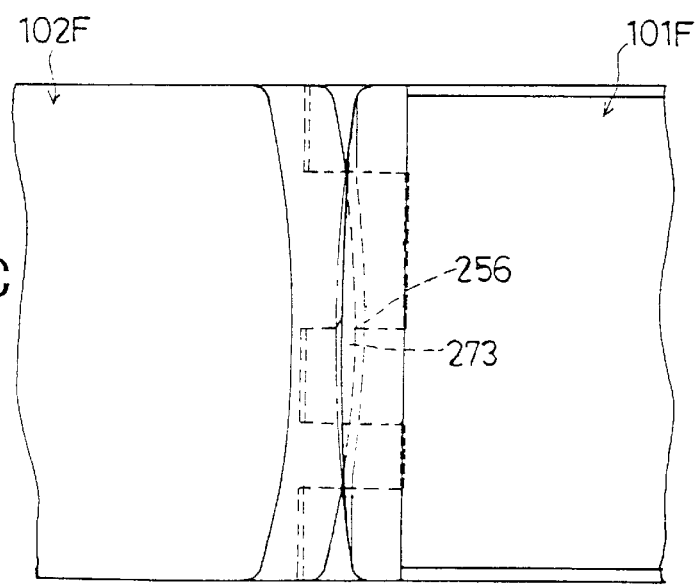
FIG. 38C is a plan view of a part around the hinge shown in FIG. 38B.

FIG. 32A is a perspective view of a folding-type cellular phone 100F according to a seventh embodiment of the present invention when folded. FIG. 32B is a perspective view of the folding-type cellular phone 100F shown in FIG. 32A when opened. FIG. 33A is a perspective view of the folding-type cellular phone 100F shown in FIG. 32A upside down. FIG. 33B is a perspective view of the folding-type cellular phone 100F shown in FIG. 32B upside down. FIG. 33C is a perspective view of the folding-type cellular phone 100F shown in FIG. 33B when further opened forcibly to 180°. FIG. 34 is a perspective view of the folding-type cellular phone 100F shown in FIG. 32B when disassembled. FIG. 35 is a perspective view of a body shown in FIG. 34 when disassembled. FIG. 36 is a perspective view of a chassis assembly shown in FIG. 35 when disassembled. FIG. 37A is a cross-sectional view of the folding-type cellular phone 100F taken along a line A—A shown in FIG. 32A. FIG. 37B is a cross-sectional view of the folding-type cellular phone 100F taken along a line B—B shown in FIG. 32A. FIG. 38A is a partially cross-sectional view of the folding-type cellular phone 100F around a hinge shown in FIG. 32B. FIG. 38B is a partially cross-sectional view of the folding-type cellular phone 100F around the hinge shown in FIG. 38A when further opened forcibly to 180°. FIG. 38C is a plan view of a part around the hinge shown in FIG. 38B.

The folding-type cellular phone 100F is a variation of the folding-type cellular phone 100B shown in FIG. 13A and FIG. 13B, and comprises: a hinge and chassis being die-cast components made of magnesium; and case-members made of synthetic resin, the case-members having chassis-cover portions and hinge-cover portions, whereby the case-members made of synthetic resin cover the chassis and the hinge. The folding-type cellular phone 100F is characterized in that the case-members made of synthetic resin cover not only the chassis but also the hinge.

In order that the folding-type cellular phone 100F has the above-mentioned structure in which the case-members made of synthetic resin cover not only the chassis but also the hinge, the case-members made of synthetic resin have a shape including the hinge-cover portions, and a chassis assembly has gaps between ring portions as unitary parts of one of the chassis and the other chassis, each of the gap having a width that allows in the hinge-cover portions. Additionally, in order not to spoil a design of the folding-type cellular phone 100F, the ring portions as unitary parts of the chassis has a small diameter.

The folding-type cellular phone 100F, as shown in FIG. 32A, FIG. 32B, FIG. 33A to FIG. 33C, FIG. 37A, FIG. 37B and FIG. 38A to FIG. 38C, comprises: an operation-key body 101F; a liquid-crystal display body 102F; and a hinge 103F coupling the operation-key body 101F and the liquid-crystal display body 102F. The folding-type cellular phone 100F, as shown disassembled in FIG. 34, has a body 200, lower case-members 160F and 170F made of synthetic resin, and upper case-members 161F and 171F made of synthetic resin. Y1-Y2 is a longitudinal direction of the folding-type cellular phone 100F. X1-X2 is a widthwise direction of the folding-type cellular phone 100F. Z1-Z2 is a perpendicular direction of the folding-type cellular phone 100F.

First, a description will be given of the body 200.

The body 200 comprises: an operation-key part 201; a liquid-crystal display part 202; and a hinge body 203 coupling the operation-key part 201 and the liquid-crystal display part 202.

The body 200, as shown in FIG. 35, has a chassis assembly 110F, an operation-key part printed-board module 150F, and a liquid-crystal display part printed-board module 151F.

The chassis assembly 110F, as shown in FIG. 36, comprises: an operation-key part chassis 120F made of a die-cast magnesium; a liquid-crystal display part chassis 130F made of a die-cast magnesium; an axle module 210 incorporating a click-lock mechanism using a cam (not shown in the figures), and a spring (not shown in the figures) helping the folding-type cellular phone 100F to open; and an axle module 211 incorporating an oil damper (not shown in the figures).

The operation-key part chassis 120F has a chassis portion 220, and ring portions 221 and 222 projecting from both ends of an edge 220a of the chassis portion 220 in a direction Y1. Between the ring portions 221 and 222 is a space 223.

The liquid-crystal display part chassis 130F has: a chassis portion 230; and a circular-arc surface 231, a ring portion 232, a ring portion 234, and a circular-arc surface 235 in this order from X2 to X1 on an edge 230a of the chassis portion 230 in a direction Y2.

When the operation-key part chassis 120F and the liquid-crystal display part chassis 130F are combined, the ring portion 232 is placed inside the ring portion 221 so that the ring portion 232 and the ring portion 221 are rotatably coupled by the axle module 210 pressed in from side X2, and the ring portion 234 is placed inside the ring portion 222 so that the ring portion 234 and the ring portion 222 are rotatably coupled by the axle module 211 pressed in from side X1.

The hinge body 203 has the following structure. The ring portion 221 and the ring portion 232 are rotatably coupled by the axle module 210, and the ring portion 222 and the ring portion 234 are rotatably coupled by the axle module 211. As shown in FIG. 35 and FIG. 36, the ring portion 221 and the circular-arc surface 231 oppose each other. The ring portion 232 and the edge 220a oppose each other. The ring portion 234 and the edge 220a oppose each other. The ring portion 222 and the circular-arc surface 235 oppose each other. As shown in a cross-sectional view in FIG. 35, between the ring portion 221 and the circular-arc surface 231 is formed a gap 240 having a width w (approximately 1 mm) that allows in hinge-cover portions of the case-members made of synthetic resin. Likewise, between the ring portion 232 and the edge 220a is formed a gap 241. Likewise, between the ring portion 234 and the edge 220a is formed a gap 242. Likewise, between the ring portion 222 and the circular-arc surface 235 is formed a gap 243. Each of the gaps 241, 242 and 243 has the same width as the gap 240.

A space 244 is formed between the ring portions 232 and 234, and is used for arranging a flexible cable 154F.

The hinge body 203 also has an end surface 203a in a direction X2, and an end surface 203b in a direction X1.

The operation-key part printed-board module 150F and the liquid-crystal display part printed-board module 151F are connected by the flexible cable 154F having a loop 154Fa in the middle. As in the third embodiment, the operation-key part printed-board module 150F is fixed to the chassis portion 220, and the liquid-crystal display part printed-board module 151F is fixed to the chassis portion 230. The loop 154Fa of the flexible cable 154F is contained in the above-mentioned space 244 of the hinge body 203.

The above-mentioned operation-key part 201 is formed by the chassis portion 220 and the operation-key part printed-board module 150F. The above-mentioned liquid-crystal display part 202 is formed by the chassis portion 230 and the liquid-crystal display part printed-board module 151F.

Next, a description will be given of the case-members made of synthetic resin.

The lower case-member 160F and the upper case-member 161F form a pair. The lower case-member 170F and the upper case-member 171F form a pair.

The lower case-member 160F and the upper case-member 161F have: shallow box-shaped chassis-cover portions 250 and 260 covering the operation-key part 201; semicircular-arc hinge-cover portions 251, 252, 253, 261, 262 and 263 extending from edges of the chassis-cover portions 250 and 260 in a direction Y1; and substantially semicircular hinge-cover portions 254, 255, 264 and 265 covering outer sides of the hinge-cover portions 251, 253, 261 and 263, respectively. The hinge-cover portions 254, 255, 264 and 265 adjoin the hinge-cover portions 251, 253, 261 and 263, respectively, to form a cap-like shape covering corners in a direction Y1 of the lower case-member 160F and the upper case-member 161F. The hinge-cover portions 251 and 261 are combined to form a ring. The hinge-cover portions 252 and 262 are combined to form a ring. The hinge-cover portions 253 and 263 are combined to form a ring.

The chassis-cover portion 250 has a wall portion 256 formed on the edge in a direction Y1, the wall portion 256 being positioned within a X-Z plane. The wall portion 256 has a slit 257 formed near the bottom (in a direction Z2) thereof, the slit 257 extending in directions X1-X2, so that the wall portion 256 is easily bent in a direction Y2. That is, the wall portion 256 functions as a plate spring made of synthetic resin.

The lower case-member 170F and the upper case-member 171F have: shallow box-shaped chassis-cover portions 270 and 280 covering the liquid-crystal display part 202; and semicircular-arc hinge-cover portions 271, 272, 281 and 282 extending from edges of the chassis-cover portions 270 and 280 in a direction Y1. The hinge-cover portions 271 and 281 are combined to form a ring. The hinge-cover portions 272 and 282 are combined to form a ring.

The chassis-cover portion 270 has a wall portion 273 formed on the edge in a direction Y2. The wall portion 273 has a curved shape so that a central part in directions X1-X2 thereof bulges in a direction Y2.

Next, a description will be given of a state where the case-members 160F, 170F, 161F and 171F made of synthetic resin are mounted on the body 200. First, a description will be given of the upper case-member 161F being combined upon the lower case-member 160F.

As shown in FIG. 32A, FIG. 32B, FIG. 33A, FIG. 33B, FIG. 37A and FIG. 38A, the chassis-cover portions 250 and 260 cover the operation-key part 201. The hinge-cover portions 251 and 261 come in the above-mentioned gap 240 so that edges of the hinge-cover portions 251 and 261 meet each other to form a ring shape covering the ring portion 221. The hinge-cover portions 253 and 263 come in the above-mentioned gap 243 so that edges of the hinge-cover portions 253 and 263 meet each other to form a ring shape covering the ring portion 222. The hinge-cover portions 252 and 262 are in a part of the above-mentioned space 244 so that edges of the hinge-cover portions 252 and 262 meet each other to form a ring shape covering a portion 154Fb and a part of the loop 154Fa of the flexible cable 154F, the portion 154Fb being connected to the operation-key part printed-board module 150F.

The hinge-cover portions 254 and 264 meet each other so as to cover the end surface 203a of the hinge body 203 in a direction X2. The hinge-cover portions 255 and 265 meet each other so as to cover the end surface 203b of the hinge body 203 in a direction X1.

Second, a description will be given of the upper case-member 171F being combined upon the lower case-member 170F.

As shown in FIG. 32A, FIG. 32B, FIG. 33A, FIG. 33B, FIG. 37A and FIG. 38A, the chassis-cover portions 270 and 280 cover the liquid-crystal display part 202. The hinge-cover portions 272 and 282 come in the above-mentioned gap 242 so that edges of the hinge-cover portions 272 and 282 meet each other to form a ring shape covering the ring portion 234. The hinge-cover portions 271 and 281 come in the above-mentioned gap 241 and the other part of the above-mentioned space 244 so that edges of the hinge-cover portions 271 and 281 meet each other to form a ring shape covering the ring portion 232, a portion 154Fc of the flexible cable 154F, and a part of the loop 154Fa, the portion 154Fc being connected to the liquid-crystal display part printed-board module 151F.

As described above, the case-members 160F, 170F, 161F and 171F made of synthetic resin cover the whole of the body 200, i.e., the operation-key part 201, the liquid-crystal display part 202 and the hinge body 203.

The folding-type cellular phone 100F has the above-described structure in which the case-members 160F, 170F, 161F and 171F made of synthetic resin cover not only the operation-key body 101F and the liquid-crystal display body 102F but also the hinge 103F.

When the folding-type cellular phone 100F is carried, the liquid-crystal display body 102F is closed to the operation-key body 101F, as shown in FIG. 32A, FIG. 33A, FIG. 37A and FIG. 37B, and is locked closed by the click-lock mechanism (not shown in the figures) in the axle module 210. When the folding-type cellular phone 100F is used to make a phone call or communication, the liquid-crystal display body 102F is opened at approximately 160° from the operation-key body 101F, as shown in FIG. 32B, FIG. 33B and FIG. 38A, and is locked opened by the click-lock mechanism (not shown in the figures) in the axle module 210. The hinge 103F, covered by the case-members 160F, 170F, 161F and 171F made of synthetic resin, moves properly without being impeded by the case-members 160F, 170F, 161F and 171F.

Next, a description will be given of a mechanism of the folding-type cellular phone 100F that works when a strong force is accidentally put on the already opened folding-type cellular phone 100F so as to further open the folding-type cellular phone 100F.

For example, when a heavy stuff, such as a bag, is put upon the folding-type cellular phone 100F that is already opened at approximately 160°, a strong force acts on the folding-type cellular phone 100F so as to further open the folding-type cellular phone 100F to 180°.

When the folding-type cellular phone 100F is opened to be used to make a phone call or communication, the wall portion 273 of the chassis-cover portion 270 adjoins the wall portion 256 of the chassis-cover portion 250, as shown in FIG. 38A.

When the above-mentioned strong force acts on the folding-type cellular phone 100F, the wall portion 273 pushes the wall portion 256 in a direction Y2 so that the wall portion 256 is elastically bent in the direction Y2 into a shape of a bow, as shown in FIG. 33C, FIG. 38B and FIG. 38C. That is, the wall portion 256 is bent in the direction Y2 into a shape of a bow so that the folding-type cellular phone 100F is forcibly opened to 180°.

In the above example, when the heavy stuff, such as a bag, is removed from the folding-type cellular phone 100F, the wall portion 256 elastically bent in the shape of a bow returns to the original shape thereof so as to push back the wall portion 273. Thereby the folding-type cellular phone 100F is returned to the original state thereof, opening at approximately 160°.

In this course, since the wall portion 256 has the slit 257, the wall portion 256 functions as a plate spring made of synthetic resin. Additionally, the wall portion 273 has a curved shape so that the central part thereof bulges in the direction Y2 to push the center of the wall portion 256. Thereby, the wall portion 256 is easily bent into the shape of a bow. It is noted that the wall portion 256 may have a structure not having the slit 257.

The folding-type cellular phone 100F having the above-described structure has the following features in addition to the above-mentioned features of the folding-type cellular phone 100B shown in FIG. 13A and FIG. 13B.

(1) The case-members 160F, 170F, 161F and 171F made of synthetic resin cover not only the operation-key part 201 and the liquid-crystal display part 202 but also the hinge body 203 so as not to expose the hinge body 203 on the surface of the folding-type cellular phone 100F. Therefore, it does not matter whether the operation-key part chassis 120F and the liquid-crystal display part chassis 130F made of a die-cast magnesium have defects on the surfaces thereof. Therefore, the chassis 120F and 130F do not require the finishing steps for appearances after being retrieved from a metal die. The chassis 120F and 130F do not need painting neither. Therefore, the chassis 120F and 130F are manufactured with a good yield rate without requiring the finishing steps for appearances. Consequently, the folding-type cellular phone 100F is manufactured more efficiently at a lower cost than the folding-type cellular phone 100B shown in FIG. 13A and FIG. 13B.

(2) The hinge-cover portions 254 and 264 of the case-members 160F and 161F cover the end surface 203a of the hinge body 203, and the hinge-cover portions 255 and 265 of the case-members 160F and 161F cover the end surface 203b of the hinge body 203. Therefore, a conventional cover exclusively used to cover an end surface of a hinge is unnecessary.

(3) The folding-type cellular phone 100F can be rotated between approximately 160° (when used to make a phone call) and 180° (when forcibly opened further) by utilizing an elasticity of the wall portion 256 of the lower case-member 160F. Therefore, no mechanism needs to be incorporated into a hinge to enable the rotation. This simplifies the structure of a hinge.

(4) Because of the simplified structure of a hinge mentioned just above, the hinge body 203 has a small diameter d as shown in FIG. 35. Therefore, although the case-members 160F, 170F, 161F and 171F made of synthetic resin cover the hinge body 203, a diameter including the hinge body 203 and the case-members 160F, 170F, 161F and 171F is not increased due to the small diameter d of the hinge body 203. Therefore, the folding-type cellular phone 100F has a good design.

Next, a description will be given of variations of the above-described mechanism of the folding-type cellular phone 100F regarding the rotation between approximately 160° (when used to make a phone call) and 180° (when forcibly opened further).

Each of the variations has a structure in which the wall portion 256 of the lower case-member 160F made of synthetic resin has an improved returning property. First to third variations are structures incorporating a plate-spring member. A fourth variation is a structure incorporating a compression coil spring. Fifth and sixth variations are structures incorporating another piece along with a spring.

[First Variation]

Figure 39A:
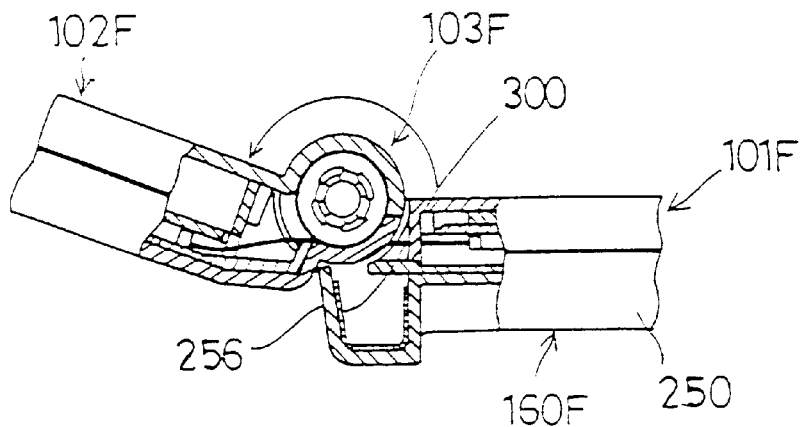
FIG. 39A is a partially cross-sectional view of a first variation of a mechanism of a rotation of the folding-type cellular phone shown in FIG. 38A.
Figure 39B:
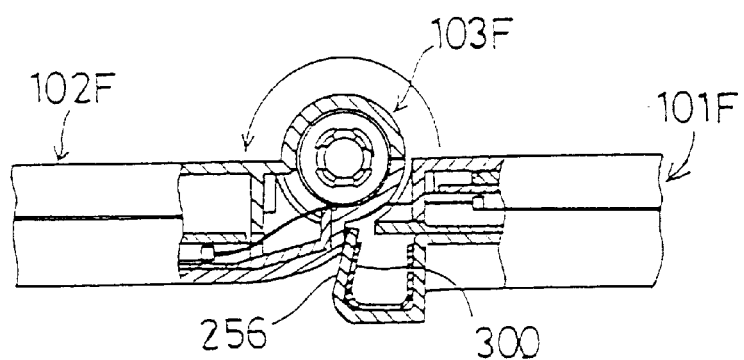
FIG. 39B is a partially cross-sectional view of the first variation shown in FIG. 39A when the folding-type cellular phone is further opened forcibly to 180°.
Figure 39C:
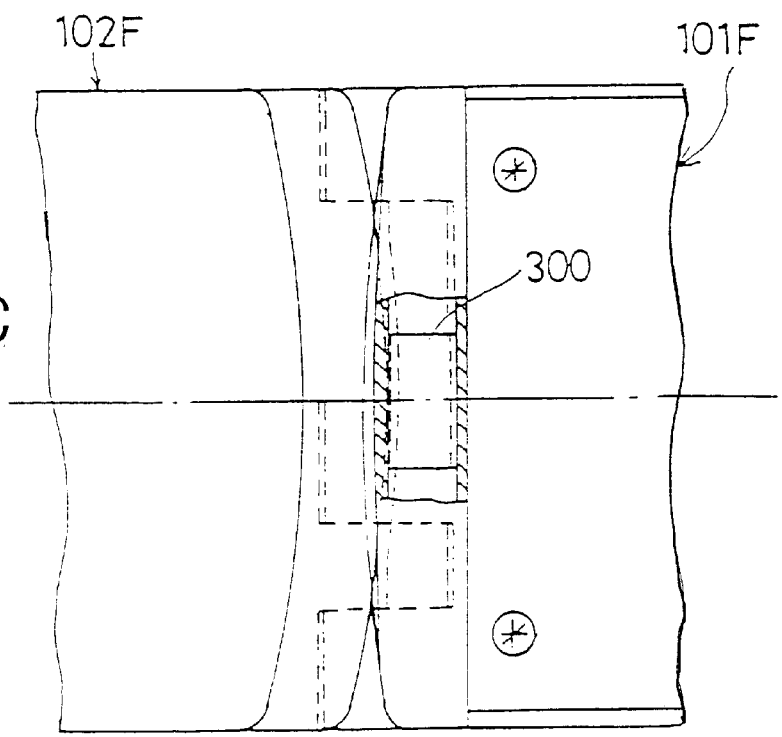
FIG. 39C is a plan view of the first variation shown in FIG. 39B.

As shown in FIG. 39A, a U-shaped metal plate spring member 300 is incorporated inside of the wall portion 256 of the lower case-member 160F made of synthetic resin. When a force is applied to the folding-type cellular phone 100F to forcibly open the folding-type cellular phone 100F, not only the wall portion 256 is bent, but also the plate spring member 300 is deformed, as shown in FIG. 39B and FIG. 39C. When the force is removed, the plate spring member 300 springs back so as to bring back the liquid-crystal display body 102F to the position for making a phone call (approximately 160° to the operation-key body 101F).

[Second Variation]

Figure 40A:
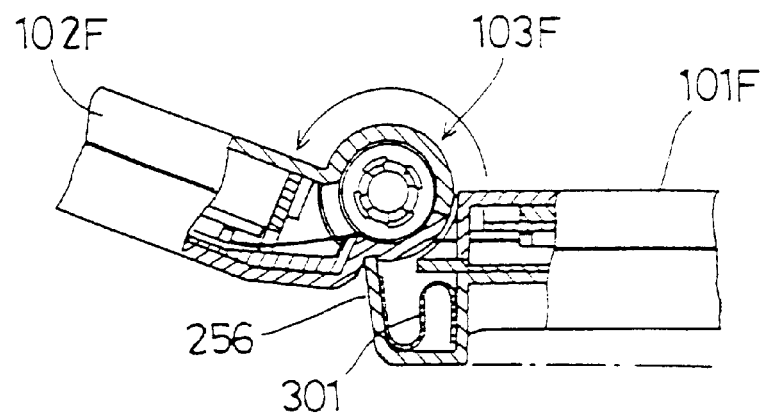
FIG. 40A is a partially cross-sectional view of a second variation of the mechanism of the rotation of the folding-type cellular phone shown in FIG. 38A.
Figure 40B:
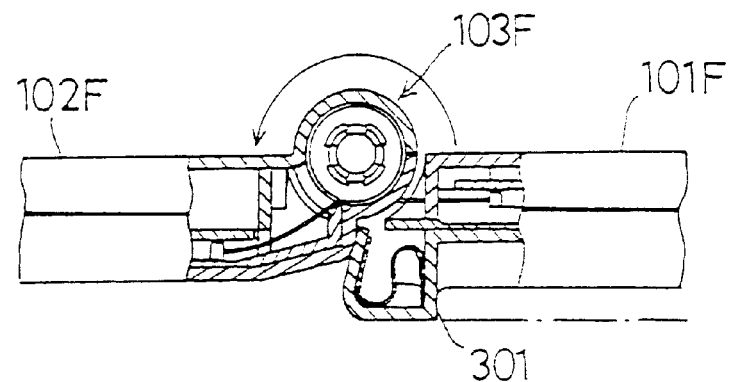
FIG. 40B is a partially cross-sectional view of the second variation shown in FIG. 40A when the folding-type cellular phone is further opened forcibly to 180°.
Figure 40C:
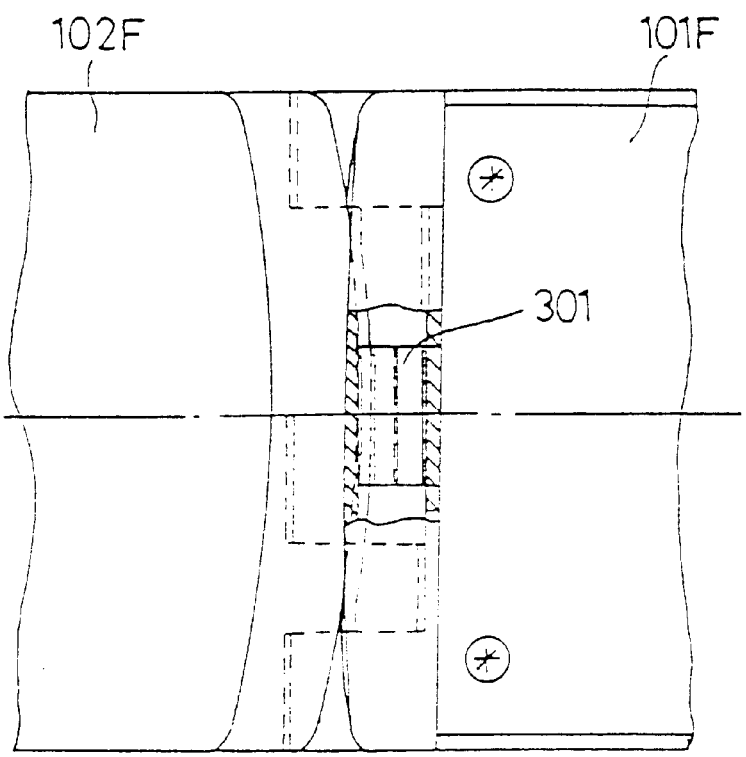
FIG. 40C is a plan view of the second variation shown in FIG. 40B.

In place of the U-shaped metal plate spring member 300 of the above-mentioned first variation, a wave-shaped metal plate spring member 301 is incorporated inside of the wall portion 256, as shown in FIG. 40A. The plate spring member 301 is deformed as shown in FIG. 40B and FIG. 40C.

[Third Variation]

Figure 41A:
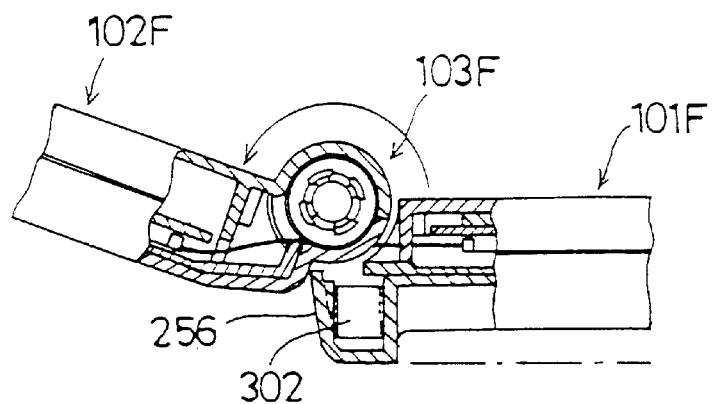
FIG. 41A is a partially cross-sectional view of a third variation of the mechanism of the rotation of the folding-type cellular phone shown in FIG. 38A.
Figure 41B:
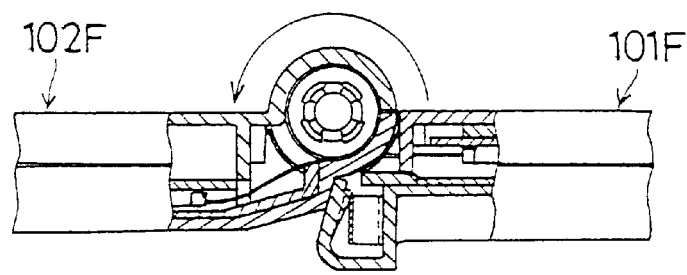
FIG. 41B is a partially cross-sectional view of the third variation shown in FIG. 41A when the folding-type cellular phone is further opened forcibly to 180°.
Figure 41C:
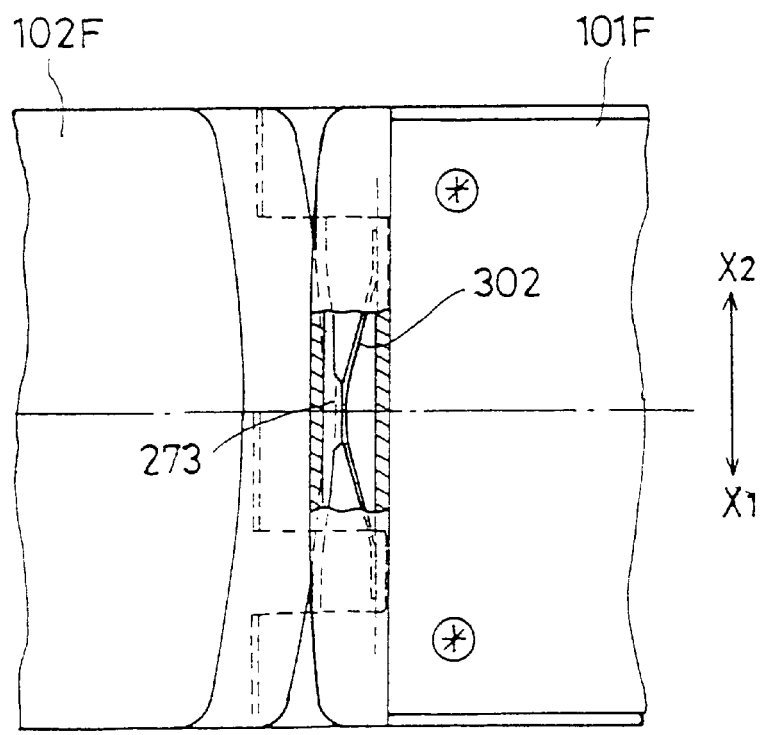
FIG. 41C is a plan view of the third variation shown in FIG. 41B.

In place of the U-shaped metal plate spring member 300 of the above-mentioned first variation, a metal plate spring member 302 is incorporated inside of the wall portion 256, as shown in FIG. 41A. The metal plate spring member 302 is long in directions X1-X2, as shown in FIG. 41C. The plate spring member 302 is deformed as shown in FIG. 41B and FIG. 41C.

[Fourth Variation]

Figure 42A:
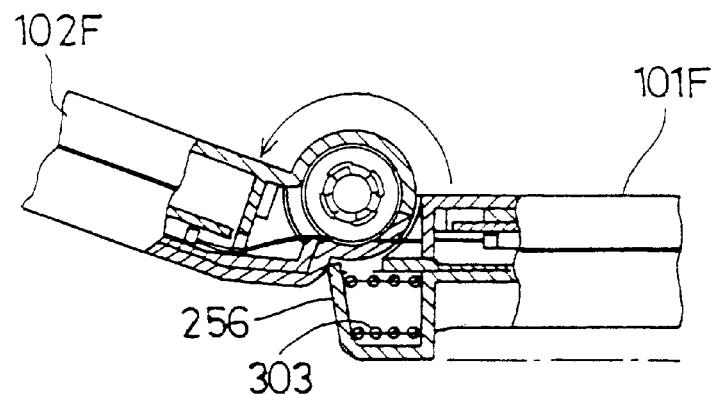
FIG. 42A is a partially cross-sectional view of a fourth variation of the mechanism of the rotation of the folding-type cellular phone shown in FIG. 38A.
Figure 42B:
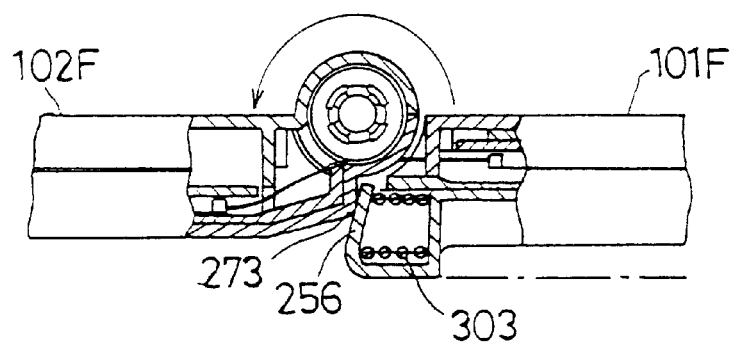
FIG. 42B is a partially cross-sectional view of the fourth variation shown in FIG. 42A when the folding-type cellular phone is further opened forcibly to 180°.
Figure 42C:
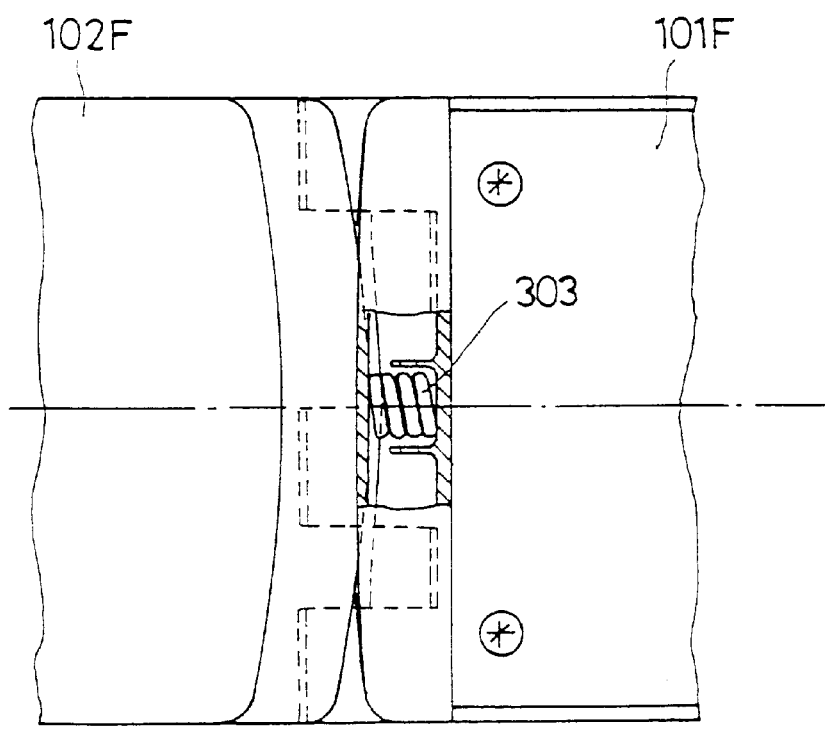
FIG. 42C is a plan view of the fourth variation shown in FIG. 42B.

In place of the U-shaped metal plate spring member 300 of the above-mentioned first variation, a compression coil spring 303 is incorporated inside of the wall portion 256, as shown in FIG. 42A. The compression coil spring 303 is deformed as shown in FIG. 42B and FIG. 42C.

[Fifth Variation]

Figure 43A:
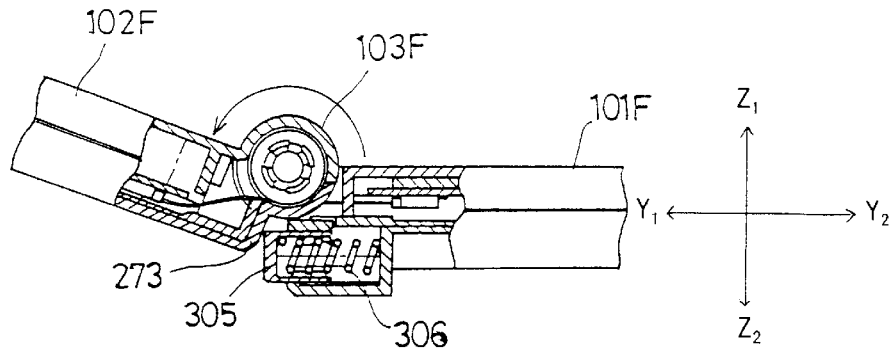
FIG. 43A is a partially cross-sectional view of a fifth variation of the mechanism of the rotation of the folding-type cellular phone shown in FIG. 38A.

As shown in FIG. 43A, a knob 305 is incorporated in an opening formed in the wall portion 256, and a compression coil spring 306 is incorporated inside of the wall portion 256. The compression coil spring 306 presses the knob 305 in a direction Y1 so that the knob 305 protrudes from the wall portion 256.

Figure 43B:
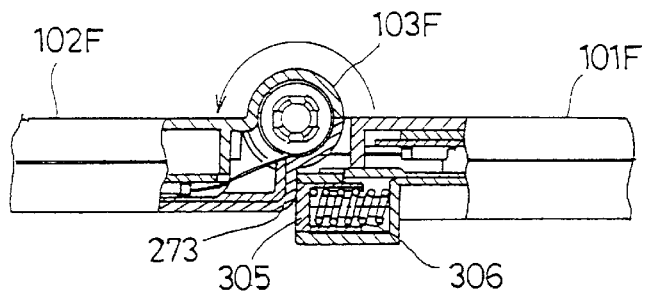
FIG. 43B is a partially cross-sectional view of the fifth variation shown in FIG. 43A when the folding-type cellular phone is further opened forcibly to 180°.
Figure 43C:
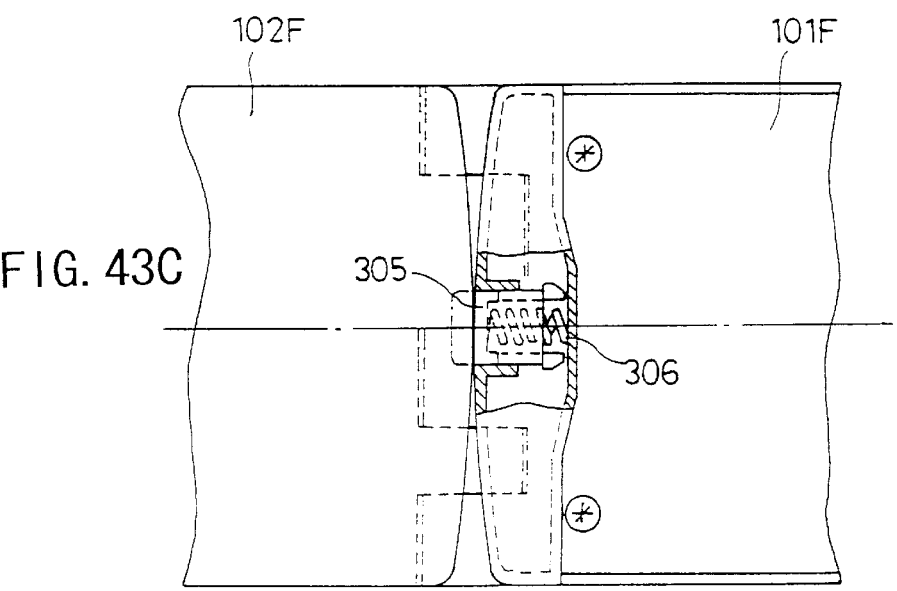
FIG. 43C is a plan view of the fifth variation shown in FIG. 43B.

When the folding-type cellular phone 100F is opened to be used to make a phone call, an edge of the liquid-crystal display body 102F (the wall portion 273) contacts the knob 305. When a force is applied to the folding-type cellular phone 100F to forcibly open the folding-type cellular phone 100F, the knob 305 is pushed in a direction Y2, as shown in FIG. 43B and FIG. 43C, so as compress the compression coil spring 306. When the force is removed, the compression coil spring 306 springs back so as to bring back the liquid-crystal display body 102F to the position for making a phone call (approximately 160° to the operation-key body 101F).

[Sixth Variation]

Figure 44A:
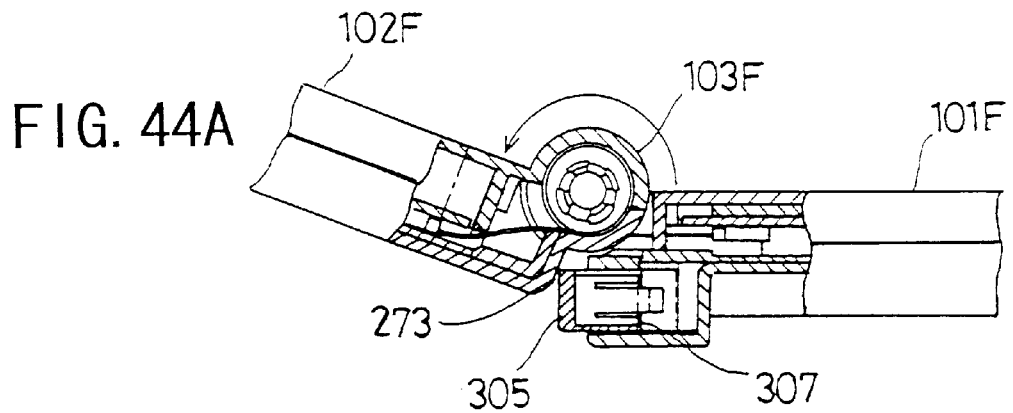
FIG. 44A is a partially cross-sectional view of a sixth variation of the mechanism of the rotation of the folding-type cellular phone shown in FIG. 38A.
Figure 44B:
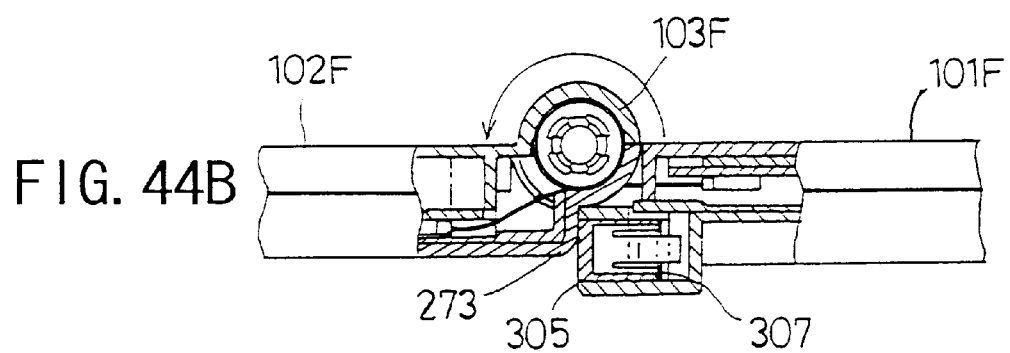
FIG. 44B is a partially cross-sectional view of the sixth variation shown in FIG. 44A when the folding-type cellular phone is further opened forcibly to 180°.
Figure 44C:
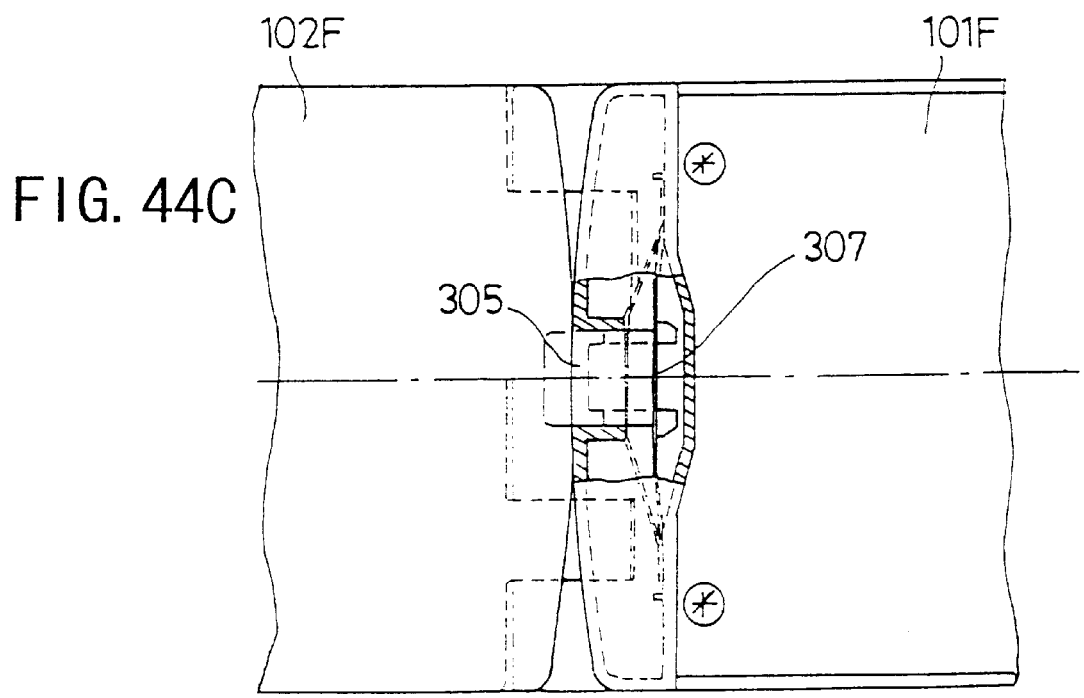
FIG. 44C is a plan view of the sixth variation shown in FIG. 44B.

In place of the compression coil spring 306 of the above-mentioned fifth variation, a plate spring member 307 is incorporated inside of the wall portion 256, as shown in FIG. 44A. The plate spring member 307 is deformed as shown in FIG. 44B and FIG. 44C.

It should be noted that, besides the above-mentioned structures, the wall portion 273 of the lower case-member 170F may undergo an elastic deformation. Additionally, both of the wall portion 256 of the lower case-member 160F and the wall portion 273 of the lower case-member 170F may be deformed elastically.

It should also be noted that, in the above-described embodiments, the chassis assembly 110 and 110A–110F may be made of other metals than magnesium, such as aluminum.

The present invention is not limited to the specifically disclosed embodiments, and variations and modifications may be made without departing from the scope of the present invention.

The present application is based on Japanese priority applications No.2000-118666 filed on Apr. 19, 2000 and No.2000-270732 filed on Sep. 6, 2000, the entire contents of which are hereby incorporated by reference.

What is claimed is:

1. A folding-type mobile terminal comprising:
a first body having a first printed-board module inside thereof and having an input unit on a surface of the first body;
a second body having a second printed-board module inside thereof and having a display unit on a surface of the second body;
a hinge coupling said first body and said second body so that the folding-type mobile terminal is capable of being folded, the hinge being made of a metal;
a first metal chassis incorporated into said first body, the first metal chassis extending from said hinge; and
a second metal chassis incorporated into said second body, the second metal chassis extending from said hinge,
wherein said first body has said first printed-board module fixed to said first metal chassis, a first upper case-member fixed to said first metal chassis, and a first lower case-member fixed to said first metal chassis so that said first upper case-member and said first lower case-member together cover said first metal chassis, the first upper case-member and the first lower case-member being made of a synthetic resin, and
said second body has said second printed-board module fixed to said second metal chassis, a second upper case-member fixed to said second metal chassis, and a second lower case-member fixed to said second metal chassis so that said second upper case-member and said second lower case-member together cover said second metal chassis, the second upper case-member and the second lower case-member being made of a synthetic resin.

2. The folding-type mobile terminal as claimed in claim 1, wherein said first metal chassis has a first shield board unit covering said first printed-board module, and said second metal chassis has a second shield board unit covering said second printed-board module.

3. The folding-type mobile terminal as claimed in claim 1, further comprising an interior antenna, wherein said first metal chassis has a length smaller than said first printed-board module, and said second metal chassis has a length smaller than said second printed-board module so that said interior antenna is provided outside said second metal chassis in said second body.

4. The folding-type mobile terminal as claimed in claim 1, further comprising an interior antenna, wherein said second metal chassis has a length smaller than said second printed-board module so that said interior antenna is provided outside said second metal chassis in said second body.

5. The folding-type mobile terminal as claimed in claim 1, wherein at least one of said first metal chassis and said second metal chassis has a rib exposed on a side of one of said first body and said second body.

6. The folding-type mobile terminal as claimed in claim 1, wherein said first metal chassis has a length supporting an end portion of said first printed-board module, and said second metal chassis has a length supporting an end portion of said second printed-board module.

7. A folding-type mobile terminal comprising:
a first metal member having components providing functions of a mobile terminal fixed thereto;
a second metal member having components providing functions of a mobile terminal fixed thereto;
a hinge unit coupling said first metal member and said second metal member so that said first metal member and said second metal member are capable of being rotated relative to each other with the hinge unit as an axis, the hinge unit being formed by a first edge portion of said first metal member, a second edge portion of said second metal member and an axle passed through a space in said first edge portion and a space in said second edge portion; and
resin members provided on both surfaces of said first metal member and said second metal member so as to cover said first metal member and said second metal member except said first edge portion and said second edge portion.

8. A folding-type mobile terminal comprising:
a first metal member having components providing functions of a mobile terminal fixed thereto;
a second metal member having components providing functions of a mobile terminal fixed thereto;
a hinge unit coupling said first metal member and said second metal member so that said first metal member and said second metal member are capable of being rotated relative to each other with the hinge unit as an axis, the hinge unit being formed by a first edge portion of said first metal member, a second edge portion of said second metal member and an axle passed through a space in said first edge portion and a space in said second edge portion;
first synthetic resin members provided on both surfaces of said first metal member so as to cover said first metal member; and
second synthetic resin members provided on both surfaces of said second metal member so as to cover said second metal member,
wherein said first synthetic resin members include a cover portion partially covering a part of said hinge unit formed by said first edge portion, and said second synthetic resin members include a cover portion partially covering a part of said hinge unit formed by said second edge portion.

9. A folding-type mobile terminal comprising:
a first metal member having components providing functions of a mobile terminal fixed thereto;
a second metal member having components providing functions of a mobile terminal fixed thereto;
a hinge unit coupling said first metal member and said second metal member so that said first metal member and said second metal member are capable of being rotated relative to each other with the hinge unit as an axis, the hinge unit being formed by a first edge portion of said first metal member, a second edge portion of said second metal member and an axle passed through a space in said first edge portion and a space in said second edge portion;
first synthetic resin members provided on both surfaces of said first metal member so as to cover said first metal member; and
second synthetic resin members provided on both surfaces of said second metal member so as to cover said second metal member,
wherein said first synthetic resin members include a cover portion wholly covering a part of said hinge unit formed by said first edge portion, and said second synthetic resin members include a cover portion wholly covering a part of said hinge unit formed by said second edge portion.

10. A folding-type mobile terminal comprising:

a first body having a first printed-board module inside thereof and having an input unit on a surface of the first body;

a second body having a second printed-board module inside thereof and having a display unit on a surface of the second body;

a hinge coupling said first body and said second body so that the folding-type mobile terminal is capable of being folded, the hinge being made of a metal;

a first metal chassis incorporated into said first body, the first metal chassis extending from said hinge; and a second metal chassis incorporated into said second body, the second metal chassis extending from said hinge, wherein, said first body has said first printed-board module fixed to said first metal chassis, a first upper case-member fixed to said first metal chassis, and a first lower case-member fixed to said first metal chassis so that said first upper case-member and said first lower case-member together cover the whole of said first metal chassis and a part of said hinge, the first upper case-member and the first lower case-member being made of a synthetic resin, the first upper case-member having a first upper chassis-cover portion and a first upper hinge-cover portion extending from the first upper chassis-cover portion, and the first lower case-member having a first lower chassis-cover portion and a first lower hinge-cover portion extending from the first lower chassis-cover portion so that the first upper chassis-cover portion and the first lower chassis-cover portion together cover the whole of said first metal chassis, and the first upper hinge-cover portion and the first lower hinge-cover portion together cover the part of said hinge, and said second body has said second printed-board module fixed to said second metal chassis, a second upper case-member fixed to said second metal chassis, and a second lower case-member fixed to said second metal chassis so that said second upper case-member and said second lower case-member together cover the whole of said second metal chassis and the other part of said hinge, the second upper case-member and the second lower case-member being made of a synthetic resin, the second upper case-member having a second upper chassis-cover portion and a second upper hinge-cover portion extending from the second upper chassis-cover portion, and the second lower case-member having a second lower chassis-cover portion and a second lower hinge-cover portion extending from the second lower chassis-cover portion so that the second upper chassis-cover portion and the second lower chassis-cover portion together cover the whole of said second metal chassis, and the second upper hinge-cover portion and the second lower hinge-cover portion together cover the other part of said hinge.

11. The folding-type mobile terminal as claimed in claim 10, wherein a second edge portion of said second lower chassis-cover portion near to said second lower hinge-cover portion adjoins a first edge portion of said first lower chassis-cover portion near to said first lower hinge-cover portion when said first body and said second body are opened to positions for making a communication, and at least one of said first edge portion and said second edge portion is formed as a wall undergoing an elastic deformation from an original shape thereof when being pushed so that, when a pushing force acts on said first body and said second body so as to open said first body and said second body further, said first body and said second body are opened further by said wall undergoing an elastic deformation, and when the pushing force is removed, said first body and said second body are returned to said positions for making a communication by said wall returning to said original shape.

12. The folding-type mobile terminal as claimed in claim 11, further comprising a spring member incorporated inside of said wall.

13. The folding-type mobile terminal as claimed in claim 10, wherein said first upper hinge-cover portion has an upper sidewall covering a part of a side-end surface of said hinge, and said first lower hinge-cover portion has a lower sidewall covering the other part of said side-end surface of said hinge so that said upper sidewall and said lower sidewall cover said side-end surface of said hinge.

* * * * *